United States Patent
Revington et al.

(10) Patent No.: US 9,909,070 B2
(45) Date of Patent: Mar. 6, 2018

(54) PROCESS FOR FLOCCULATING AND DEWATERING OIL SAND MATURE FINE TAILINGS

(75) Inventors: Adrian Peter Revington, Fort McMurray (CA); Oladipo Omotoso, Edmonton (CA); Patrick Sean Wells, Fort McMurray (CA); Thomas Charles Hann, Onoway (CA); Marvin Harvey Weiss, Calgary (CA); Trevor Bugg, Fort McMurray (CA); Jamie Eastwood, Fort McMurray (CA); Stephen Joseph Young, Fort McMurray (CA); Hugues Robert O'Neill, Fort McMurray (CA); Ana Cristina Sanchez, Fort McMurray (CA)

(73) Assignee: SUNCOR ENERGY INC., Calgary (CA)

( * ) Notice: Subject to any disclaimer, the term of this patent is extended or adjusted under 35 U.S.C. 154(b) by 1281 days.

(21) Appl. No.: 13/496,176

(22) PCT Filed: Apr. 22, 2010

(86) PCT No.: PCT/CA2010/000634
§ 371 (c)(1),
(2), (4) Date: Mar. 14, 2012

(87) PCT Pub. No.: WO2011/032258
PCT Pub. Date: Mar. 24, 2011

(65) Prior Publication Data
US 2012/0175315 A1    Jul. 12, 2012

(30) Foreign Application Priority Data

Sep. 15, 2009 (CA) ..................... 2678818
Oct. 30, 2009 (CA) ..................... 2684232
Dec. 2, 2009 (CA) ..................... 2686831

(51) Int. Cl.
*C01G 1/00*   (2006.01)
*B01D 21/00*   (2006.01)
(Continued)

(52) U.S. Cl.
CPC .............. *C10G 1/047* (2013.01); *B01F 5/0463* (2013.01); *B01F 5/0466* (2013.01); *C10G 33/04* (2013.01);
(Continued)

(58) Field of Classification Search
CPC ........ C02F 2103/10; C02F 11/14; C02F 1/56; C02F 1/52; C02F 1/54; C02F 1/5227;
(Continued)

(56) References Cited

U.S. PATENT DOCUMENTS 2,786,651 A   3/1957   Mickle
3,259,570 A   7/1966   Priesing et al.
(Continued)

FOREIGN PATENT DOCUMENTS

CA   1064016 A1   10/1979
CA   1070864 A1   1/1980
(Continued)

OTHER PUBLICATIONS

Owen et al., "Using turbulent pipe flow to study the factors affecting polymer-bridging flocculation of mineral systems", International Journal of Mineral Processing, Jul. 2, 2008, vol. 87, Issue 3-4, pp. 90-99, Published by Elsevier B.V.
(Continued)

*Primary Examiner* — Claire Norris
(74) *Attorney, Agent, or Firm* — Baker & Hostetler LLP

(57) ABSTRACT

A process for dewatering oil sand fine tailings is provided and comprises a dispersion and floc build-up stage comprising in-line addition of a flocculent solution comprising an effective amount of flocculation reagent into a flow of the oil
(Continued)

sand fine tailings; a gel stage wherein flocculated oil sand fine tailings is transported in-line and subjected to shear conditioning; a floc breakdown and water release stage wherein the flocculated oil sand fine tailings releases water and decreases in yield shear stress, while avoiding an oversheared zone; depositing the flocculated oil sand fine tailings onto a deposition area to form a deposit and to enable the release water to flow away from the deposit, preferably done in a pipeline reactor and managing shear according to yield stress and CST information and achieves enhanced dewatering.

55 Claims, 54 Drawing Sheets

(51) Int. Cl.
C02F 1/52 (2006.01)
C10G 1/04 (2006.01)
B01F 5/04 (2006.01)
C10G 33/04 (2006.01)
B01F 5/00 (2006.01)
C02F 1/56 (2006.01)
C02F 11/14 (2006.01)
C02F 103/10 (2006.01)

(52) U.S. Cl.
CPC ......... B01F 2005/0034 (2013.01); C02F 1/56 (2013.01); C02F 11/14 (2013.01); C02F 2103/10 (2013.01)

(58) Field of Classification Search
CPC ............ C02F 1/5263; B01F 2005/0034; B01F 5/0466; B01F 5/0463; C10G 33/04; C10G 1/047; C10G 1/00; C10G 33/00; C10G 33/08; B01D 21/01; B01D 17/0208; B01D 21/34; B01D 21/286; B03B 9/02
USPC ....... 210/702, 709, 723, 708, 729, 732, 738, 210/770; 73/152.01, 152.18, 152.13; 208/187, 188, 390, 391
See application file for complete search history.

(56) References Cited

U.S. PATENT DOCUMENTS

| | | | |
|---|---|---|---|
| 3,319,579 A | 5/1967 | Stack | |
| 3,642,619 A | 2/1972 | Lo Sasso et al. | |
| 3,853,616 A | 12/1974 | Rundell et al. | |
| 4,011,158 A * | 3/1977 | Cook | 210/799 |
| 4,242,098 A | 12/1980 | Braun et al. | |
| 4,463,151 A * | 7/1984 | Schulz | C08F 220/56 |
| | | | 526/307.5 |
| 4,487,553 A | 12/1984 | Nagata | |
| 4,702,844 A | 10/1987 | Flesher et al. | |
| 4,720,346 A | 1/1988 | Flesher et al. | |
| 4,767,540 A | 8/1988 | Spitzer et al. | |
| 5,093,413 A * | 3/1992 | Bhattacharyya et al. | 524/801 |
| 5,183,335 A | 2/1993 | Lang et al. | |
| 5,616,831 A * | 4/1997 | Ferland et al. | 73/61.63 |
| 5,733,462 A | 3/1998 | Mallon et al. | |
| 5,843,320 A | 12/1998 | Huang et al. | |
| 5,925,714 A | 7/1999 | Larson et al. | |
| 5,951,955 A | 9/1999 | Flieg et al. | |
| 5,985,992 A | 11/1999 | Chen | |
| 6,077,441 A | 6/2000 | Luke | |
| 6,709,199 B2 * | 3/2004 | Peyton | 210/170.09 |
| 7,504,445 B2 | 3/2009 | Collin | |
| 2004/0104147 A1* | 6/2004 | Wen | 208/107 |
| 2009/0020458 A1* | 1/2009 | Bozak et al. | 208/390 |
| 2009/0116908 A1 | 5/2009 | Dymond et al. | |

FOREIGN PATENT DOCUMENTS

| | | |
|---|---|---|
| CA | 1071339 A1 | 2/1980 |
| CA | 1076275 A1 | 4/1980 |
| CA | 1085762 A1 | 9/1980 |
| CA | 1087133 A1 | 10/1980 |
| CA | 1091604 A1 | 12/1980 |
| CA | 1109408 A1 | 9/1981 |
| CA | 1110950 A1 | 10/1981 |
| CA | 1119985 A1 | 3/1982 |
| CA | 1122730 A1 | 4/1982 |
| CA | 1123309 A1 | 5/1982 |
| CA | 1123977 A1 | 5/1982 |
| CA | 1140281 A1 | 1/1983 |
| CA | 1162869 A1 | 2/1984 |
| CA | 1165712 A1 | 4/1984 |
| CA | 1180827 A1 | 1/1985 |
| CA | 1182418 A1 | 2/1985 |
| CA | 1188435 A1 | 6/1985 |
| CA | 2004549 A1 | 6/1990 |
| CA | 2005681 A1 | 6/1990 |
| CA | 2006795 A1 | 6/1990 |
| CA | 1273888 A1 | 9/1990 |
| CA | 2012097 A1 | 9/1990 |
| CA | 1277449 C | 12/1990 |
| CA | 2006483 A1 | 6/1991 |
| CA | 2077453 A1 | 10/1991 |
| CA | 2042162 A1 | 12/1991 |
| CA | 2075946 A1 | 12/1991 |
| CA | 2076011 A1 | 12/1991 |
| CA | 2052742 A1 | 4/1992 |
| CA | 1301692 C | 5/1992 |
| CA | 2060042 A1 | 8/1992 |
| CA | 2114436 A1 | 2/1993 |
| CA | 2059828 A1 | 3/1993 |
| CA | 2115153 A1 | 3/1993 |
| CA | 2120005 A1 | 4/1993 |
| CA | 2084129 A1 | 6/1993 |
| CA | 2088320 A1 | 7/1993 |
| CA | 2128339 A1 | 8/1993 |
| CA | 2097127 A1 | 12/1993 |
| CA | 2137134 A1 | 12/1993 |
| CA | 2137139 A1 | 12/1993 |
| CA | 2099472 A1 | 1/1994 |
| CA | 2105333 A1 | 3/1994 |
| CA | 2127427 A1 | 1/1995 |
| CA | 1334562 C | 2/1995 |
| CA | 2143016 A1 | 8/1995 |
| CA | 2159328 A1 | 8/1995 |
| CA | 2159329 A1 | 8/1995 |
| CA | 2145939 A1 | 10/1995 |
| CA | 2123076 A1 | 11/1995 |
| CA | 2192388 A1 | 12/1995 |
| CA | 2130587 A1 | 2/1996 |
| CA | 2195448 A1 | 2/1996 |
| CA | 2204365 A1 | 5/1996 |
| CA | 2165385 A1 | 6/1996 |
| CA | 2169875 A1 | 8/1996 |
| CA | 2183380 A1 | 8/1996 |
| CA | 2172122 A1 | 9/1996 |
| CA | 2189850 A1 | 9/1996 |
| CA | 2216847 A1 | 10/1996 |
| CA | 2217294 A1 | 10/1996 |
| CA | 2223855 A1 | 2/1997 |
| CA | 2182251 A1 | 5/1997 |
| CA | 2206143 A1 | 5/1997 |
| CA | 2235006 A1 | 5/1997 |
| CA | 1339285 C | 8/1997 |
| CA | 2247184 A1 | 9/1997 |
| CA | 2258751 A1 | 12/1997 |
| CA | 2210865 A1 | 1/1998 |
| CA | 2249367 A1 | 1/1998 |
| CA | 2260070 A1 | 1/1998 |
| CA | 2264803 A1 | 4/1998 |
| CA | 2268075 A1 | 4/1998 |
| CA | 1339850 C | 5/1998 |
| CA | 2276698 A1 | 7/1998 |
| CA | 2277098 A1 | 7/1998 |
| CA | 2287996 A1 | 11/1998 |

(56) References Cited

FOREIGN PATENT DOCUMENTS

| | | |
|---|---|---|
| CA | 2291669 A1 | 12/1998 |
| CA | 2243608 A1 | 2/1999 |
| CA | 2248479 A1 | 3/1999 |
| CA | 2306797 A1 | 5/1999 |
| CA | 2313544 A1 | 6/1999 |
| CA | 2317636 A1 | 7/1999 |
| CA | 2319419 A1 | 8/1999 |
| CA | 2326355 A1 | 10/1999 |
| CA | 2333508 A1 | 12/1999 |
| CA | 2334196 A1 | 12/1999 |
| CA | 2334744 A1 | 12/1999 |
| CA | 2346249 A1 | 4/2000 |
| CA | 2362134 A1 | 9/2000 |
| CA | 2365347 A1 | 10/2000 |
| CA | 2368604 A1 | 10/2000 |
| CA | 2378718 A1 | 1/2001 |
| CA | 2378131 A1 | 3/2001 |
| CA | 2407869 A1 | 12/2001 |
| CA | 2418483 A1 | 2/2002 |
| CA | 2364854 A1 | 6/2002 |
| CA | 2429476 A1 | 6/2002 |
| CA | 2370922 A1 | 8/2002 |
| CA | 2392246 A1 | 1/2003 |
| CA | 2465649 A1 | 6/2003 |
| CA | 2441969 A1 | 5/2004 |
| CA | 2504890 A1 | 5/2004 |
| CA | 2515581 A1 | 7/2004 |
| CA | 2532792 A1 | 3/2005 |
| CA | 2532953 A1 | 3/2005 |
| CA | 2535702 A1 | 3/2005 |
| CA | 2483501 A1 | 5/2005 |
| CA | 2546112 A1 | 6/2005 |
| CA | 2557802 A1 | 10/2005 |
| CA | 2558038 A1 | 10/2005 |
| CA | 2558092 A1 | 10/2005 |
| CA | 2558143 A1 | 10/2005 |
| CA | 2562996 A1 | 10/2005 |
| CA | 2591884 A1 | 7/2006 |
| CA | 2592586 A1 | 7/2006 |
| CA | 2592590 A1 | 7/2006 |
| CA | 2594243 A1 | 7/2006 |
| CA | 2594856 A1 | 7/2006 |
| CA | 2596648 A1 | 8/2006 |
| CA | 2512324 A1 | 1/2007 |
| CA | 2628270 A1 | 5/2007 |
| CA | 2636135 A1 | 7/2007 |
| CA | 2641582 A1 | 8/2007 |
| CA | 2645450 A1 | 9/2007 |
| CA | 2651440 A1 | 11/2007 |
| CA | 2651767 A1 | 11/2007 |
| CA | 2651863 A1 | 11/2007 |
| CA | 2567185 A1 | 4/2008 |
| CA | 2665579 A1 | 5/2008 |
| CA | 2672578 A1 | 7/2008 |
| CA | 2582059 A1 | 9/2008 |
| CA | 2667281 A1 | 9/2008 |
| CA | 2677846 A1 | 9/2008 |
| CA | 2684493 A1 | 10/2008 |
| CA | 2594182 A1 | 1/2009 |
| CA | 2634748 A1 | 1/2009 |
| CA | 2606312 A1 | 4/2009 |
| CA | 2653582 A1 | 8/2009 |
| CA | 2674660 A1 | 11/2009 |
| CA | 2665350 A1 | 12/2009 |
| CA | 2701317 A1 | 3/2011 |
| EP | 1 371 614 A1 | 12/2003 |
| FR | 2577563 A1 | 8/1986 |
| FR | 2582663 A1 | 12/1986 |
| FR | 2588818 A1 | 4/1987 |
| FR | 2589145 A1 | 4/1987 |
| FR | 2637649 A1 | 4/1990 |
| FR | 2666080 A3 | 2/1992 |
| FR | 2678629 A1 | 1/1993 |
| FR | 2700771 A1 | 7/1994 |
| FR | 2712306 A1 | 5/1995 |
| FR | 2718656 A1 | 10/1995 |
| FR | 2729089 A1 | 7/1996 |
| GB | 1184003 A | 3/1970 |
| GB | 2270519 A | 3/1994 |
| WO | 9821271 A1 | 5/1998 |
| WO | 0053641 A1 | 9/2000 |
| WO | 0053816 A1 | 9/2000 |
| WO | 0058378 A1 | 10/2000 |
| WO | 0117914 A1 | 3/2001 |
| WO | 0122795 A1 | 4/2001 |
| WO | 0125493 A1 | 4/2001 |
| WO | 0164179 A1 | 9/2001 |
| WO | 0197772 A1 | 12/2001 |
| WO | 0204367 A1 | 1/2002 |
| WO | 0210225 A1 | 2/2002 |
| WO | 0234796 A1 | 5/2002 |
| WO | 0244093 A2 | 6/2002 |
| WO | 02057322 A1 | 7/2002 |
| WO | 02083258 A2 | 10/2002 |
| WO | 03066800 A2 | 8/2003 |
| WO | 2004020395 A1 | 3/2004 |
| WO | 2004060819 A1 | 7/2004 |
| WO | 2004089322 A1 | 10/2004 |
| WO | 2005040240 A2 | 5/2005 |
| WO | 2005053748 A1 | 6/2005 |
| WO | 2005079965 A1 | 9/2005 |
| WO | 2005087712 A1 | 9/2005 |
| WO | 2005100423 A1 | 10/2005 |
| WO | 2006021708 A1 | 3/2006 |
| WO | 2006070147 A2 | 7/2006 |
| WO | 2008107034 A2 | 9/2008 |
| WO | 2009009887 A1 | 1/2009 |
| WO | 2009040166 A1 | 4/2009 |
| WO | 2009044075 A1 | 4/2009 |
| WO | 2009127893 A1 | 10/2009 |

OTHER PUBLICATIONS

Sworska, A., et al., "Flocculation of the Syncrude fine tailings. Part I. Effect of pH, polymer dosage and Mg2+ anmd Ca2+ cations", Int. J. Miner. Process 60 (2000) 143-52 [Document 892].

Sworska, A., et a., "Flocculation of the Syncrude fine tailings. Part II. Effect of hydrodynamic condictions", Int. J. Miner. Process 60 (2000) 153-61.

Kasperski, K.L., "A Review of Properties and Treatment of Oil Sands Tailings", AOSTRA Journal of Research (1991), vol. 8, pp. 1-43.

Wells, P.S., et al. "MFT Drying—Case Study in the Use of Rheological Modification and Dewatering Through Thin Lift Deposition in the Oil Sands of Alberta" (2007).

Omotoso, D. et al., "Polymer Dosing of MFT as a Function of Clay Activity" (2009).

Vrale et al., "Rapid Mixing in Water Treatment", Jour. AWWA, Jan. 1971, pp. 52-58.

Owen et al., "Using turbulent pipe flow to stud the factors affecting polymer-bridging flocculation of mineral systems", International Journal of Mineral Processing, Elsevier, 2008.

J. Gregory, "Polymer Adsorption and Flocculation in Sheared Suspensions", Colloids and Surfaces, vol. 31, 1988, pp. 231-253, Elsevier Science Publishers B.V., Amsterdam.

Ezeagwula, Kingsley Emeka, Studies on flocculation of kaolin suspensions and mature fine tailings, Department of Chemical and Materials Engineering, University of Alberta, 2008.

Inyo Process, Sludge polymer injection wafer four port, Apr. 3, 2007.

Franks, G. et al., Aggregate size and density after shearing, implications for dewatering fine tailings with hydrocyclones, International Journal of Mineral Processing, vol. 77, p. 46-52, 2005.

* cited by examiner

Mass Fraction of Flocculent Solution

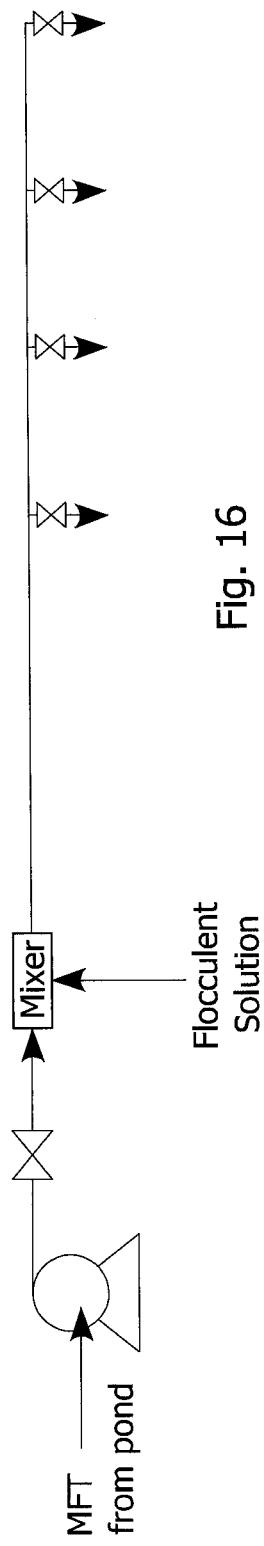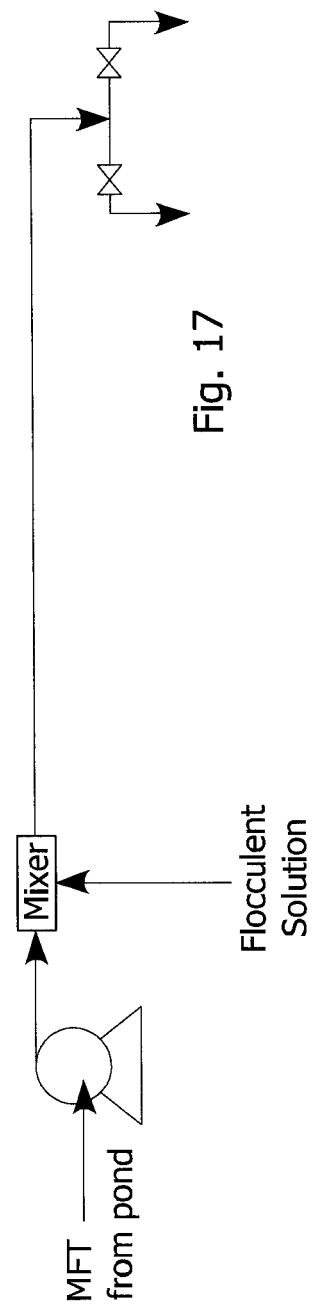
Fig. 16
Fig. 17

PROCESS FOR FLOCCULATING AND DEWATERING OIL SAND MATURE FINE TAILINGS

CROSS-REFERENCE TO RELATED APPLICATIONS

This application is a National Stage of International Patent Application No. PCT/CA2010/00634, filed on Apr. 22, 2010, which claims priority to foreign patent application CA 2,678,818, filed on Sep. 15, 2009, foreign patent application CA 2,684,232, filed on Oct. 30, 2009, and foreign patent application CA 2,686,831, filed on Dec. 2, 2009, the disclosures of which are incorporated herein by reference in their entirety.

FIELD OF THE INVENTION

The present invention generally relates to the field of treating oil sand fine tailings.

BACKGROUND

Oil sand fine tailings have become a technical, operational, environmental, economic and public policy issue.

Oil sand tailings are generated from hydrocarbon extraction process operations that separate the valuable hydrocarbons from oil sand ore. All commercial hydrocarbon extraction processes use variations of the Clark Hot Water Process in which water is added to the oil sands to enable the separation of the valuable hydrocarbon fraction from the oil sand minerals. The process water also acts as a carrier fluid for the mineral fraction. Once the hydrocarbon fraction is recovered, the residual water, unrecovered hydrocarbons and minerals are generally referred to as "tailings".

The oil sand industry has adopted a convention with respect to mineral particle sizing. Mineral fractions with a particle diameter greater than 44 microns are referred to as "sand". Mineral fractions with a particle diameter less than 44 microns are referred to as "fines". Mineral fractions with a particle diameter less than 2 microns are generally referred to as "clay", but in some instances "clay" may refer to the actual particle mineralogy. The relationship between sand and fines in tailings reflects the variation in the oil sand ore make-up, the chemistry of the process water and the extraction process.

Conventionally, tailings are transported to a deposition site generally referred to as a "tailings pond" located close to the oil sands mining and extraction facilities to facilitate pipeline transportation, discharging and management of the tailings. Due to the scale of operations, oil sand tailings ponds cover vast tracts of land and must be constructed and managed in accordance with regulations. The management of pond location, filling, level control and reclamation is a complex undertaking given the geographical, technical, regulatory and economic constraints of oil sands operations.

Each tailings pond is contained within a dyke structure generally constructed by placing the sand fraction of the tailings within cells or on beaches. The process water, unrecovered hydrocarbons, together with sand and fine minerals not trapped in the dyke structure flow into the tailings pond. Tailings streams initially discharged into the ponds may have fairly low densities and solids contents, for instance around 0.5-10 wt %.

In the tailings pond, the process water, unrecovered hydrocarbons and minerals settle naturally to form different strata. The upper stratum is primarily water that may be recycled as process water to the extraction process. The lower stratum contains settled residual hydrocarbon and minerals which are predominately fines. This lower stratum is often referred to as "mature fine tailings" (MFT). Mature fine tailings have very slow consolidation rates and represent a major challenge to tailings management in the oil sands industry.

The composition of mature fine tailings is highly variable. Near the top of the stratum the mineral content is about 10 wt % and through time consolidates up to 50 wt % at the bottom of the stratum. Overall, mature fine tailings have an average mineral content of about 30 wt %. While fines are the dominant particle size fraction in the mineral content, the sand content may be 15 wt % of the solids and the clay content may be up to 75 wt % of the solids, reflecting the oil sand ore and extraction process. Additional variation may result from the residual hydrocarbon which may be dispersed in the mineral or may segregate into mat layers of hydrocarbon. The mature fine tailings in a pond not only has a wide variation of compositions distributed from top to bottom of the pond but there may also be pockets of different compositions at random locations throughout the pond.

Mature fine tailings behave as a fluid-like colloidal material. The fact that mature fine tailings behave as a fluid significantly limits options to reclaim tailings ponds. In addition, mature fine tailings do not behave as a Newtonian fluid, which makes continuous commercial scale treatments for dewatering the tailings all the more challenging. Without dewatering or solidifying the mature fine tailings, tailings ponds have increasing economic and environmental implications over time.

There are some methods that have been proposed for disposing of or reclaiming oil sand tailings by attempting to solidify or dewater mature fine tailings. If mature fine tailings can be sufficiently dewatered so as to convert the waste product into a reclaimed firm terrain, then many of the problems associated with this material can be curtailed or completely avoided. As a general guideline target, achieving a solids content of 75 wt % for mature fine tailings is considered sufficiently "dried" for reclamation.

One known method for dewatering MFT involves a freeze-thaw approach. Several field trials were conducted at oil sands sites by depositing MFT into small, shallow pits that were allowed to freeze over the winter and undergo thawing and evaporative dewatering the following summer. Scale up of such a method would require enormous surface areas and would be highly dependent on weather and season. Furthermore, other restrictions of this setup were the collection of release water and precipitation on the surface of the MFT which discounted the efficacy of the evaporative drying mechanism.

Some other known methods have attempted to treat MFT with the addition of a chemical to create a thickened paste that will solidify or eventually dewater.

One such method, referred to as "consolidated tailings" (CT), involves combining mature fine tailings with sand and gypsum. A typical consolidated tailings mixture is about 60 wt % mineral (balance is process water) with a sand to fines ratio of about 4 to 1, and 600 to 1000 ppm of gypsum. This combination can result in a non-segregating mixture when deposited into the tailings ponds for consolidation. However, the CT method has a number of drawbacks. It relies on continuous extraction operations for a supply of sand, gypsum and process water. The blend must be tightly controlled. Also, when consolidated tailings mixtures are less than 60 wt % mineral, the material segregates with a portion of the fines returned to the pond for reprocessing when settled as mature fine tailings. Furthermore, the geotechnical strength of the deposited consolidated tailings requires containment dykes and, therefore, the sand required in CT competes with sand used for dyke construction until extraction operations cease. Without sand, the CT method cannot treat mature fine tailings.

Another method conducted at lab-scale sought to dilute MFT preferably to 10 wt % solids before adding Percol LT27A or 156. Though the more diluted MFT showed faster settling rates and resulted in a thickened paste, this dilution-dependent small batch method could not achieve the required dewatering results for reclamation of mature fine tailings.

Some other methods have attempted to use polymers or other chemicals to help dewater MFT. However, these methods have encountered various problems and have been unable to achieve reliable results. When generally considering methods comprising chemical addition followed by tailings deposition for dewatering, there are a number of important factors that should not be overlooked.

Of course, one factor is the nature, properties and effects of the added chemicals. The chemicals that have shown promise up to now have been dependent on oil sand extraction by-products, effective only at lab-scale or within narrow process operating windows, or unable to properly and reliably mix, react or be transported with tailings. Some added chemicals have enabled thickening of the tailings with no change in solids content by entrapping water within the material, which limits the water recovery options from the deposited material. Some chemical additives such as gypsum and hydrated lime have generated water runoff that can adversely impact the process water reused in the extraction processes or dried tailings with a high salt content that is unsuitable for reclamation.

Another factor is the chemical addition technique. Known techniques of adding sand or chemicals often involve blending materials in a tank or thickener apparatus. Such known techniques have several disadvantages including requiring a controlled, homogeneous mixing of the additive in a stream with varying composition and flows which results in inefficiency and restricts operational flexibility. Some chemical additives also have a certain degree of fragility, changeability or reactivity that requires special care in their application.

Another factor is that many chemical additives can be very viscous and may exhibit non-Newtonian fluid behaviour. Several known techniques rely on dilution so that the combined fluid can be approximated as a Newtonian fluid with respect to mixing and hydraulic processes. Mature fine tailings, however, particularly at high mineral or clay concentrations, demonstrates non-Newtonian fluid behaviour. Consequently, even though a chemical additive may show promise as a dewatering agent in the lab or small scale batch trials, it is difficult to repeat performance in an up-scaled or commercial facility. This problem was demonstrated when attempting to inject a viscous polymer additive into a pipe carrying MFT. The main MFT pipeline was intersected by a smaller side branch pipe for injecting the polymer additive. For Newtonian fluids, one would expect this arrangement to allow high turbulence to aid mixing. However, for the two non-Newtonian fluids, the field performance with this mixing arrangement was inconsistent and inadequate. There are various reasons why such mixing arrangements encounter problems. When the additive is injected in such a way, it may have a tendency to congregate at the top or bottom of the MFT stream depending on its density relative to MFT and the injection direction relative to the flow direction. For non-Newtonian fluids, such as Bingham fluids, the fluid essentially flows as a plug down the pipe with low internal turbulence in the region of the plug. Also, when the chemical additive reacts quickly with the MFT, a thin reacted region may form on the outside of the additive plug thus separating unreacted chemical additive and unreacted MFT.

Inadequate mixing can greatly decrease the efficiency of the chemical additive and even short-circuit the entire dewatering process. Inadequate mixing also results in inefficient use of the chemical additives, some of which remain unmixed and unreacted and cannot be recovered. Known techniques have several disadvantages including the inability to achieve a controlled, reliable or adequate mixing of the chemical additive as well as poor efficiency and flexibility of the process.

Still another factor is the technique of handling the oil sand tailings after chemical addition. If oil sand tailings are not handled properly, dewatering may be decreased or altogether prevented. In some past trials, handling was not managed or controlled and resulted in unreliable dewatering performance. Some techniques such as in CIBA's Canadian patent application No. 2,512,324 (Schaffer et al.) have attempted to simply inject the chemical into the pipeline without a methodology to reliably adapt to changing oil sand tailings compositions, flow rates, hydraulic properties or the nature of particular chemical additive. Relying solely on this ignores the complex nature of mixing and treating oil sand tailings and hampers the flexibility and reliability of the system. When the chemical addition and subsequent handling have been approached in such an uncontrolled, trial-and-error fashion, the dewatering performance has been unachievable.

Given the significant inventory and ongoing production of MFT at oil sands operations, there is a need for techniques and advances that can enable MFT drying for conversion into reclaimable landscapes.

SUMMARY OF THE INVENTION

The present invention responds to the above need by providing processes for drying oil sand fine tailings.

Accordingly, embodiments of the present invention provide a process for dewatering oil sand fine tailings. One embodiment of the process comprises (i) a dispersion and floc build-up stage comprising in-line addition of a flocculent solution comprising an effective amount of flocculation reagent into a flow of the oil sand fine tailings; (ii) a gel stage wherein flocculated oil sand fine tailings is transported in-line and subjected to shear conditioning; (iii) a floc breakdown and water release stage wherein the flocculated oil sand fine tailings releases water and decreases in yield shear stress, while avoiding an oversheared zone; (iv) depositing the flocculated oil sand fine tailings onto a deposition area to form a deposit and to enable the release water to flow away from the deposit.

In an optional aspect of the process, the stages (i), (ii) and (iii) are performed in a pipeline reactor. The pipeline reactor may include a co-annular injection device for inline injection of the flocculating fluid within the oil sand fine tailings.

In an optional aspect of the process, the flocculent solution is in the form of an aqueous solution in which the flocculation reagent is substantially entirely dissolved. The flocculation reagent preferably comprises a polymer that is shear-responsive in stage (i) thereby dispersing throughout the oil sand fine tailings, and enables shear-resilience during stages (ii) and (iii). The flocculation reagent may comprise a polymer flocculent that is selected according to a screening method including: providing a sample flocculation matrix comprising a sample of the oil sand fine tailings and an optimally dosed amount of a sample polymer flocculent; imparting a first shear conditioning to the flocculation matrix for rapidly mixing of the polymer flocculent with the sample of the oil sand fine tailings, followed by imparting a second shear conditioning to the flocculation matrix that is substantially lower than the first shear conditioning; determining the water release response during the first and second shear conditionings; wherein increased water release response provides an indication that the polymer flocculent is beneficial for the process. The water release response may be determined by measuring the capillary suction time (CST) of the flocculation matrix.

In an optional aspect of the process, the process also includes a step of measuring the capillary suction time (CST) of the flocculated oil sand fine tailings during stages (ii) and (iii) to determine a low CST interval; and managing the shear conditioning imparted to the flocculated oil sand fine tailings so as to ensure deposition of the flocculated tailings before entering the oversheared zone.

In an optional aspect of the process, the process also includes a step of measuring the shear yield stress of the flocculated oil sand fine tailings during stages (ii) and (iii); determining a gradual decrease zone following a plateau zone; and managing the shear conditioning in stages (ii), (iii) and (iv) to ensure depositing of the flocculated oil sand fine tailings within the gradual decrease zone before entering the oversheared zone.

In an optional aspect of the process, the shear conditioning is managed by at least one of adjusting the length of pipeline through which the flocculated oil sand fine tailings travels prior to depositing; and configuring a depositing device at the depositing step.

In an optional aspect of the process, step (iv) of depositing the flocculated oil sand fine tailings is performed within the gradual decrease zone of the yield shear stress and within the low CST interval.

In an optional aspect of the process, the flocculated oil sand fine tailings is deposited into a deposition cell having a sloped bottom surface that is sloped between about 1% and about 7%.

In an optional aspect of the process, the process also includes a step of working the deposit to spread the deposit over the deposition cell and impart additional shear thereto while avoiding the oversheared zone.

In an optional aspect of the process, the process also includes a step of providing the deposit with furrows that act as drainage paths. Preferably, substantially all of the furrows extend lengthwise in the same general direction as the sloped bottom surface.

In an optional aspect of the process, the deposition area comprises a multi-cell configuration of deposition cells. The deposition cells of the multi-cell configuration may be provided at different distances from the in-line addition of the flocculating fluid to enable varying the shear conditioning imparted to the flocculated oil sand fine tailings by varying the pipeline length prior to depositing. At least some of the deposition cells may be arranged in toe-to-toe relationship to share a common water drainage ditch.

In an optional aspect of the process, the process also includes a step of imparting sufficient hydraulic pressure to the oil sand fine tailings upstream of stage (i) so as to avoid downstream pumping.

In an optional aspect of the process, the stage (i) dispersion is further characterized in that the second moment M is between about 1.0 and about 2.0 at a downstream location about 5 pipe diameters from adding the flocculent solution.

In an optional aspect of the process, the deposit dewaters due to drainage or release of release water and evaporative drying, the drainage or water release accounting for at least about 60 wt % of water loss, and drainage occurring at a rate of at least about 1.4 wt % solids increase per day until the deposit reaches about 55 wt % to 60 wt % solids.

Also provided is a process for dewatering oil sand fine tailings, comprising: introducing an effective dewatering amount of a flocculent solution comprising a flocculation reagent into the fine tailings, to cause dispersion of the flocculent solution and commence flocculation of the fine tailings; subjecting the fine tailings to shear conditioning to cause formation and rearrangement of flocs and increasing the yield shear stress to form flocculated fine tailings, the shear conditioning being controlled in order to produce a flocculation matrix having aggregates and a porous network allowing release of water; allowing release water to flow away from the flocculated fine tailings prior to collapse of the porous network from over-shearing.

In an optional aspect of this process, the flocculated fine tailings may be deposited and may be done so to achieve a dewatering rate of at least 1.4 wt % solids increase per day.

Various embodiments, features and aspects of oil sand fine tailings drying process will be further described and understood in view of the figures and description.

BRIEF DESCRIPTION OF THE DRAWINGS

FIG. 16 is a schematic representation of treating mature fine tailings with a flocculent solution.

FIG. 17 is another schematic representation of treating mature fine tailings with a flocculent solution.

FIG. 32$b$ is a photograph of jar samples taken at each sample point in FIG. 32$a$ at ideal dosage and low shear.

DETAILED DESCRIPTION OF THE INVENTION

Figure 1:
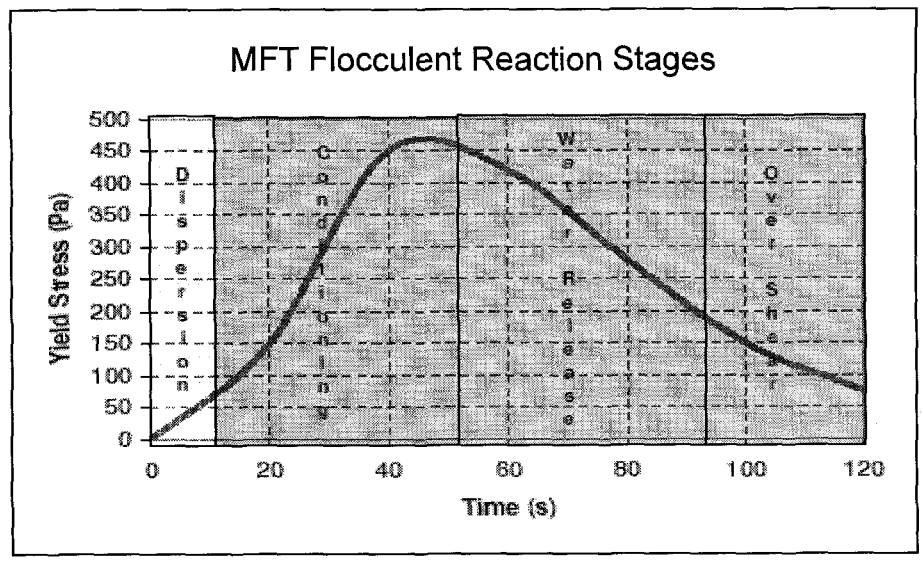
FIG. 1 is a general representative graph of shear yield stress versus time showing the process stages for an embodiment of the present invention.
Figure 2:
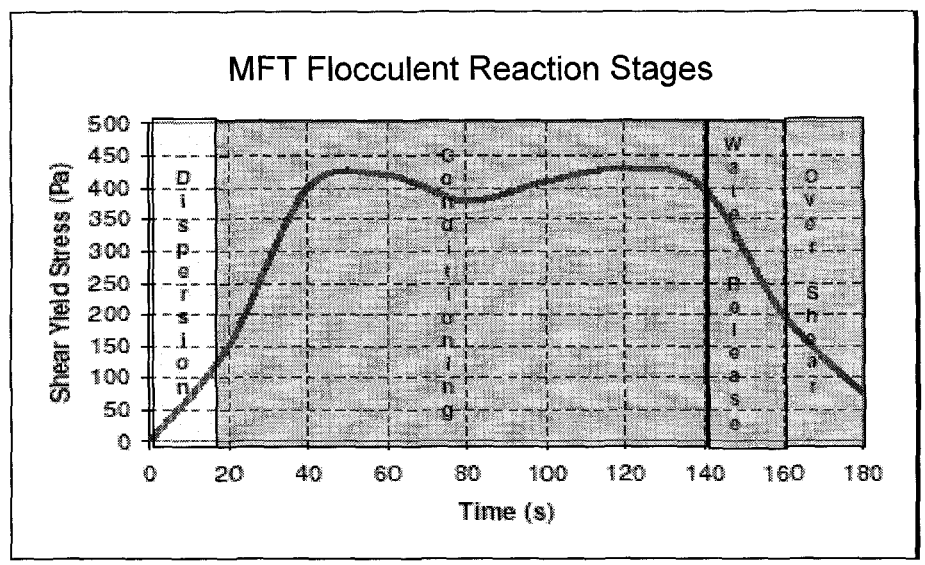
FIG. 2 is a general representative graph of shear yield stress versus time showing the process stages for another embodiment of the present invention.

Referring to FIGS. 1 and 2, the general stages of an embodiment of the process will be described. The oil sand fine tailings are treated with a flocculent solution by in-line dispersion of the flocculent solution into the fine tailings, then conditioning the fine tailings by inputting a sufficient energy to cause the formation and rearrangement of flocculated fine tailing solids to increase the yield shear strength while enabling water release without over-shearing the flocculated solid structure that can then form a generally non-flowing deposit. The flocculated fine tailings are deposited to allow the water release and the formation of a deposit which is allowed to dry.

The present specification should be read in light of the following definitions:

"Oil sand fine tailings" means tailings derived from oil sands extraction operations and containing a fines fraction. They include mature fine tailings from tailings ponds and fine tailings from ongoing extraction operations that may bypass a pond, and combinations thereof. In the present description, the abbreviation MFT will be generally used, but it should be understood that the fine tailings treated according the process of the present invention are not necessarily obtained from a tailings pond.

"In-line flow" means a flow contained within a continuous fluid transportation line such as a pipe or another fluid transport structure which preferably has an enclosed tubular construction.

"Flocculent solution comprising a flocculation reagent" means a fluid comprising a solvent and at least one flocculation reagent. The flocculent solution may contain a combination of different flocculation reagents, and may also include additional chemicals. The solvent preferably comprises water but may include other compounds as well, as desired. Flocculation reagents are compounds that have structures which form a bridge between particles, uniting the particles into random, three-dimensional porous structures called "flocs".

Thus, the flocculation reagents do not include chemicals that merely act electrostatically by reducing the repulsive potential of the electrical double layer within the colloid. The flocculation reagents have structures for forming floc arrangements upon dispersion within the MFT, the flocs being capable of rearranging and releasing water when subjected to a specific window of conditioning. The preferred flocculation reagents may be selected according to given process conditions and MFT composition.

"Molecular weight" means the average molecular weight determined by measurement means known in the art.

"Dispersion", as relates to the flocculent solution being introduced into the in-line flow of MFT, means that upon introduction within the MFT the flocculent solution transitions from droplets to a dispersed state sufficient to avoid under-reacting or over-reacting in a localized part of the MFT which would impede completion of the flocculation in the subsequent conditioning stage to reliably enable dewatering and drying.

"Flocculation conditioning" is performed in-line and involves the flocculation reagent reacting with the MFT solids to form flocs and through rearrangement reactions increase the strength of the flocculating MFT.

"Water release conditioning" means that energy is input into the flocculated MFT so as to initiate rearrangement and breakdown of the structure to release water from the flocculated matrix. The energy input may be performed by in-line shearing or by other means. "Release of water" in this context means that water selectively separates out of the flocculated MFT matrix while leaving the flocs sufficiently intact for deposition.

"Over-shearing", which is a stage that defines the limit of the water release conditioning stage and is to be avoided, means that additional energy has been input into the flocculated MFT resulting in dispersing the structure and resuspending the fines within the water. Over-sheared MFT releases and resuspends fines and ultrafines entrapped by the flocs back into the water, essentially returning to its original fluid properties but containing non-functional reagent.

"Non-flowing fine tailings deposit" means a deposited flocculated MFT that has not been over-sheared and has sufficient strength to stand while drying. While the water release from the flocs is triggered by conditioning, the MFT deposit may have parts that continue to release water after it has been deposited. The drying of the MFT deposit may then occur by gravity drainage, evaporation and permeation. The removal of water from the flocculated MFT may also occur before deposition, for instance when a stream of release water separates from the flocculated MFT upon expelling for deposition. Upon deposition, deposits may undergo some amount of movement or flow, before coming to a standstill.

"Yield shear strength" means the shear stress or pressure required to cause the MFT to flow.

It should be noted that in the present description, the terms "yield shear strength", "yield shear stress", "yield strength", "yield stress", "strength", "stress" and similar such terms are sometimes used interchangeably.

"Deposition area" means an area where the flocculated MFT is deposited and can take the form of a beach leading back into a tailings pond, a deposition cell that may have defined side walls, or another type of natural, synthetic or constructed surface for receiving the flocculated MFT.

In one embodiment of the process of the present invention, the oil sand fine tailings are primarily MFT obtained from tailings ponds given the significant quantities of such material to reclaim. The raw MFT may be pre-treated depending on the downstream processing conditions. For instance, oversized materials may be removed from the raw MFT. In addition, specific components of the raw MFT may be selectively removed depending on the flocculation reagent to be used. For instance, when a cationic flocculation reagent is used, the raw MFT may be treated to reduce the residual bitumen content which could cause flocculent deactivation. The raw MFT may also be pre-treated to provide certain solids content or fines content of the MFT for treatment or hydraulic properties of the MFT. More regarding possible pre-treatments of the raw MFT will be understood in light of descriptions of the process steps herein below. The fine tailings may also be obtained from ongoing oil sand extraction operations. The MFT may be supplied from a pipeline or a dedicated pumped supply.

In one embodiment, the process is conducted in a "pipeline reactor" followed by deposition onto a deposition area. The pipeline reactor may have various configurations, some of which will be described in detail herein below.

Figure 3:
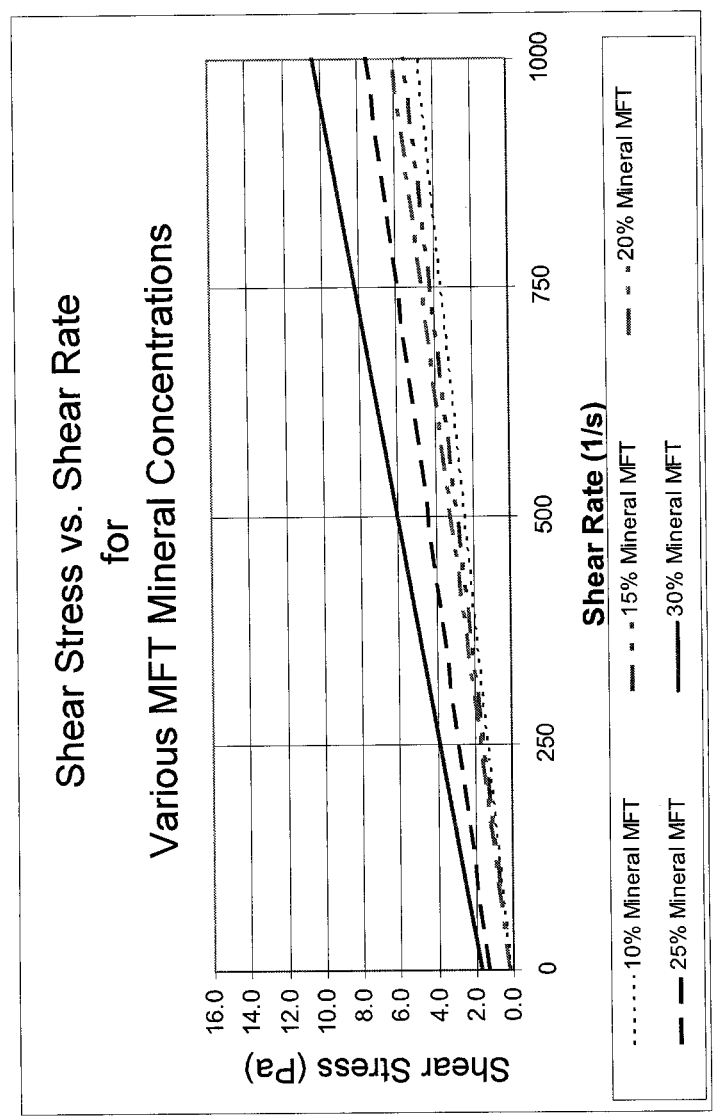
FIG. 3 is a graph showing the relationship between shear stress and shear rate for an MFT sample, illustrating the non-Newtonian nature of MFT at higher solids contents.

The MFT to be treated is preferably provided as an in-line flow in an upstream part of the pipeline reactor. The properties of the MFT and its particular flow characteristics will significantly depend on its composition. At low mineral concentrations the yield stress to set the MFT fluid in motion is small and hydraulic analysis can approximate the fluid behaviour of a Newtonian fluid. However, as mineral concentration increases a yield stress must be overcome to initiate flow. These types of fluids are a class of non-Newtonian fluids that are generally fitted by models such as Bingham fluid, Herschel-Bulkley yield-power law or Casson fluid. The rheological relationship presented in FIG. 3, illustrating a yield stress response to shear rate for various mineral concentrations in a MFT sample, considers MFT as a Bingham fluid. MFT may also be modelled in viscometric studies as a Herschel-Bulkley fluid or a Casson Fluid.

Empirical data and modelling the rheology of in-line MFT have confirmed that when a flocculent solution is added by conventional side injection into a Bingham fluid MFT, solution dispersion is very sensitive to flow rate and diameter ratios as well as fluid properties.

In one aspect of the process, particularly when the flocculent solution is formulated to behave as a non-Newtonian fluid, the dispersion stage is performed to cause rapid mixing between two non-Newtonian fluids. Rapid non-Newtonian mixing may be achieved by providing a mixing zone which has turbulence eddies which flow into a forward-flow region and introducing the flocculent solution such that the turbulence eddies mix it into the forward-flow region. Preferably, the flocculent solution is introduced into the turbulence eddies and then mixes into the forward-flow region.

Figure 4:
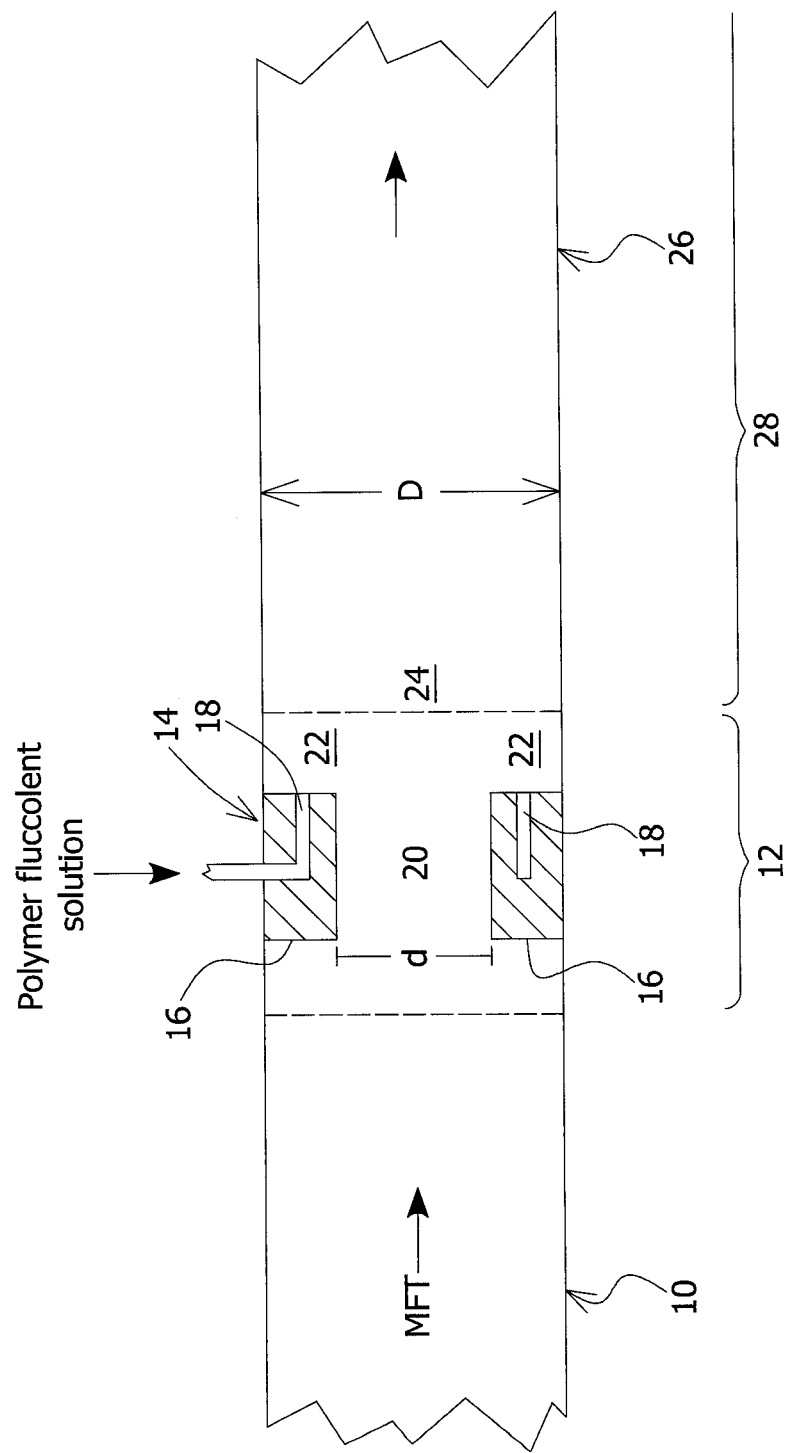
FIG. 4 is a side cross-sectional view of a pipeline reactor for performing embodiments of the process of the present invention.
Figure 5:
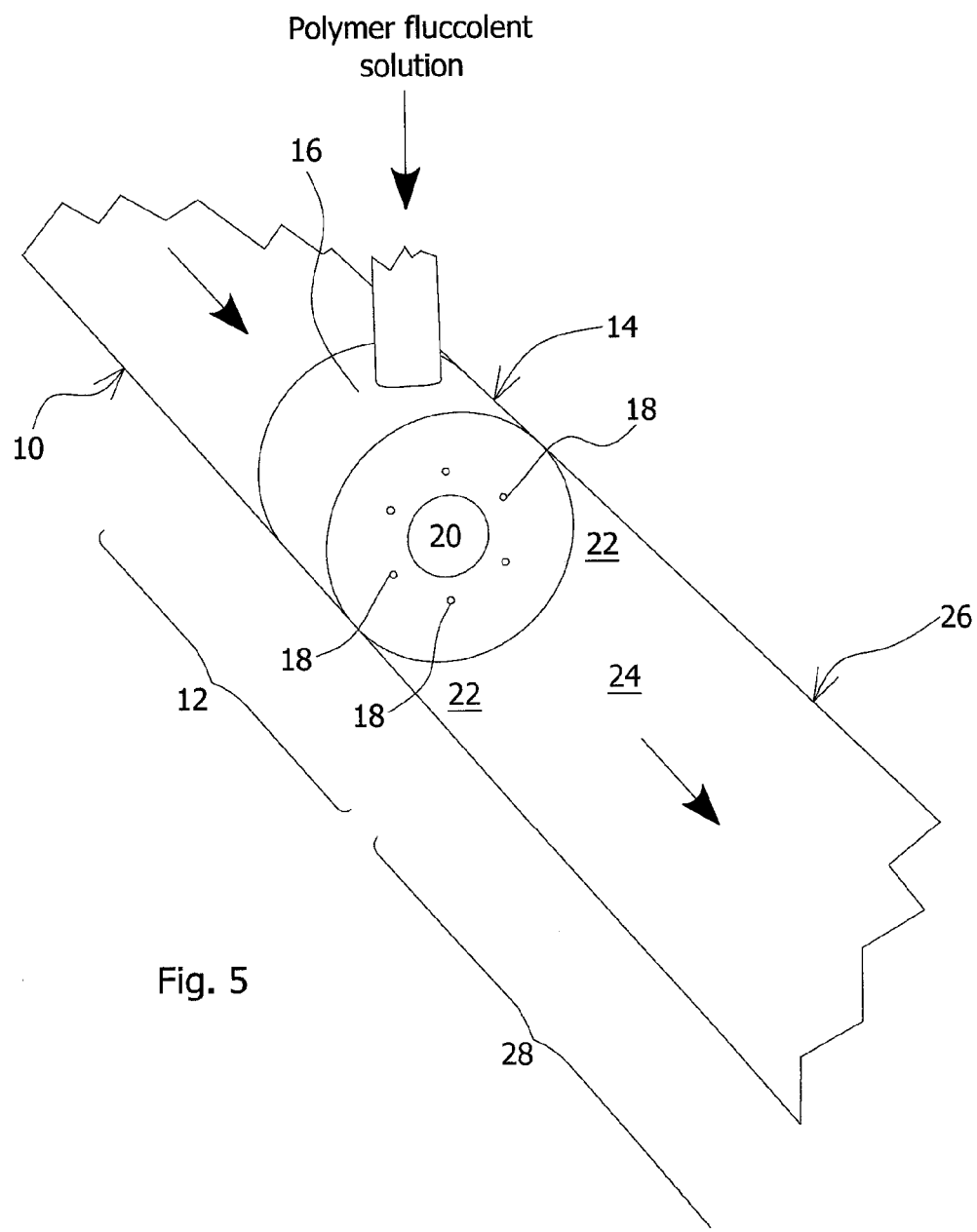
FIG. 5 is a partial perspective transparent view of a pipeline reactor for performing embodiments of the process of the present invention.

FIGS. 4 and 5 illustrate a pipeline reactor design that enables such rapid mixing of non-Newtonian fluids. The MFT is supplied from an upstream pipeline 10 into a mixing zone 12. The mixing zone 12 comprises an injection device 14 for injecting the flocculent solution. The injection device may also be referred to as a "mixer". The injection device 14 may comprise an annular plate 16, injectors 18 distributed around the annular plate 16 and a central orifice 20 defined within the annular plate 16. The MFT accelerates through the central orifice 20 and forms a forward-flow region 24 and an annular eddy region 22 made up of turbulence eddies. The injectors 18 introduce the flocculent solution directly into the eddy region 22 for mixing with the turbulent MFT. The recirculation of the MFT eddies back towards the orifice 20 results in mixing of the flocculent solution into the MFT forward-flow. The forward-flow region 24 expands as it continues along the downstream pipe 26. For some mixer embodiments, the forward-flow region may be a vena-contra region of a jet stream created by an orifice or baffle. The main flow of the MFT thus draws in and mixes with the flocculent solution, causing dispersion of the flocculent solution, and flocculation thus commences in a short distance of pipe. The injection device 14 illustrated in FIGS. 4 and 5 may also be referred to as an "orifice mixer". For the mixer of FIGS. 4 and 5, the preferred range of orifice diameter "d" to downstream pipe diameter "D" is 0.25-0.75.

Figure 6:
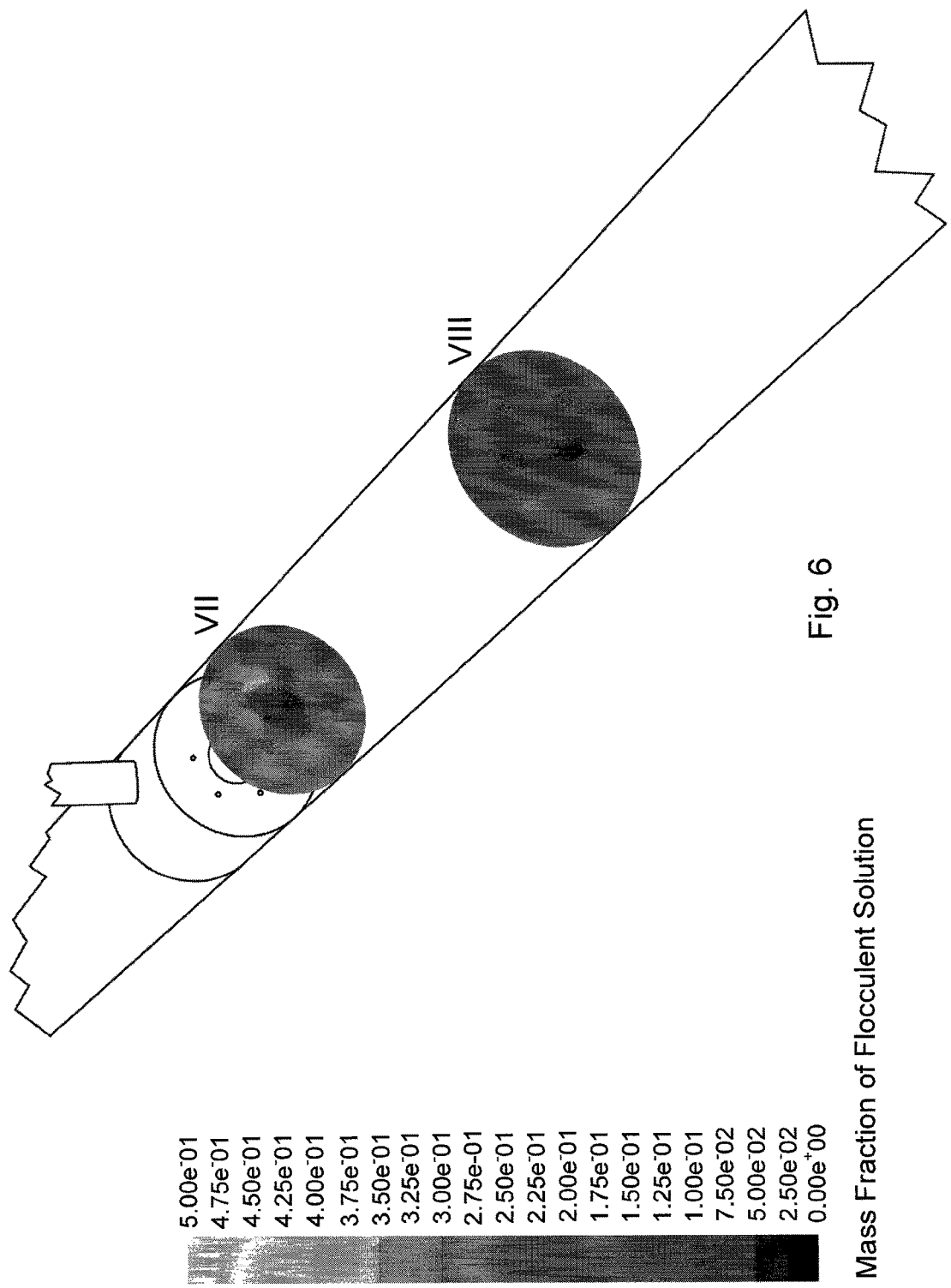
FIG. 6 is a partial perspective transparent view of the pipeline reactor of FIG. 5 with cross-sections representing the relative concentration of flocculent solution and MFT at two different distances from the injection location.
Figure 7:
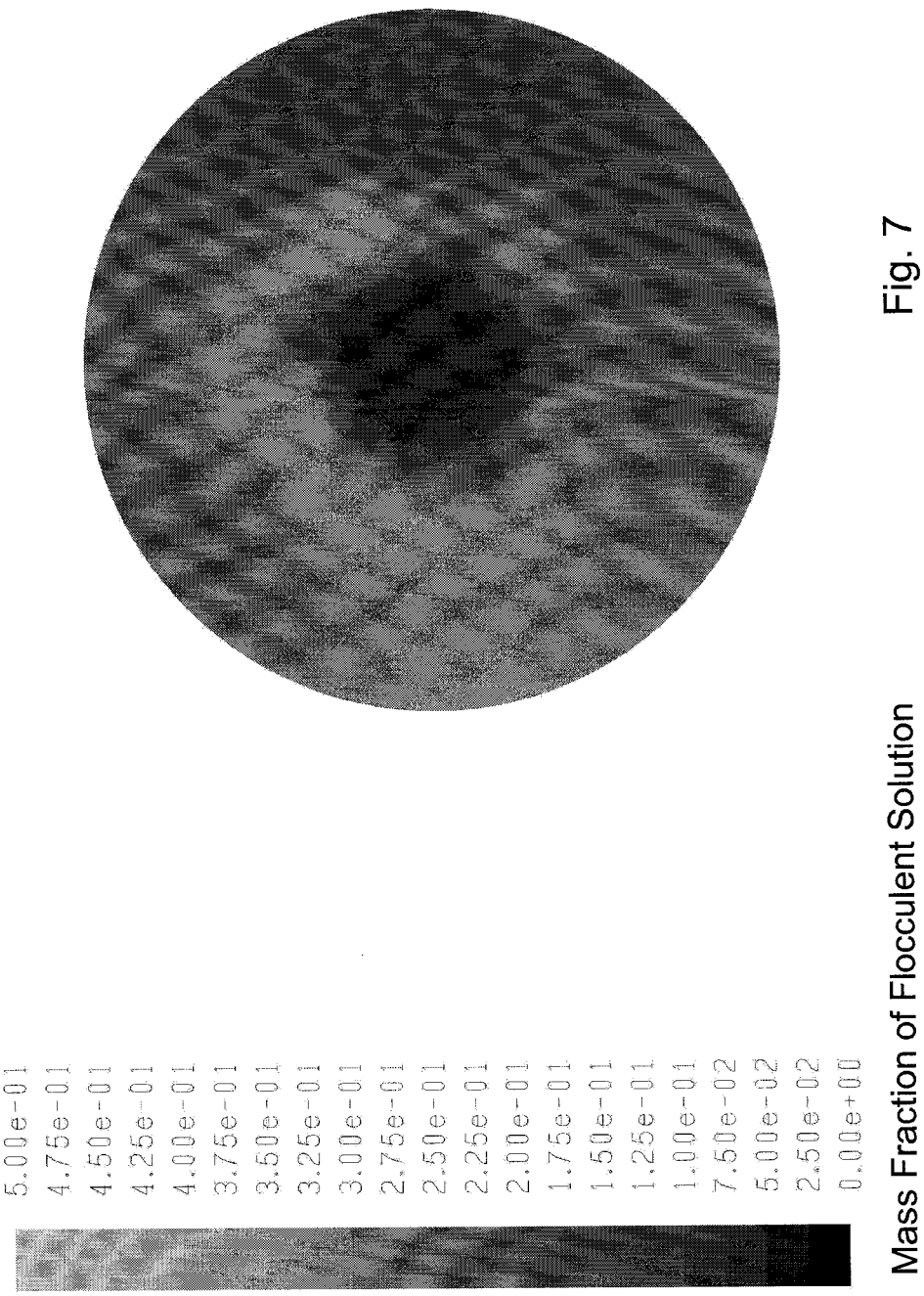
FIG. 7 is a close-up view of section VII of FIG. 6.
Figure 8:
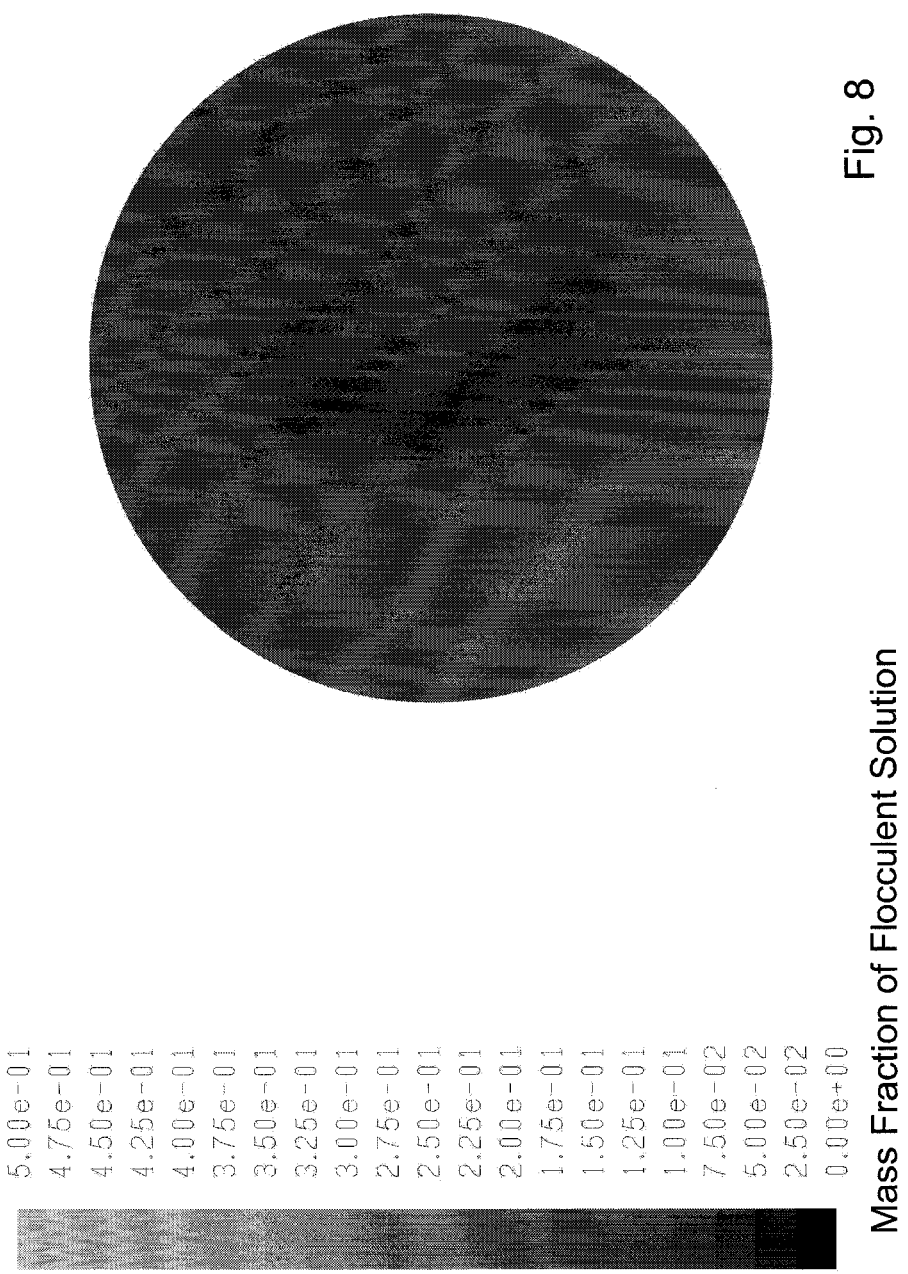
FIG. 8 is a close-up view of section VIII of FIG. 6.

FIGS. 6-8 illustrate the performance of an orifice mixer based on computational fluid dynamic (CFD) modeling and empirical data obtained from a test installation on a MFT pipeline reactor. The MFT flow rate in a 2 inch diameter pipe was 30 LPM and flocculent solution was injected at about 3 LPM. The 2 inch long orifice mixer had an orifice to downstream pipe diameter ratio d/D=0.32 with six 0.052 inch diameter injectors located on a 1.032 inch diameter pitch circle. Due to the density difference between the MFT and flocculent solution, a useful method of characterizing the degree of mixing is to determine the second moment M of the concentration C over the pipe cross section A in the following equation where $\overline{C}$ is the mean concentration for the fully mixed case (thus directionally M=0 is desired).

$$M = \frac{1}{A}\int_A \left(\frac{C}{\overline{C}} - 1\right)^2 dA$$

In FIGS. 6-8, the dark areas represent MFT that has not mixed with the flocculent solution (referred to hereafter as "unmixed MFT"). Just downstream of the mixer, the unmixed MFT region is limited to the central core of the pipe and is surrounded by various flocculent solution-MFT mixtures indicative of local turbulence in this zone. As the flocculent solution is miscible in MFT, the jetting of the flocculent solution into the turbulent zone downstream may cause the flocculent solution to first shear the continuous phase into drops from which diffusion mixing disperses the flocculent into the MFT.

The CFD model was based on a Power-law-fluid for the flocculent solution and a Bingham-fluid for the MFT without reactions. The Bingham-fluid approximation takes into account the non-Newtonian nature of the MFT as requiring a yield stress to initiate flow. Bingham-fluids are also time-independent, having a shear stress independent of time or duration of shear. In some optional embodiments, the CFD model may be used to determine and improve initial mixing between the flocculent solution and the MFT as well as other aspects of the process.

Figure 9:
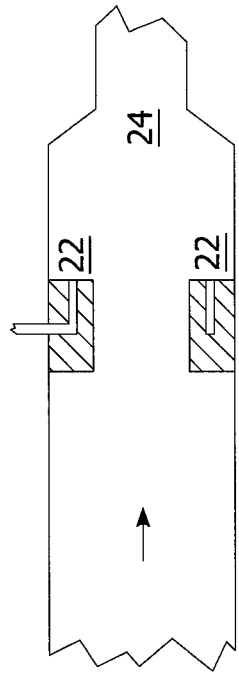
FIG. 9 is a side cross-sectional view of a variant of a pipeline reactor for performing embodiments of the process of the present invention.
Figure 10:
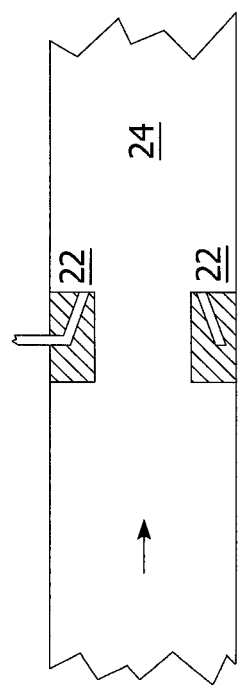
FIG. 10 is a side cross-sectional view of another variant of a pipeline reactor for performing embodiments of the process of the present invention.
Figure 11:
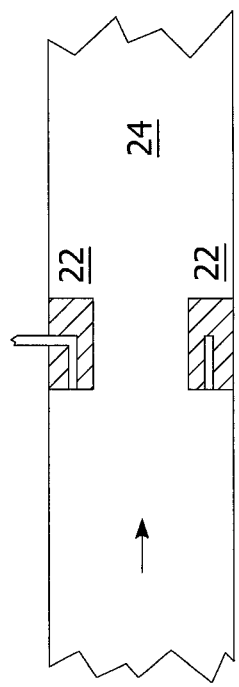
FIG. 11 is a side cross-sectional view of another variant of a pipeline reactor for performing embodiments of the process of the present invention.
Figure 12:
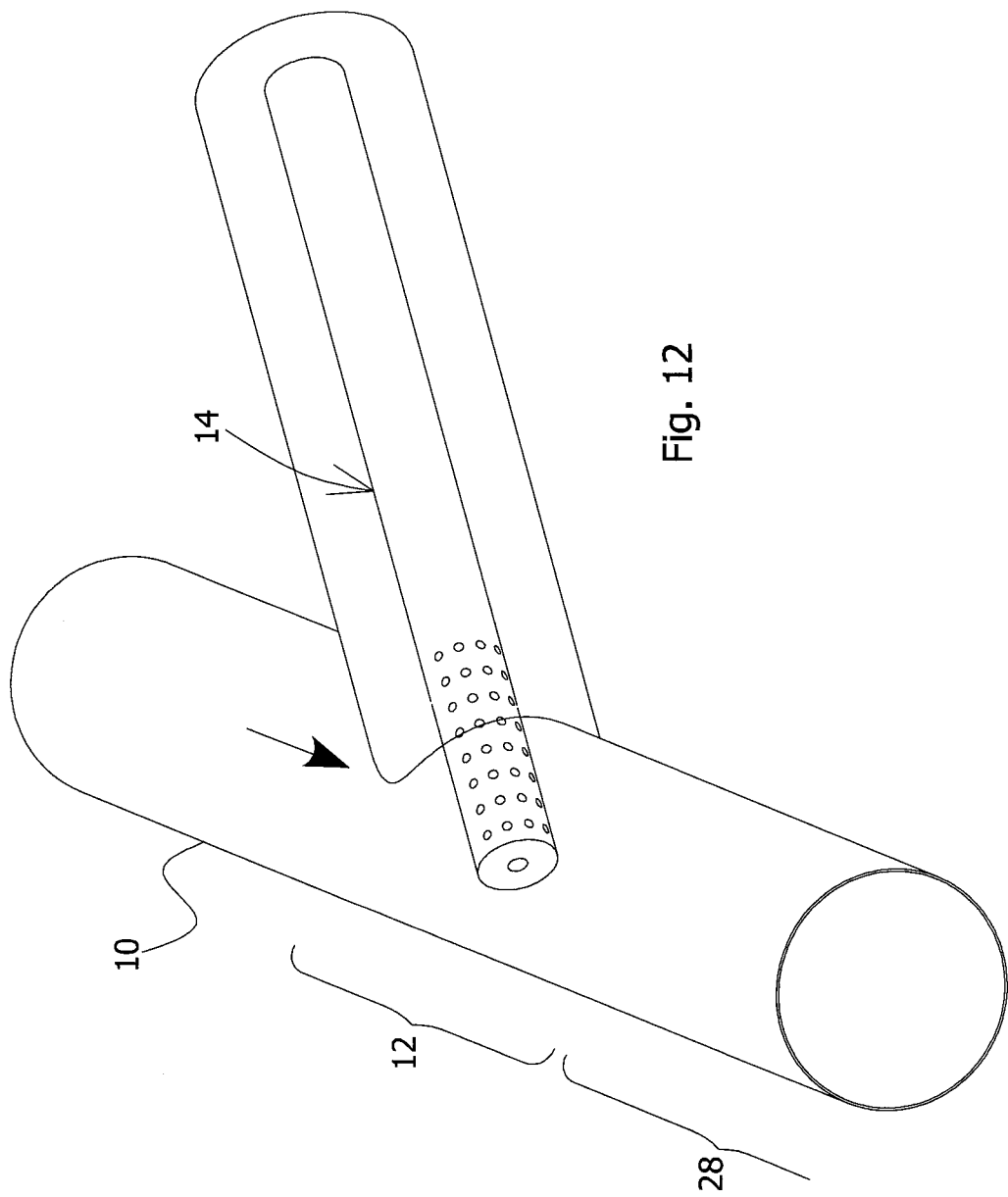
FIG. 12 is a partial perspective transparent view of yet another variant of a pipeline reactor for performing embodiments of the process of the present invention.

The injection device 14 may have a number of other arrangements within the pipeline reactor and may include various elements such as baffles (not shown). In one optional aspect of the injection device shown in FIG. 9, at least some of the injectors are oriented at an inward angle such that the flocculent solution mixes via the turbulence eddies and also jet toward the core of the MFT flow. In another aspect shown in FIG. 10, the orifice has a reduced diameter and the injectors may be located closer to the orifice than the pipe walls. The injectors of the mixer may also be located at different radial distances from the centre of the pipeline. In another aspect, instead of an annular plate with a central orifice, the device may comprise baffles or plates having one or multiple openings to allow the MFT to flow through the mixing zone while creating turbulence eddies. In another aspect shown in FIG. 11, the injectors face against the direction of MFT flow for counter-current injection. FIG. 12 illustrates another design of injection device that may be operated in connection with the process of the present invention. It should also be noted that the injection device may comprise more than one injector provided in series along the flow direction of the pipeline. For instance, there may be an upstream injector and a downstream injector having an arrangement and spacing sufficient to cause the mixing. In a preferred aspect of the mixing, the mixing system allows the break-up of the plug flow behaviour of the Bingham fluid, by means of an orifice or opposing "T" mixer with MFT and flocculent solution entering each arm of the Tee and existing down the trunk. Density differentials (MFT density depends on concentration ~30 wt % corresponds to a specific gravity of ~1.22 and the density of the flocculent solution may be about 1.00) together with orientation of the injection nozzles play a role here and are arranged to allow the turbulence eddies to mix in and disperse the flocculent solution.

The following table compares the second moment values for the orifice mixer (FIG. 4) and a quill mixer (FIG. 12) at various locations downstream of the injection location for the same flows of MFT and flocculent reagent solution.

| Downstream Distance | M | |
| --- | --- | --- |
| L/D | Orifice Mixer (FIG. 4) | Quill Mixer (FIG. 12) |
| 1 | 11.75 | 5.75 |
| 2 | 3.17 | 3.65 |
| 3 | 1.75 | 2.89 |
| 5 | 1.10 | 2.24 |
| 10 | 0.65 | 1.39 |

Near to the injection point of the orifice mixer as shown on FIG. 7, there is a larger region of unmixed polymer surrounding a strong MFT jet with a "M" value of 11.75. However, the mixing with the MFT jet occurs very rapidly so that by 5 diameters downstream of the injection point shown as FIG. 8 with a second moment M value of 1.10. In contrast, for the quill mixer as shown FIG. 12, the initial mixing with a second moment M value of 5.75 only improves to 2.24 by 5 diameters downstream of the injection point. Mixing by the orifice mixer is preferred to the quill mixer.

Preferably, the mixing is sufficient to achieve an M<2 at L/D=5, and still preferably the mixing is sufficient to achieve an M<1.5 at L/D=5, for the pipeline reactor. Controlling the mixing at such preferred levels allows improved dispersion, flocculation and dewatering performance.

Initial mixing of the flocculent solution into the MFT is important for the flocculation reactions. Upon its introduction, the flocculent solution is initially rapidly mixed with the fine tailings to enhance and ensure the flocculation reaction throughout the downstream pipeline. When the flocculent solution contacts the MFT, it starts to react to form flocs made up of many chain structures and MFT minerals. If the flocculent solution is not sufficiently mixed upon introduction into the pipe, the flocculation reaction may only develop in a small region of the in-line flow of tailings. Consequently, if the tailings are subsequently mixed downstream of the polymer injection, mixing will be more difficult since the rheology of the tailings will have changed. In addition, the flocs that formed initially in the small region can be irreversibly broken down if subsequent mixing imparts too much shear to the flocs. Over-shearing the flocs results in resuspending the fines in the water, reforming the colloidal mixture, and thus prevents water release and drying. Thus, if adequate mixing does not occur upon introduction of the flocculent solution, subsequent mixing becomes problematic since one must balance the requirement of higher mixing energy for flocculated tailings with the requirement of avoiding floc breakdown from over-shearing.

The initial mixing may be achieved and improved by a number of optional aspects of the process. In one aspect, the injection device is designed and operated to provide turbulence eddies that mix and disperse the flocculent solution into the forward flow of MFT. In another aspect, the flocculation reagent is chosen to allow the flocculent solution to have decreased viscosity allowing for easier dispersion. The flocculent solution may also be formulated and dosed into the MFT to facilitate dispersion into the MFT. Preferably, the flocculation reagent is chosen and dosed in conjunction with the injection conditions of the mixer, such that the flocculent solution contains sufficient quantity of reagent needed to react with the MFT and has hydraulic properties to facilitate the dispersion via the mixer design. For instance, when a viscous flocculent solution displaying plastic or pseudo-plastic non-Newtonian behaviour is used, the mixer may be operated at high shear injection conditions to reduce the viscosity sufficiently to allow dispersion into the MFT at the given hydraulic mixing conditions. In yet another aspect, the flocculation reagent is chosen to be shear-responsive upon mixing and to form flocs having increased shear resistance. Increased shear resistance enables more aggressive, harsh mixing and reduces the chance of premature over-shearing of the resulting flocs. The increased shear resistance may be achieved by providing the flocculent with certain charge characteristics, chain lengths, functional groups, or inter- or intra-linking structures. In another aspect, the flocculation reagent is chosen to comprise functional groups facilitating shear mixing, rearrangement and selective water release. In another aspect, the flocculation reagent is chosen to form large flocs facilitating rearrangement and partial breakdown of the large flocs for water release. In another aspect, the flocculation reagent may be an organic polymer flocculent. The polymer flocculent may have a high molecular weight, such as above 10,000,000, or a low molecular weight. The high molecular weight polymers may tend to form more shear resistant flocs yet result in more viscous flocculent solutions at the desired dosages. Thus, such flocculent solutions may be subjected to higher shear injection to reduce the viscosity and the turbulence eddies may be given size and spacing sufficient to disperse the flocculent solution within the pipeline mixing zone.

In some optional aspects, the flocculation reagent may be chosen and dosed in response to the clay concentration in the MFT. The flocculation reagent may be anionic, cationic, non-ionic, and may have varied molecular weight and structure, depending on the MFT composition and the hydraulic parameters.

It should be noted that, contrary to conventional teachings in the field of MFT solidification and reclamation, the improvement and predictability of the drying process rely more in the process steps than in the specific flocculation reagent selected. Of course, some flocculation reagents will be superior to others at commercial scale, depending on many factors. However, the process of the present invention enables a wide variety of flocculation reagents to be used, by proper mixing and conditioning in accordance with the process steps. By way of example, the flocculent reagent may be an organic polymer flocculent. They may be polyethylene oxides, polyacrylamides, anionic polymers, polyelectrolytes, starch, co-polymers that may be polyacrylamide-polyacrylate based, or another type of organic polymer flocculents. The organic polymer flocculents may be obtained from a flocculent provider and subjected to selection to determine their suitability and indication toward the specific commercial application.

Nevertheless, some polymer reagents may be preferred. In an optional aspect, the polymer flocculent is shear-responsive during stage (i) and shear-resilient during stages (ii) and (iii). Thus, the polymer solution is able to rapidly mix with the MFT upon injection in response to high shear conditions, and then provide a certain amount of shear resilience to allow formation and rearrangement of the flocs and avoid premature or rapid floc breakdown within the downstream pipeline in response to wall shear stress. The polymer flocculent may have some monomers that enable the shear responsiveness in the mixing stage and other monomers or structures that enable shear resilience during the subsequent stages. The shear responsiveness may be enabled by a polymer solution's low viscosity at high polymer dosage, thus low viscosity polymer solutions may be preferred. At the same time, the shear resilience may be enabled by structural features of the polymer for resisting shear breakdown under shear conditions that are experienced from pipelining.

In one optional aspect, the polymer flocculent may be selected according to a screening and identification method. The screening method includes providing a sample flocculation matrix comprising a sample MFT and an optimally dosed amount of a sample polymer flocculent. Preferably, the sample MFT is identical or representative of the MFT to be treated, e.g. from the same pond and same location. The method then includes imparting a first shear conditioning to the flocculation matrix for rapidly mixing the polymer flocculent with the sample of the oil sand fine tailings, followed by imparting a second shear conditioning to the flocculation matrix that is substantially lower than the first shear conditioning. This may be performed by mixing the matrix with an impeller at two RPMs, e.g. 230 rpm and then 100 rpm, which respectively simulate rapid dispersion and pipeline conditioning. One determines the water release response during the first and second shear conditionings, preferably by measuring the CST. An increased water release response provides an indication that the polymer flocculent may be preferred for use in the process.

In some optional aspects of the process, the flocculation reagent may be a polymer flocculent with a high molecular weight. The polymer flocculent is preferably anionic in overall charge, preferably approximately 30% anionicity, which may include certain amounts of cationic monomer and may be amphoteric. The polymer flocculent is preferably water-soluble to form a solution in which the polymer is completely dissolved. It is also possible that the polymer is mostly or partly dissolved in the solution. The polymer flocculent may be composed of anionic monomers selected from ethylenically unsaturated carboxylic acid and sulphonic acid monomers, which may be selected from acrylic acid, methacrylic acid, allyl sulphonic acid and 2-acrylamido-2-methyl propane sulphonic acid (AMPS), etc., and the salts of such monomers; non-ionic monomers selected from acrylamide, methacrylamide, hydroxy alkyl esters of methacrylic acid, N-vinyl pyrrolidone, acrylate esters, etc.; and cationic monomers selected from DMAEA, DMAE-A.MeCl, DADMAC, ATPAC and the like. The polymer flocculent may also have monomers enabling interactions that results in higher yield strength of the flocculated MFT. In this regard, it is known that synthetic polymers used as thickeners in various industries, such as mining, have hydrophobic groups to make associative polymers such that in aqueous solution the hydrophobic groups join together to limit water interactions and stick together to provide a desired shear, yield stress or viscosity response in solution and when reacted with the MFT. The polymer flocculent may also have a desired high molecular weight, preferably over 10,000,000, for preferred flocculation reactivity and dewatering potential. The polymer flocculent may be generally linear or may be branched by the presence of branching agent providing a number of branching or cross-linking structures according to the desired shear and process response and reactivity with the given MFT.

In a preferred aspect of the process, the polymer flocculent may be a high molecular weight branched anionic polymer such as a polyacrylamide-sodium polyacrylate copolymer with about 20-35% anionicity, still preferably about 30% anionicity.

Figure 13:
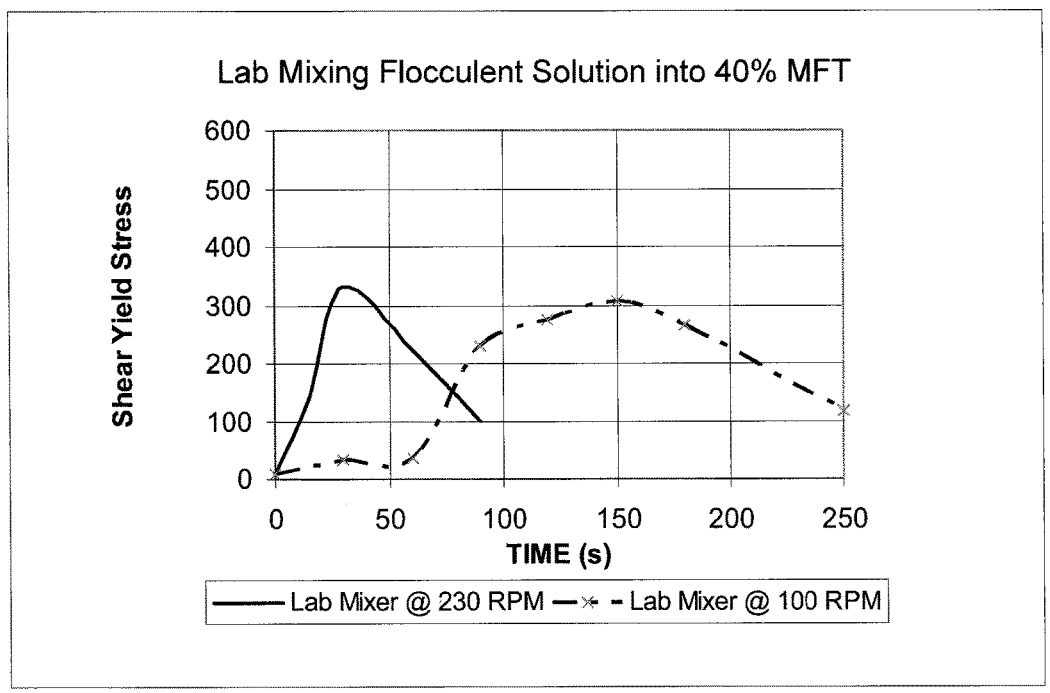
FIG. 13 is a graph of shear yield stress versus time comparing different mixing speeds in a stirred tank for mature fine tailings treated with flocculent solution.

Initial mixing was further assessed in a conventional stirred mix tank by varying the initial speed of the mixer. FIG. 13 presents indicative lab test results comparing rapid mixing (230 RPM) and slow mixing (100 RPM). The test results with the mixer at the higher initial speed developed flocculated MFT with a higher shear yield strength significantly faster than tests with the mixer at a lower speed. For the lower speed, the time delay was attributable to dispersing the flocculent solution into the MFT. Moreover, FIG. 14 indicates that the fast initial mixing also resulted in higher initial water release rates, which results in reduced drying times.

Figure 23:
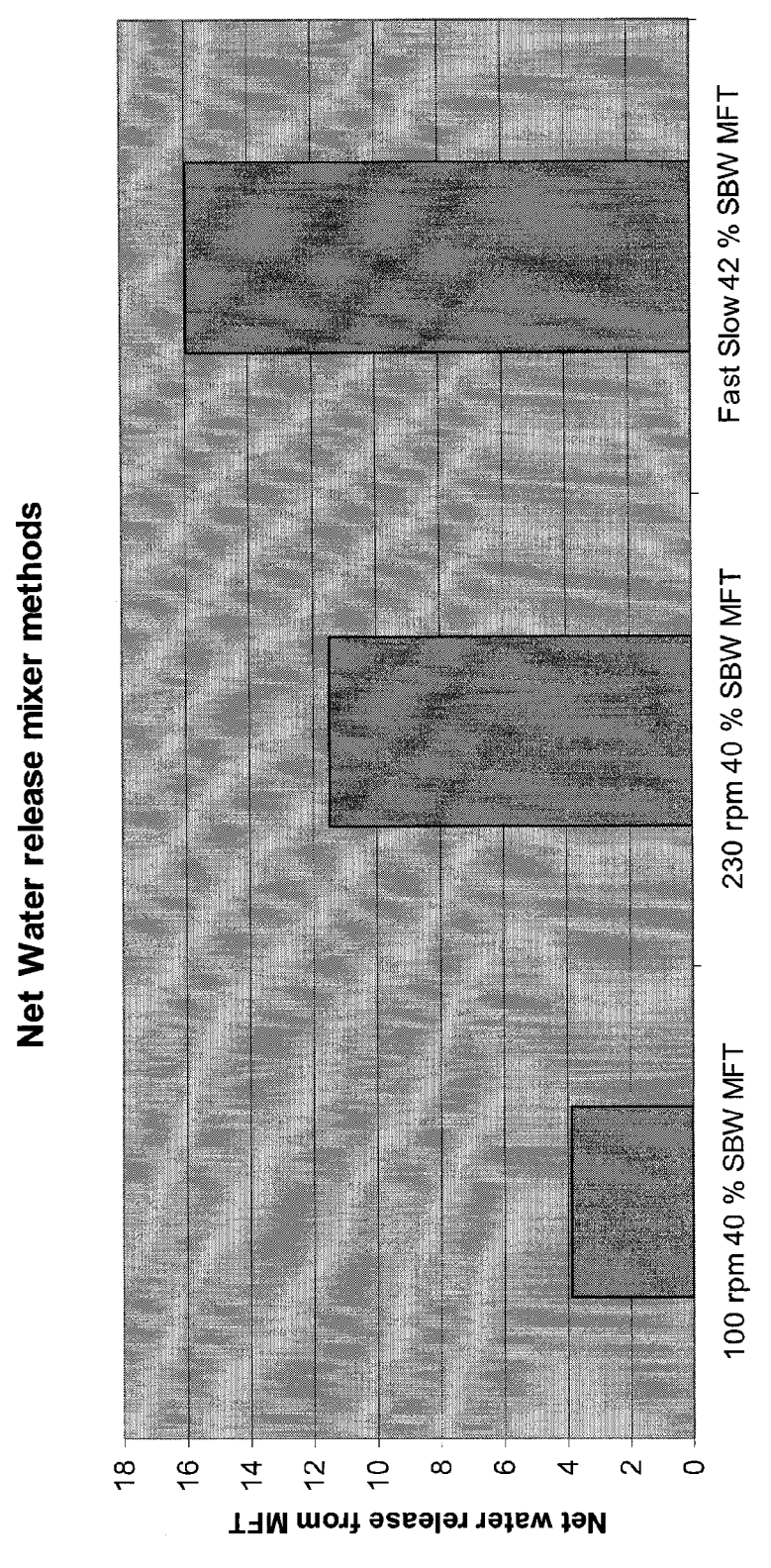
FIG. 23 is a bar graph of water release percentage versus mixing speed regimes for mature fine tailings treated with flocculent solution, particularly a comparison of mixer methods and initial net water release, where net water release is water release after all the water added by the polymer is released and all doses are 1000 PPM.
Figure 24:
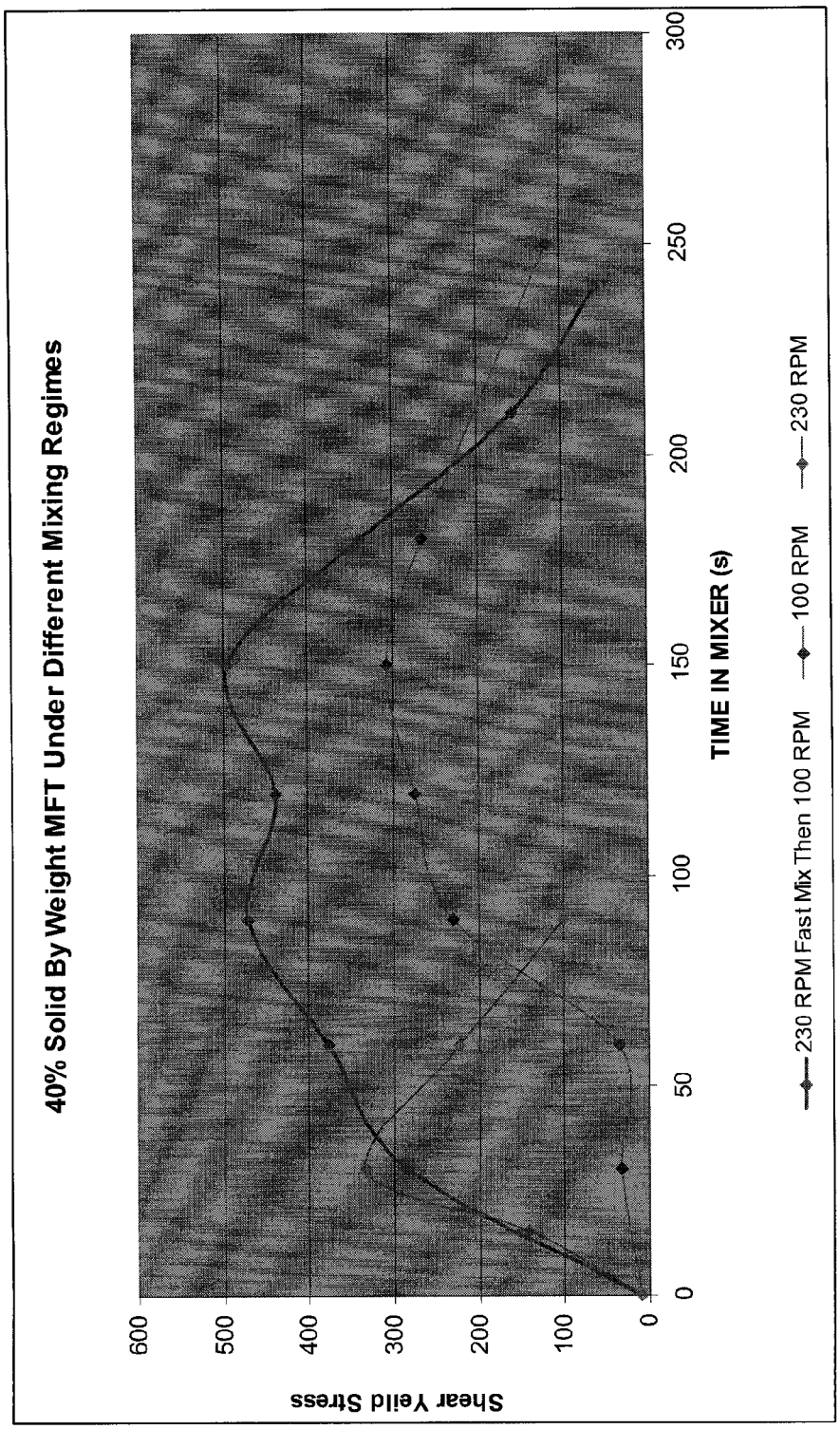
FIG. 24 is a graph of shear yield stress versus time comparing different mixing speed regimes in a stirred tank for mature fine tailings treated with flocculent solution, particularly yield stresses of 100 rpm, 230 rpm and fast-slow mixing.

Referring briefly to FIGS. 23 and 24, it can be seen that rapid initial mixing at high shear followed by a lower shear regime results in higher net water release from the flocculated material upon deposition compared to slow or fast mixing used alone.

While the lab scale stirred tank demonstrated benefits from fast mixing, other results also demonstrated the effect of over-mixing or over-shearing, which would break down the flocculated MFT such that the MFT would not dewater. The lab scale stirred tank is essentially a batch back-flow reactor in which the mixer imparts shear firstly to mix the materials and secondly to maintain the flocculating particles in suspension while the reactions proceed to completion. As the operational parameters can be easily adjusted, the stirred tank provides a valuable tool to assess possible flocculation reagent performance. Lab scale stirred tank data may be advantageously coupled with lab pipeline reactor tests and CFD modelling for selecting particular operating parameters and flocculation reagents for embodiments of the continuous in-line process of the present invention.

The MFT supplied to the pipeline reactor may be instrumented with a continuous flow meter, a continuous density meter and means to control the MFT flow by any standard instrumentation method. There may also be pressure sensors enabling monitoring the pressure drop over pipe sections to help inform a control algorithm. An algorithm from the density meter may compute the mineral concentration in MFT and as an input to the flow meter determine the mass flow of mineral into the pipeline reactor. Comparing this operating data to performance data for the pipeline reactor developed from specific flocculation reagent properties, specific MFT properties and the specific pipeline reactor configurations, enables the adjustment of the flowrate to improve processing conditions for MFT drying. Operations with the mixer in a 12 inch pipe line processing 2000 USgpm of MFT at 40% solids dewatered MFT with a pipe length of 90 meters.

Referring back to FIGS. 4 and 5, after introduction of the flocculation reagent in the mixing zone 12, the flocculating MFT continues into a conditioning zone 28. In some aspects described below, the conditioning stage of the process will be generally described as comprising two main parts: flocculation conditioning and water release conditioning.

At this juncture, it is also noted that for Newtonian fluid systems, research into flocculated systems has developed some tools and relationships to help predict and design processes. For instance, one relationship that has been developed that applies to some flocculated systems is a dimensionless number called the "Camp number". The Camp number relates power input in terms of mass flow and friction to the volume and fluid absolute viscosity. In non-Newtonian systems such as MFT-polymer mixing both pipe friction and the absolute viscosity terms used in the Camp number depend on the specific flow regime. The initial assessment of the pipeline conditioning data implies the energy input may be related to a Camp number or a modified Camp number. The modified Camp number would consider the flocculating agent, the rheology of the flocculated MFT in addition to the flow and friction factors.

Flocculation conditioning preferably occurs in-line to cause formation and rearrangement of flocs and increases the yield shear stress of the MFT. Referring to FIGS. 4 and 5, once the MFT has gone through the mixing zone 12, it passes directly to the flocculation conditioning zone 28 of the pipeline reactor. The flocculation conditioning zone 28 is generally a downstream pipe 26 with a specific internal diameter that provides wall shear to the MFT. In one aspect of the process, the flocculation conditioning increases the yield shear stress to an upper limit. The upper limit may be a single maximum as shown in FIG. 1 or an undulating plateau with multiple local maximums over time as shown in FIG. 2. The shape of the curve may be considered a primary function of the flocculent solution with secondary functions due to dispersion and energy input to the pipeline, such as via baffles and the like.

Water release conditioning preferably occurs in-line after the flocculation conditioning. Referring to FIGS. 1 and 2, after reaching the yield stress upper limit, additional energy input causes the yield stress to decrease which is accompanied by a release of water from the flocculated MFT matrix. Preferably, the water release conditioning occurs in-line in a continuous manner following the flocculation conditioning and before deposition. In this case, the water release may commence in-line resulting in a stream of water being expelled from the outlet of the pipe along with depositing flocculated MFT. The release water will quickly flow away from the MFT deposit, especially on a sloped deposition area, while the MFT deposit has sufficient strength to stand on the deposition area. Here, it is preferred to have no high-shear units such as pumps in the downstream pipe. The hydraulic pressure at the MFT pipeline reactor inlet is preferably established so that no additional pumping which may over-shear the flocs would be required to overcome both static and differential line head losses prior to deposition. It is also preferred not to disturb the deposited MFT with further shearing, but rather to let the MFT deposit dry after in place, upon deposition. Alternatively, instead of being performed in-line, the water release conditioning may occur in a controlled shearing apparatus (not shown) comprising baffles, an agitator, a mixer, or a rotary separator, or a combination thereof. The water release conditioning may also occur after the flocculated MFT is deposited, for instance by a mechanical mechanism in an ordered fashion. In such a case, the flocculated MFT could be deposited as a gel-like mass at a shear yield strength allowing it to stand but tending not to promote water release until additional energy input is applied. By conditioning the flocculated MFT back down from a yield stress upper threshold, the process avoids the formation of a gel-like water-retaining deposit, reliably enabling water release and accelerated drying of the MFT.

Care should also be taken not to expel the MFT from a height that would accelerate it to over shear due to the impact on the deposition area or the previously deposited MFT.

Figure 15:
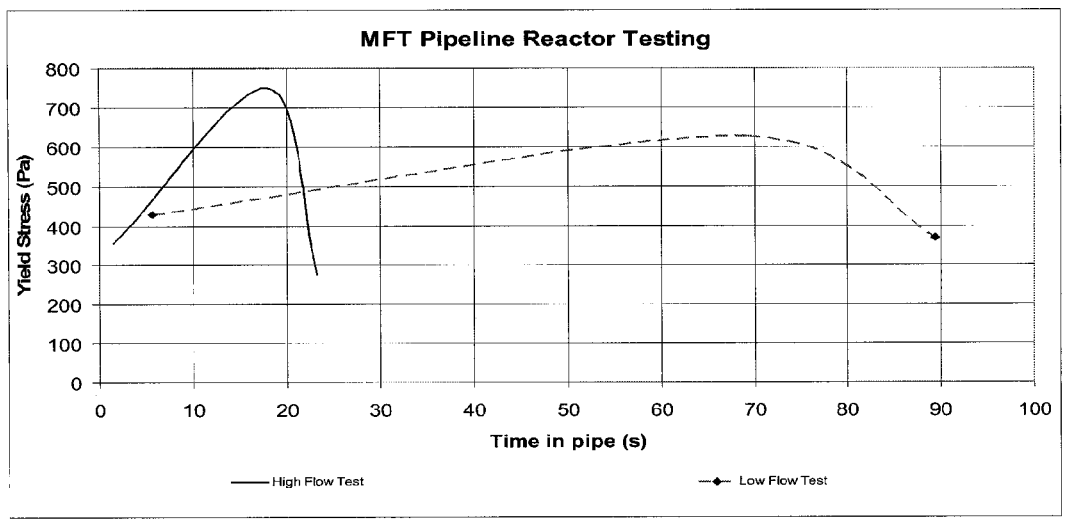
FIG. 15 is a graph of yield shear stress versus time in a pipe for different pipe flow rates for mature fine tailings treated with flocculent solution.

The flocculation conditioning and the water release conditioning may be controlled in-line by varying the flow rate of the MFT. Preferably, the flow rate may be as high as possible to increase the yield stress evolution rate of the flocculating MFT, while avoiding over-shear based on the hydraulic shear of the pipeline to the deposition area. Tests were conducted in a pipeline reactor to determine conditioning response. FIG. 15 identifies the response to varying the pipeline flow rate. A 34 wt % solids MFT was pumped through a 2 inch diameter pipe at a flow rate of about 26 LPM for the low flow test and about 100 LPM for the high flow test. A 0.45% flocculent solution was injected at about 2.6 LPM for the low flow test and at about 10 LPM for the high flow test. At high flows, the maximum yield shear stress of the flocculated MFT occurs earlier than at low flows. This observed response indicates that the total energy input is an important parameter with input energy being hydraulic losses due the fluid interacting with the pipe wall in this case.

Referring to FIGS. 4 and 5, the conditioning zone 28 may include baffles, orifice plates, inline static mixers or reduced pipe diameter (not shown) particularly in situations where layout may constrain the length of the pipeline reactor, subject to limiting the energy input so the flocculated MFT is not over sheared. If the flocculated MFT is over sheared, the flocs additionally break down and the mineral solids revert back to the original colloidal MFT fluid which will not dewater.

In one preferred embodiment of the process, when the yield stress of the flocculated MFT at release is lower than 200 Pa, the strength of the flocculated MFT is inadequate for dewatering or reclamation of the deposited MFT. Thus, the yield shear stress of the flocculated MFT should be kept above this threshold. It should be understood, however, that other flocculation reagents may enable a flocculated MFT to dewater and be reclaimed at a lower yield stress. Thus, although FIGS. 1 and 2 show that a yield stress below 200 Pa is in the over-shearing zone, these representative figures do not limit the process to this specific value. When an embodiment of the process used 20%-30% charge anionic polyacrylamide high molecular weight polymers, the lower threshold of the yield shear stress window was about 200 Pa, and the flocculated MFT was deposited preferably in the range of about 300 Pa and 500 Pa, depending on the mixing and MFT solids content. It should also be noted that the yield shear stress has been observed to reach upper limits of about 400-800 Pa in the pipeline reactor. It should also be noted the yield shear stress of the MFT after the initial water is released when the MFT is deposited has been observed to exceed 1000 Pa.

In general, the process stage responses for a given flocculation reagent and MFT are influenced by flocculent type, flocculent solution hydraulic properties, MFT properties including concentration, particle size distribution, mineralogy and rheology, dosing levels and energy input.

The process provides the advantageous ability to predict and optimize the performance of a given flocculent reagent and solution for dewatering MFT. The mixing zone ensures the efficient use of the flocculation reagent and the pipeline conditions of length, flow rate and baffles if required provide the shear necessary to maximize water release and avoid over-shearing when the MFT is discharged from the pipeline reactor.

In one embodiment of the process, after the in-line water release conditioning, the flocculated MFT is deposited to form a non-flowing MFT deposit. The conditioned MFT is suitable for direct deposition on a deposition area, where water is released from the solids, drained by gravity and further removed by evaporation to the air and optionally permeates into the deposition area. The deposition area may comprise sand surfaces to facilitate draining and permeation. The MFT deposit dries so as to reach a stable concentration of the MFT solids for reclamation purposes. In other alternative embodiments for dewatering flocculated MFT, solid-liquid separation equipment may be used provided the shear imposed does not over-shear the flocculated MFT. The MFT pipeline reactor may be used to treat MFT or other tailings or colloidal fluids having non-Newtonian fluid behaviour for deposition or for other dewatering devices such as filters, thickeners, centrifuges and cyclones.

In one aspect of the process, the MFT is continuously provided from a pond and has a solids content over 20 wt %, preferably within 30-40 wt %. The MFT is preferably undiluted. After the flocculent solution is dispersed into the MFT, the flocculated MFT releases water thus allows in-line separation of the water from the flocculated MFT.

Figure 22:
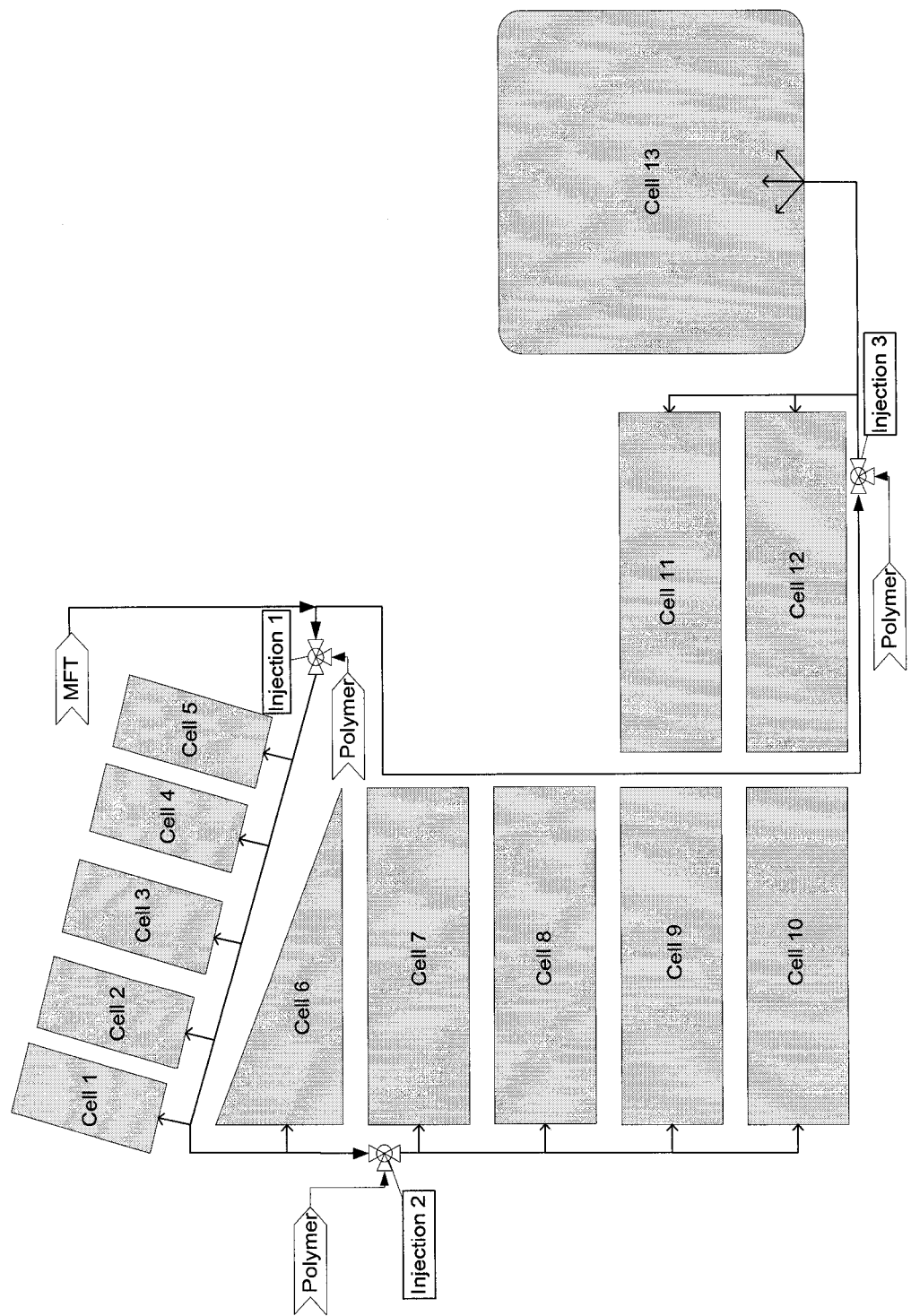
FIG. 22 is a top view schematic of a multi-cell configuration of deposition cells.

In one aspect of the process, the deposition area may include a multi-cell configuration of deposition cells, as shown in FIG. 22. Each deposition cell may have its own design and the cells may be arranged to improve water release and land use. Each deposition preferably has a head region at which the flocculated MFT is deposited and a toe region spaced away from the head region by a certain length. A sloped bottom surface extends from the head region to the toe region such that the toe region is at a lower elevation than the head region. The cells preferably have side walls such that deposited MFT will at least partially fill the cell's volume. Multi-cell configurations such as shown in FIG. 22 may be combined with various mixer, pipeline transport and conditioning arrangements such as those schematically shown in FIGS. 16, 17, and 18. The flocculent solution may be injected into the pipeline at various points depending on the desired shear conditioning to impart to the flocculated MFT prior to deposition to achieve the desired dewatering effect. Valves may be used to manage the transport of the flocculated MFT in accordance with the availability of deposition cells, required shear conditioning and observed drying rates, to provide flexible management of an MFT dewatering operation.

Embodiments and aspects of the present invention will be further understood and described in light of the following examples.

EXAMPLES

Example 1

Figure 14:
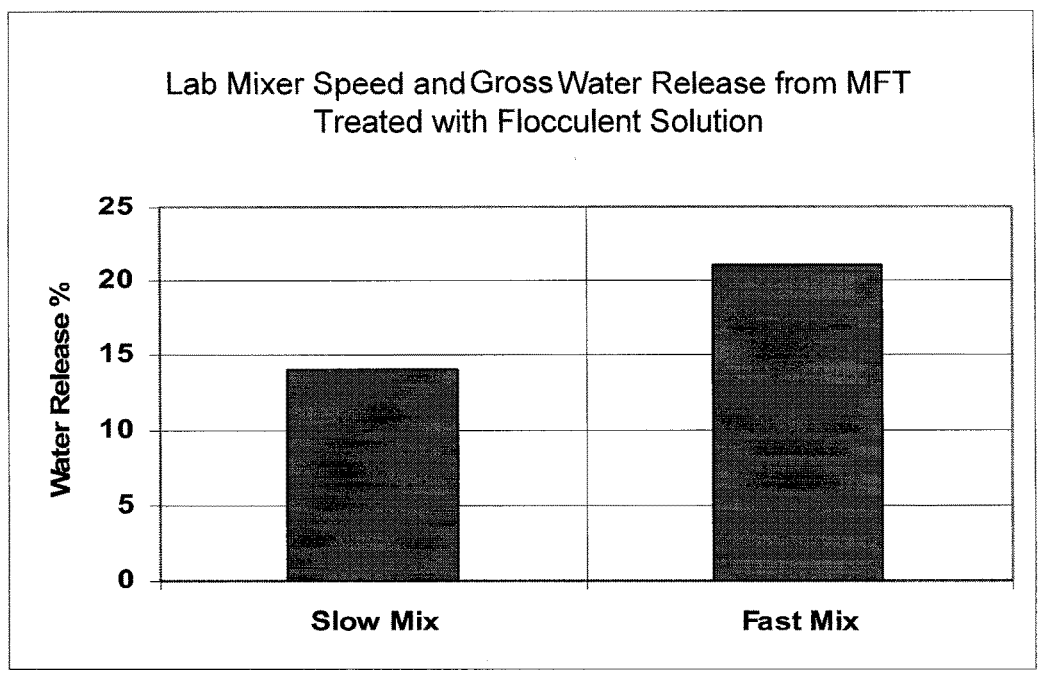
FIG. 14 is a bar graph of water release percentage versus mixing speeds for mature fine tailings treated with flocculent solution.

As mentioned in the above description, lab scale stirred tank tests were conducted to assess mixing of a flocculent solution into MFT. The lab mixer was run at initial speeds of 100 RPM or 230 RPM. The dosage of 30% charge anionic polyacrylamide-polyacrylate shear resistant co-polymer was about 1000 g per dry ton. FIGS. 13 and 14 show that the fast initial mixing shortens the yield stress evolution to enable dewatering and also increases the water release from the MFT.

Example 2

As mentioned in the above description, lab scale stirred tank tests were conducted to assess mixing of different dosages of flocculent solution into MFT. The lab mixer was run at speeds of 100 RPM or 230 RPM for flocculent solutions containing different doses of dissolved flocculation reagent. The dosages of flocculent ranging from 800 to 1200 g per dry tonne of MFT indicated adequate mixing and flocculation for dewatering. The flocculation reagent here was a 30% charge anionic polyacrylamide-polyacrylate shear resistant co-polymer with a molecular weight over 10,000,000. A dosage range of 1000 g per dry tonne ±20% was appropriate for various 30% charge polyacrylamides for MFT with clay content of 50 to 75%.

Example 3

As mentioned in the above description, continuous flow pipeline reactor tests were conducted. Results are shown in FIG. 15 comparing high and low flow rates. A 34 wt % solids MFT was pumped through a 2 inch diameter pipe at a flow rate of 26 LPM for the low flow test and 100 LPM for the high flow test. A 0.45% organic polymer flocculent solution was injected at 2.6 LPM for the low flow test and at 10 LPM for the high flow test. The distance from injection to deposition was 753 inches or 376.5 pipe diameters. The 2 inch long orifice mixer had an orifice to downstream pipe diameter ratio d/D=0.32 with six 0.052 inch diameter injectors located on a 1.032 inch diameter pitch circle. For the high flow test the six injector diameters were increased to 0.100 inch.

Example 4

As mentioned in the above description, computational fluid dynamic (CFD) modelling was conducted. The CFD modeling considered the flocculent solution as a Power-law-fluid and the MFT as a Bingham-fluid in the mixing zone and confirmed both the adequate mixing of the injection device of FIGS. 4 and 5 and the inadequate mixing of the conventional side branch tube as discussed in the Background section under the same conditions. The MFT flow rate in a 2 inch diameter pipe was 30 LPM and polymer solution was injected at 3 LPM. The 2 inch long orifice mixer had an orifice to downstream pipe diameter ratio d/D=0.32 with six 0.052 inch diameter injectors located on a 1.032 inch diameter pitch circle. The MFT had a density of 1250 kg/m$^3$ and a yield stress of 2 Pa while the polymer solution had a density of 1000 kg/m$^3$, with a power-law index n=0.267 and a consistency index of 2750 kg s$^{n-2}$/m.

Furthermore, the visualization shown in FIGS. 6-8 is only possible by CFD modelling due to the opaqueness of actual MFT. For MFT, the CFD model incorporates non-Newtonian fluid behaviours into the hydraulic analysis to develop a robust design for a variety of possible combinations and permutations between various MFT properties and flocculation reagent solutions.

Example 5

As described above, the present invention resides in the process steps rather than in the specific flocculation reagent selected. A person skilled in the art may select a variety of flocculation reagents that enable in-line dispersion, flocculation, water release and deposition. One selection guideline method includes taking an MFT sample representative of the commercial application and using a fast-slow mixer test to observe the water release capability of the flocculent. In the fast-slow mixer test, the flocculent is injected into the mixer running at a fast mixing rate and after a delay of 7 seconds the mixer is switched to slow mixing. Water release may then be assessed. For instance, tests have been run at 230 RPM (corresponding to a shear rate of 131.5 s$^{-1}$) for fast mixing and 100 RPM (corresponding to a shear rate of 37. s$^{-1}$) for slow mixing. A fast-slow mixer test was conducted on 10%, 20%, 30% and 40% charge anionic polyacrylamide flocculants and the 30% charge anionic polyacrylamides enabled superior water release. The use of such 30% charge anionic polyacrylamides in the pipeline reactor and CFD modeling validated this approach. In addition, the fast-slow mixer test was conducted on high and low molecular weight linear anionic polyacrylamide flocculents and the high molecular weight polyacrylamides enabled superior water release. The fast-slow mixer test may be combined with the CFD model to test the mixing of the flocculent solution at the density of the desired formulation. Such cross-validation of flocculation reagents and solutions helps improve the process operating conditions and validate preferred flocculation reagents and solutions.

FIGS. 23 and 24 show results of the fast-slow test conducted on a polyacrylamide polymer. It has been noted that this fast-slow test may identify some acceptable polymers that would have otherwise been screened out using standard one-speed mixing tests. Rapid identification and screening of potential polymers is relevant to process improvement, process flexibility and cost reduction. Using the fast-slow methodology and obtaining capillary suction time (CST) data of the treated MFT enables selection of advantageous flocculents.

In another investigation of candidate flocculents, two 30% anionic high molecular weight polymer flocculents were tested using a multi-step screening process. In the first step, the chemical activity is evaluated and in the second step a water release curve is developed for a given solids or clay content of MFT around the optimal dose identified in the first step. In the first step, the two polymers were used with a made-up 10 wt % tailings mixture, optimally dosed by gradually adding increments of 100 ppm of polymer during stirring until settling is observed. Once settling is observed, the reaction is stopped and the precipitate and supernatant are placed upon a sieve. The supernatant is collected and the volume recorded. A moisture analysis is then performed on the supernatant. In the second step, a water release curve is generated for e.g. 40 wt % MFT around the optimal dose identified in the first step, using the fast-slow methodology. Preferably, yield stress and CST data are obtained in this evaluation.

Example 6

Figure 18:
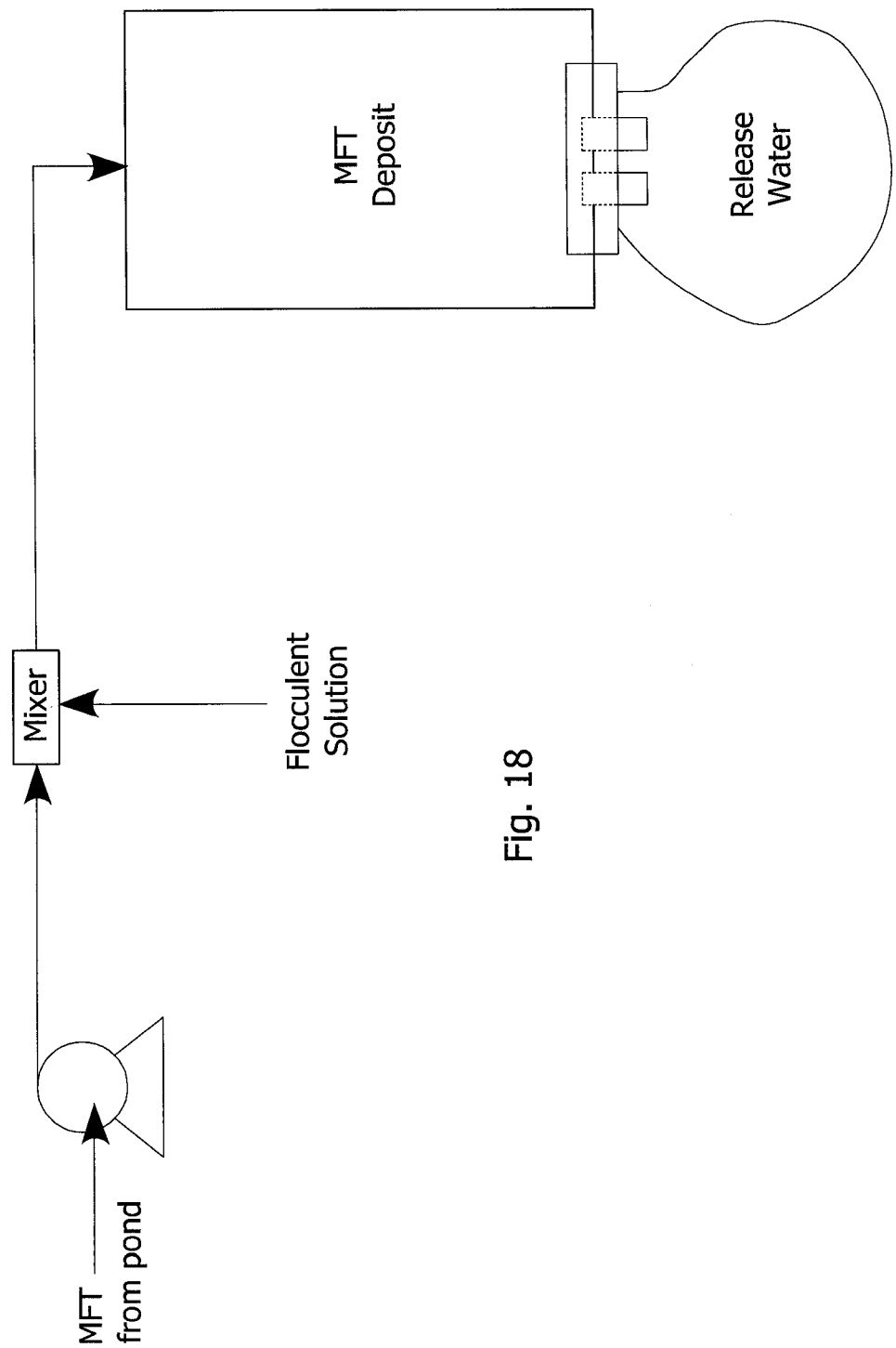
FIG. 18 is another schematic representation of treating mature fine tailings with a flocculent solution.

Trials were performed and showed that a flocculation reagent could be injected into MFT in-line followed by pipeline conditioning, deposition and drying. FIGS. 16-18 schematically illustrate different setups that may be used. For FIGS. 16 and 17, the flocculated MFT was deposited onto beaches and for FIG. 18 into a deposition cell.

The MFT was about 36 wt % solids and was pumped from a pond at flow rates between 300 and 720 gal/min. The flocculent solution was injected in-line at different locations. One of the flocculent reagents used was a 30% charge anionic polyacrylamide-sodium polyacrylate co-polymer with a molecular weight over 10,000,000. The flocculated MFT ws conditioned along a pipeline and then expelled out of spigots arranged in series.

Figure 19:
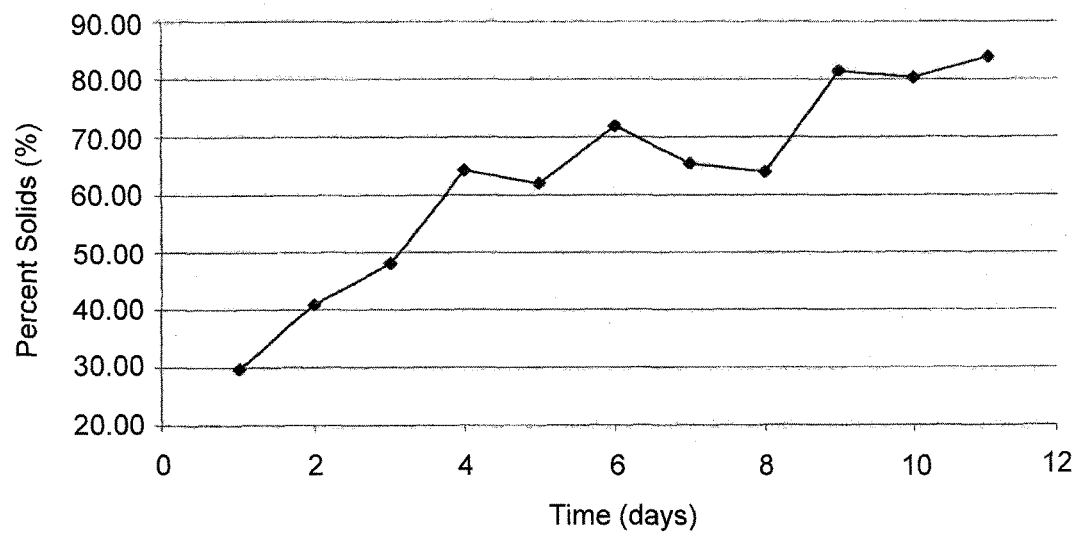
FIGS. 19 and 20 are graphs of percent solids as a function of time for deposited MFT showing drying times according to trial experimentation.
Figure 20:
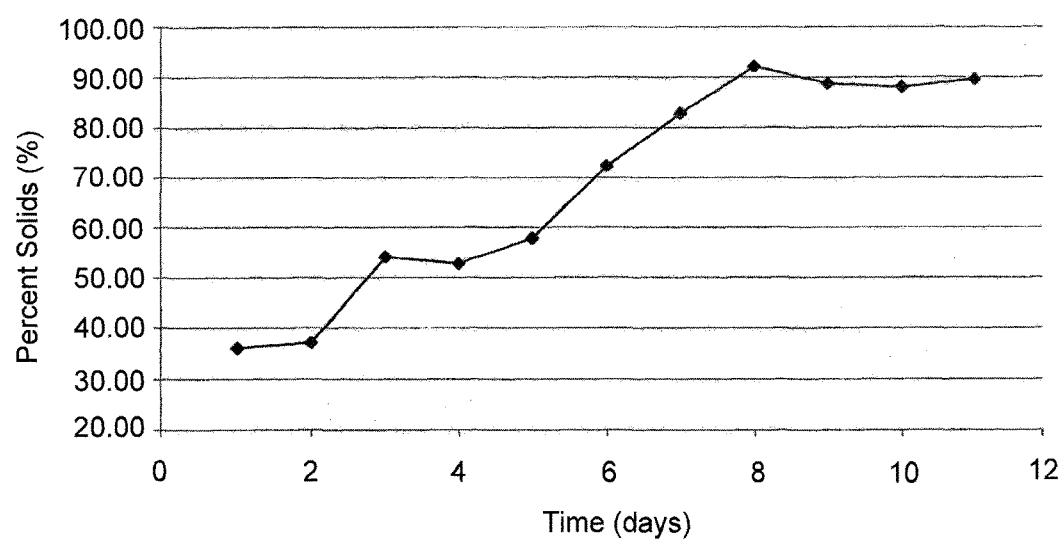

In order to monitor the progress of the drying, samples were taken and analyzed for percent solids. The drying times to achieve 75 wt % solids ranged from 5 to 7.5 days depending on the sample location. Deposition areas having a slope showed faster drying. FIGS. 19 and 20 show some results at two different sample points of the drying times of deposited MFT.

Dosages between 0.6 Kg to 1.1 Kg per dry tonne of MFT provided preferred drainage results, and much cleaner effluent water than those outside this range. Trials revealed that incorrect dosage may reduce dewatering for a number of reasons. If the dosage is too low, some of the MFT goes unflocculated and overall there is a lack of dewatering performance. Overdosing flocculent applications may also lead to reduced dewatering due to allowing water to become bound up in semi-gelled masses with the solids making it more difficult to provide conditioning sufficient to allow water release with the given pipeline dimensions and hydraulic conditions. Both of these situations were observed and dosage adjustments were made to compensate. In addition, water quality depends on dosage control. Overdosing or inadequate mixing (resulting in localised overdosing) resulted in poor release water quality with at times over 1 wt % solids. Increased dosing control, the preferred dosage range and rapid initial mixing helped resolve water quality issues and improve dewatering and drying of the deposited MFT. Other observations noted that the deposited MFT dewatered and dried despite significant precipitation, thus resisting re-hydration from precipitation.

Reclamation of the MFT deposits was further observed as vegetation from seeds tossed on the deposition area was later noted to be growing well.

Example 7

Figure 21:
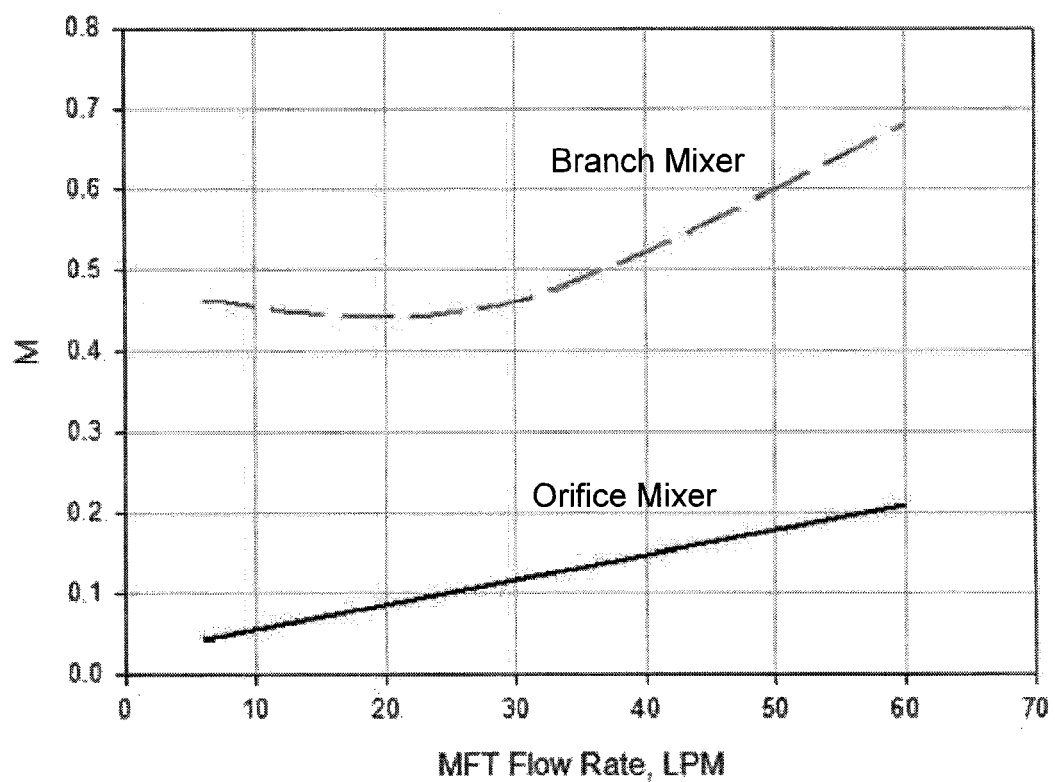
FIG. 21 is a graph of second moment M versus MFT flow rate for different mixers.

One of the challenges to successful treating of MFT is the process variations encountered in operations. It may be desired to use a side injection nozzle to for mixing liquids into MFT. Using the mixing algorithm developed for the MFT pipeline reactor model, FIG. 21 compares a typical side injection nozzle to the orifice nozzle of FIG. 4 on a 2 inch pipeline for a range of MFT flows based on:

The MFT is 30 wt % solids and modeled as a Herschel-Bulkley fluid with a yield stress of 2 Pa and high shear rate viscosity of 10 mPa s. Density was 1250 kg/m$^3$.

The flocculent solution was modeled as Power Law fluid with n=0.267 and consistency index (k) of 2750 kg s$^{n-2}$/m. Density was 1000 kg/m$^3$ and the flow rate was 1/10 the MFT volume flow rate The orifice mixer had a 0.32 orifice ratio.

The flow area for injecting the polymer solution was the same for both mixers.

FIG. 21 illustrates that the orifice mixer of FIG. 4 provides significantly preferred mixing than the conventional side injection nozzle over the range of MFT flows.

Example 8

In preliminary investigations regarding the preferred performance requirements for an additive chemical, the focus was put on strength gain and resistance to shear. Another objective was enhanced dewatering, as several previous attempts to flocculate MFT required dilution of the material prior to mixing with the flocculant, and then only achieved clay to water ratios similar to or slightly less than that found in the source MFT. Commercial application of polymeric flocculation in oil sands is restricted to rapid dewatering of low solids content thin fine tails. In short, flocculants had been unable to collapse the clay matrix any further than that found in the ponds.

During the course of bench scale tests, a certain polymer type (high molecular weight branched polyacrylamide-sodium polyacrylate co-polymer with about 30% anionicity) showed promise in both material strength gain as well as shear resistance. In addition, the polymer appeared to promote initial dewatering of the MFT shortly after mixing by generating a highly permeable floc structure. This means that the process no longer relies on evaporative drying alone, but rather a combination of initial accelerated dewatering and drainage in the deposit slope as well as evaporation. No dilution of the MFT was required beyond the polymer make up water and the polymer could be injected in line without the use of a thickener. The polymer was quite effective for MFT up to 40 percent by weight (roughly 0.4 clay-to-water ratio).

Initial field tests produced surprising results, allowing for 20-30 cm lifts to reach 80% solids in less than 10 days. Given the weather conditions at the time, the minimum amount of water released as free water was 85% as the potential evaporation rates were too low to account for the dewatering rate. This initial success appeared to be robust and relatively insensitive to changes in fluid density and injection locations.

Subsequent testing began to illustrate, however, that there was a basic understanding of the behaviour of the flocculated material that was not obtained during the initial laboratory or field tests. Deposits were attempted with lower levels of control on the density and flowrates of the source MFT, resulting in a wider variety of deposit dewatering rates. Many of these deposits did not behave as previously observed, and several attempts at enhancing the dewatering performance through additional mixing, changes in the deposition mechanisms, or mechanical manipulation of the deposits met with limited success. It became apparent that more testing was required.

In investigations of undiluted MFT flocculation, it was attempted to manipulate the MFT floc structure such that initial dewatering is maximized and the MFT gained just enough strength to stack in a thin lift when deposited on a shallow slope. Dewatering occurs as a function of mixing and applied shear during pipeline transport as well as on the deposition slopes.

Bench and pilot scale experiments were conducted to replicate the field observations and to investigate the dewatering potential as a function of polymer dosage, injection type, mixing, total applied shear and clay-to-water ratio of the MFT. The experiments highlight several key factors.
1. Polymer dosage is best determined by clay content, measured as clay activity using methylene blue adsorption method.
2. Mixing of the polymer-treated MFT using laboratory or in-line static mixers can cause less than optimum dewatering potential and stacking in the deposition slopes.
3. Shear energy applied to the flocculated materials can greatly affect the dewatering and strength performance. Insufficient shear often create a high strength material with minimal dewatering and excess shear reduces the strength to MFT-like strengths with reduced permeability and dewatering.

Regarding polymer dosage, although it is recognized that the rheology of flocculated systems is governed by the finest particles in a slurry, polymer is often added on a gram per tonne of solids basis. This is often adequate for a homogeneous slurry. However, fine tailings are deposited in segregating ponds and the mineral size distribution of MFT depends on the sampling depth. Therefore dosing on a solid basis would often result in an underdosed or an overdosed situation affecting maximum water release. This is highlighted in the below Table for three MFT samples that show large swings in the optimum polymer dosage on solids or fines basis. The MFT samples were sourced from two different ponds at different depths and with similar water chemistries.

TABLE

Optimum polymer dosage for maximum initial water release.

| Sample ID | Wt % solids | Wt % clay* on solids | Wt % fines on solids | Optimum polymer dosage | | |
|---|---|---|---|---|---|---|
| | | | | (g/tonne of solids) | (g/tonne of fines < 44 μm) | (g/tonne of clay) |
| MFT A | 44.0 | 48.9 | 59.8 | 800 | 1424 | 1742 |
| MFT B | 32.6 | 78.9 | 89.3 | 1200 | 1428 | 1616 |
| MFT C | 22.3 | 99.6 | 98.8 | 1700 | 1707 | 1693 |

*Wt % clay is based on the surface area determined from methylene blue adsorption and could be greater than 100% for high surface area clays (Omotoso and Mikula 2004).

Regarding rheology of flocculated MFT, a static yield stress progression over time was used to evaluate optimal yield stress for deposition and water release in the laboratory, pilot and field experiments. The shear yield stress was measured by a Brookfield DV-III rheometer. The water release was measured by decanting the initial water release and by capillary suction time (CST). The capillary suction time measures the filterability of a slurry and is essentially the time it takes water to percolate through the material and a filter paper medium, and travel between two electrodes placed 1 cm apart. The method is often used as a relative measure of permeability.

Figure 25:
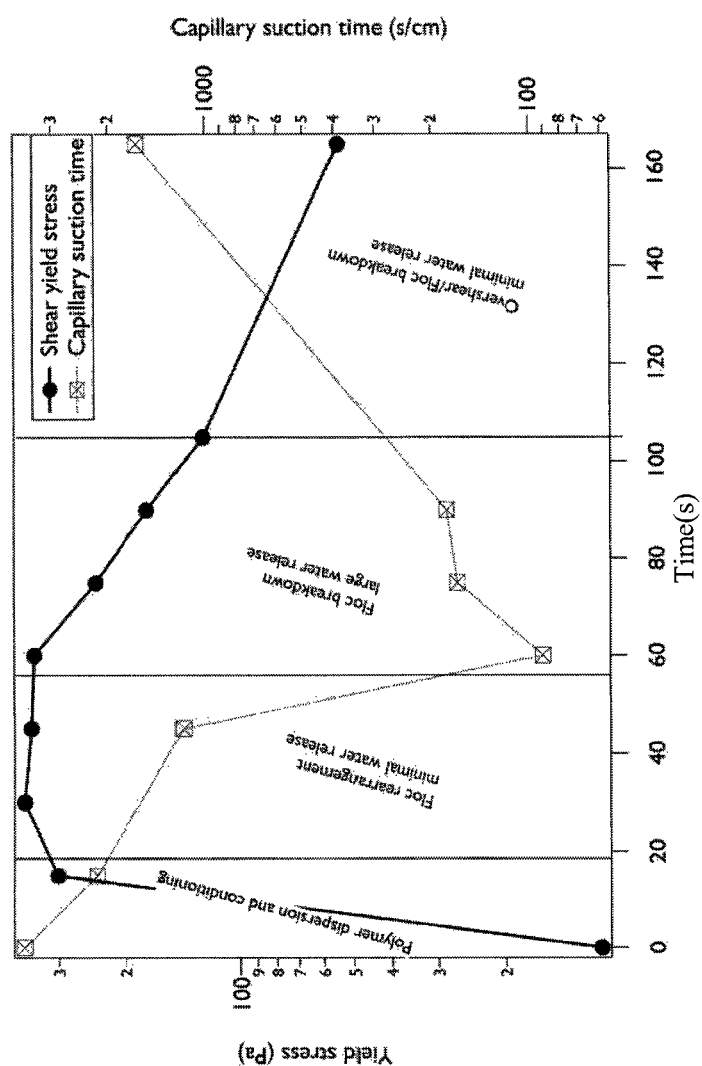
FIG. 25 is a graph of shear strength progression of flocculated MFT highlighting four distinct stages.

FIG. 25 shows an optimally dosed MFT mixed in a laboratory jar mixer with the rpm calibrated to the mean velocity gradient. The figure shows the shear yield stress progression curve for a 40 wt % solids MFT. The polymer was injected within a few seconds while stirring the MFT at 220 s−1. Mixing continued at the same mean velocity gradient until the material completely broke down. At each point on the curve, mixing was stopped and the yield stress measured.

Water release during mixing is often dramatic and was clearly observed. The extent of water release is given by the capillary suction time. A low suction time correlates to high permeability and a high suction time correlates to low permeability. MFT dosed at ideal rates released the most water and about 20-25% of the initial MFT water was released at the lowest CST.

Figure 26:
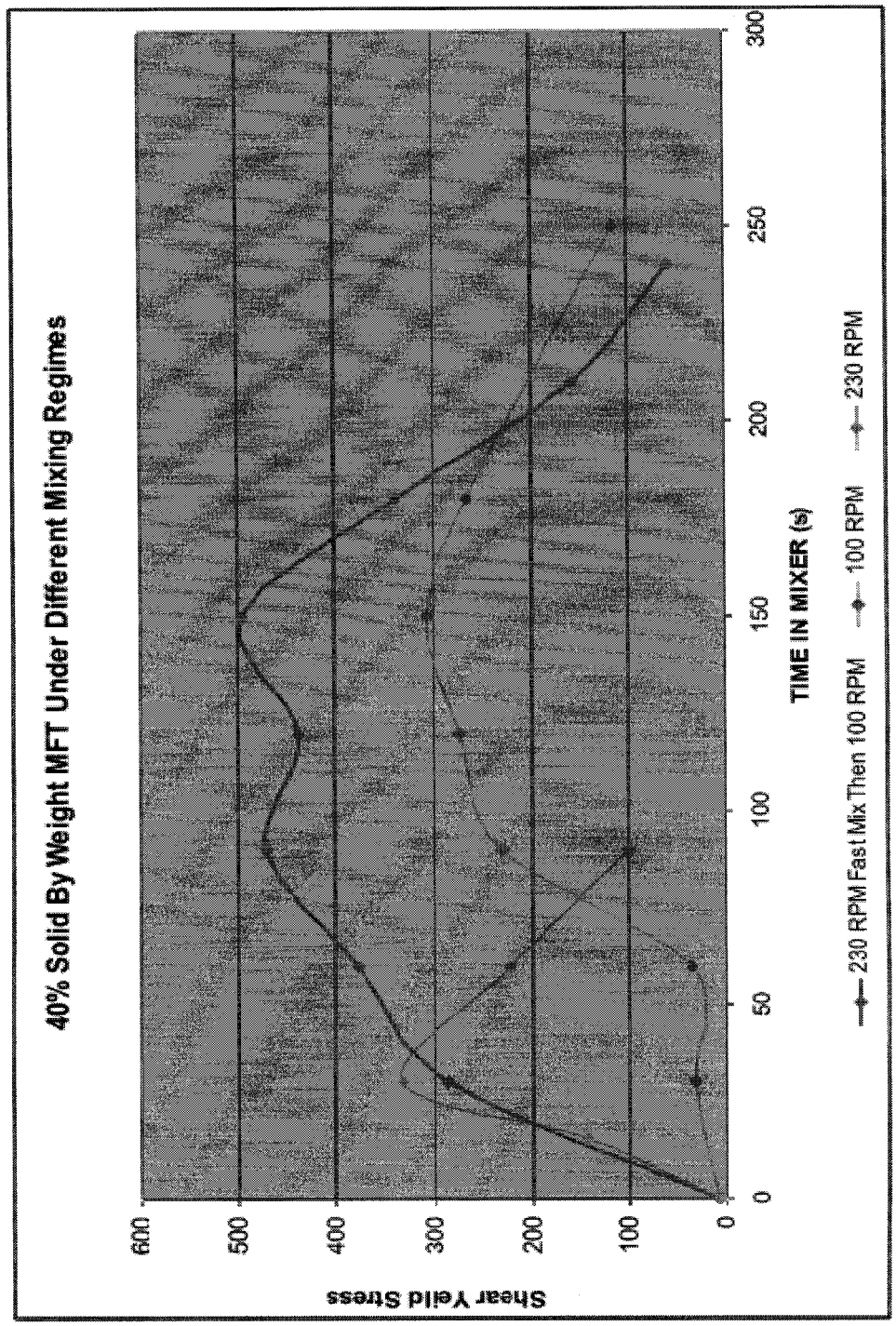
FIG. 26 is a graph of shear strength progression of flocculated MFT highlighting four distinct stages.
Figure 27:
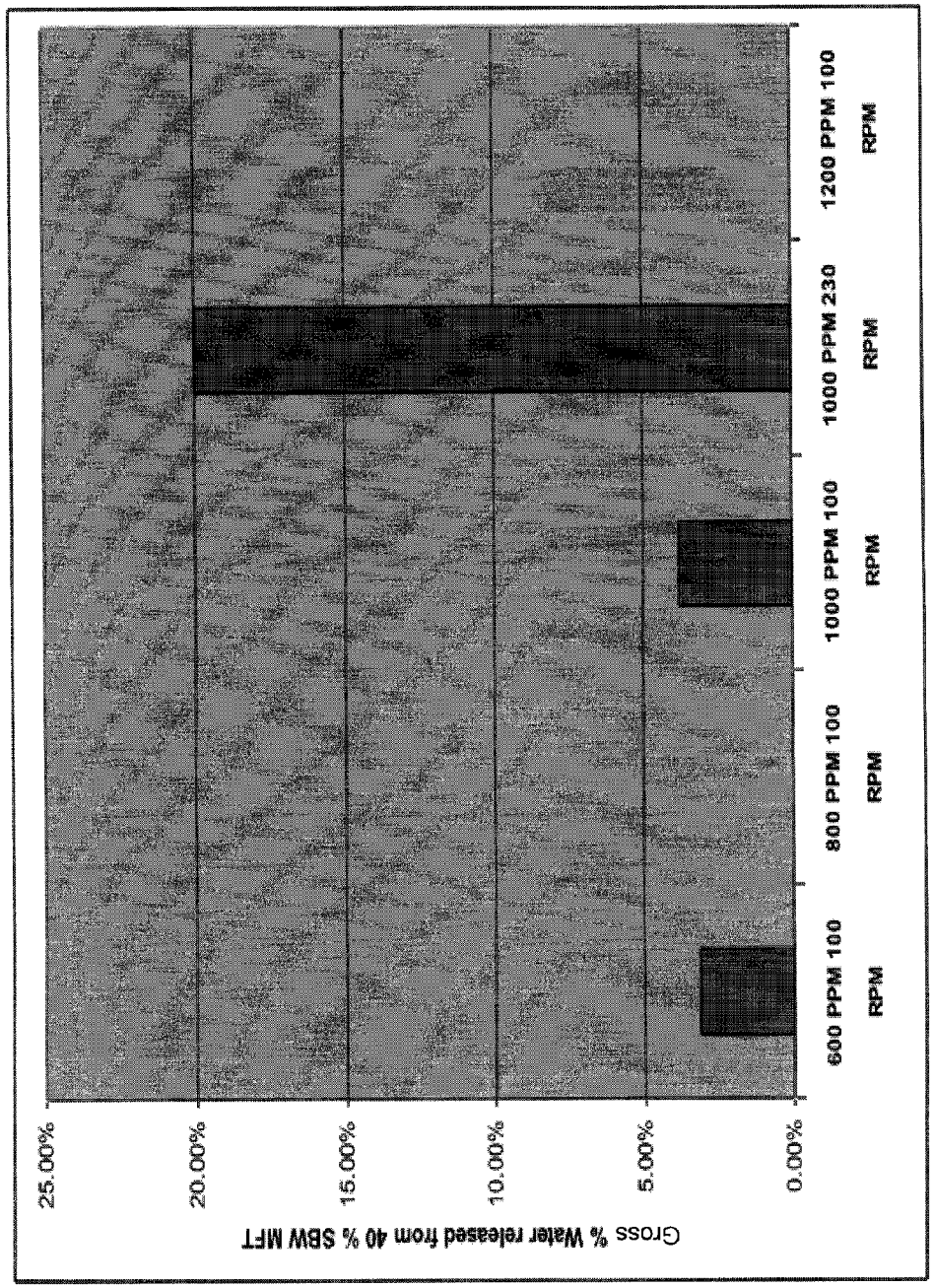
FIG. 27 is a graph of maximum water release from polymer-treated MFT during mixing.

In further studies, MFT was mixed with a shear-resistant polymer flocculant in a laboratory jar mixer with the rpm calibrated to total mixing energy input. The shear-resistant polymer was a high molecular weight branched polyacrylamide-sodium polyacrylate co-polymer with about 30% anionicity. FIG. 26 shows the shear yield stress progression curve for a 40 wt % solids MFT dosed at different polymer concentrations. The experiment was conducted in two mixing stages. In the first stage, MFT was mixed at 220 s$^{-1}$ during polymer injection. This stage lasts for a few seconds and defines the rate of floc buildup. In the second stage, the material was mixed at 63 s$^{-1}$ until the material completely broke down. At each point on the curve, mixing was stopped and the yield stress measured. Water release during mixing is often dramatic and was clearly observed. MFT dosed at 1000 g/tonne of solid released the most water (FIG. 27). The material released about 20% of the initial MFT water immediately whereas the under-dosed and over-dosed MFT released very little water through complete floc breakdown.

Four distinct stages were identified in the shear progression curve:
Polymer dispersion or floc build-up stage displaying a rapid increase in yield stress as the polymer contacts the minerals and poor water release.
A gel state of high shear yield stress which can be a plateau depending on the applied shear rate and % solids of the MFT. The rates of floc build-up and breakdown in this stage appear to be roughly the same.
A region of decreasing shear strength and floc breakdown where significant amount of polymer-free water is released.
An oversheared region characterized by rapidly decreasing shear strength where the material quickly reverts to an MFT state and releases very little water.

These stages are used to quantify the behaviour of polymer-dosed MFT and to compare behaviours under different shear regimes and the third stage was the target design basis. An optimal dose of polymer with a good initial dispersion into MFT achieves preferred permeability to release water.

Figure 28:
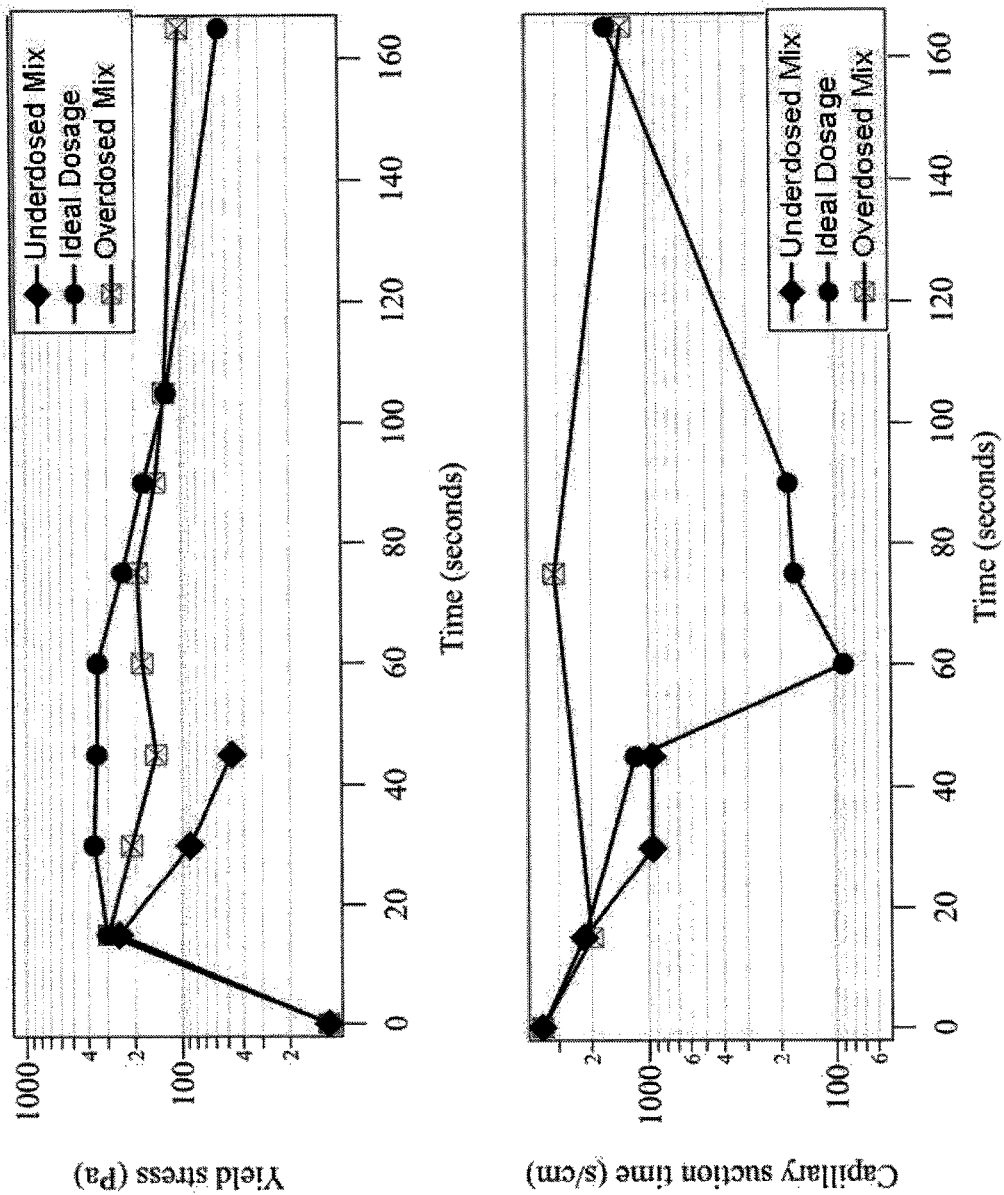
FIG. 28 is a graph of variation of polymer dosage with yield stress and water release.

Without an optimal dose and good dispersion, the MFT has a tendency to remain in the gel state and only dries by evaporation. This is highlighted in FIG. 28 where the same MFT in the underdosed or the overdosed state fail to release significant amount of water despite developing significant yield stresses. A key advantage of preferred polymers is having prolonged resistance to shear which allows operational flexibility when pipelining flocculated MFT to deposition cells.

Figure 29:
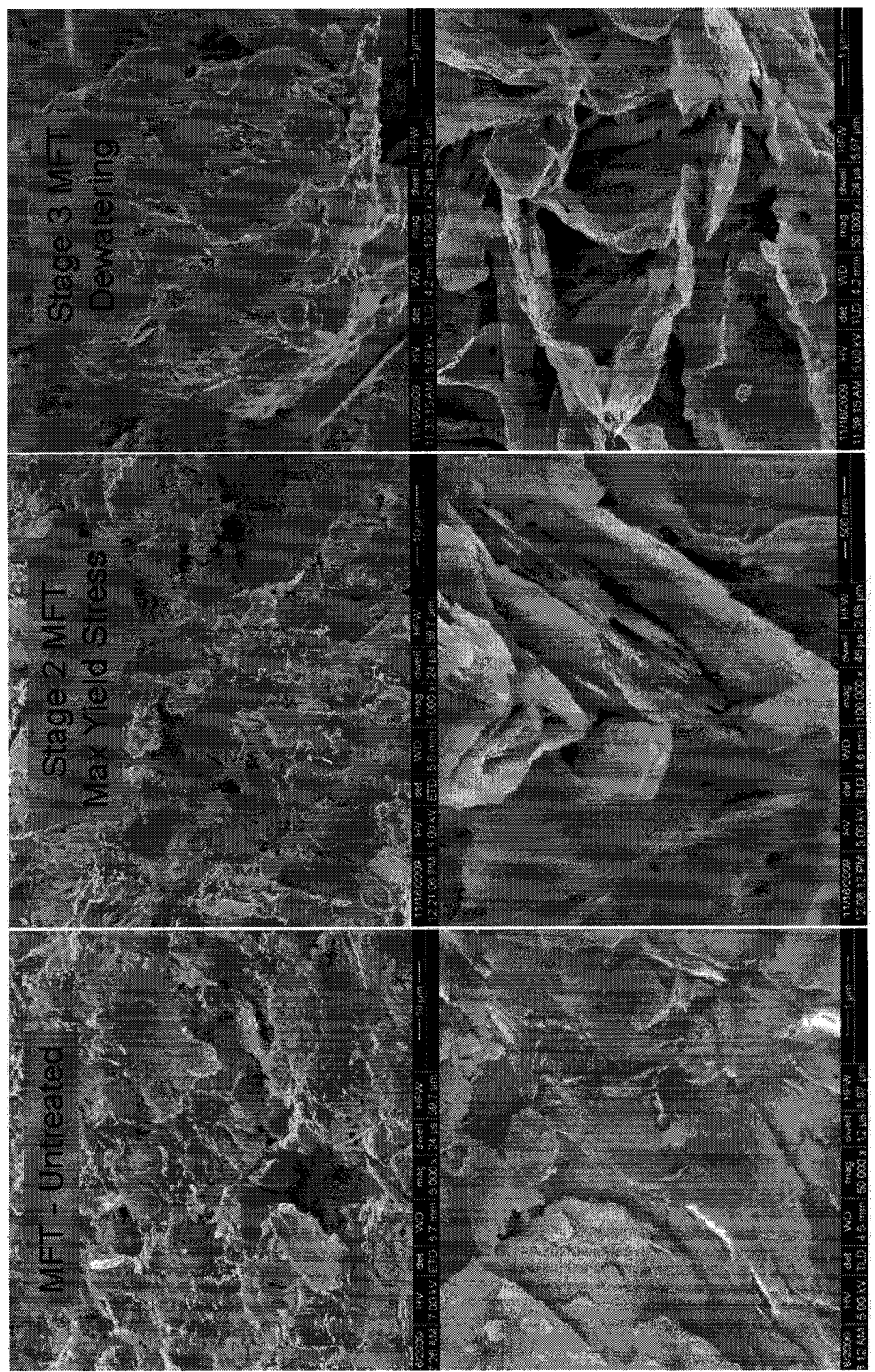
FIG. 29 is scanning electron micrographs of 40 wt % MFT showing the fabric at different shear regimes (a). Untreated MFT, (b) high yield strength and (c) dewatering stage.

Shown in FIG. 29 are the microstructures corresponding to different shear regimes in the preferred flocculated MFT in FIG. 25. The MFT and flocculated slurries were flash dried to preserve the microstructure to some extent. Samples were platinum coated and examined in a scanning electron microscope. The starting MFT showed a more massive microstructure on drying and a greater tendency for the clays to stack along their basal planes in large booklets. This results in a low concentration of interconnected pores and poor dewatering. The middle micrographs in FIG. 29 show microstructures exhibited by flocculated MFT in the second stage (383 Pa) at the onset of floc breakdown and water release. The microstructure is dominated by dense aggregates and randomly oriented clay platelets with more interconnected pores. The third set of micrographs (86 Pa) show less massive aggregates and a more open structure most likely responsible for the large water release observed in the third stage. The starting MFT is highly impermeable, whereas the flocculated MFT contains large macropores and significant amounts of micropores not visible in the starting MFT. At higher mixing time, the porosities start to collapse with an attendant reduction in the dewatering rates.

Figure 30:
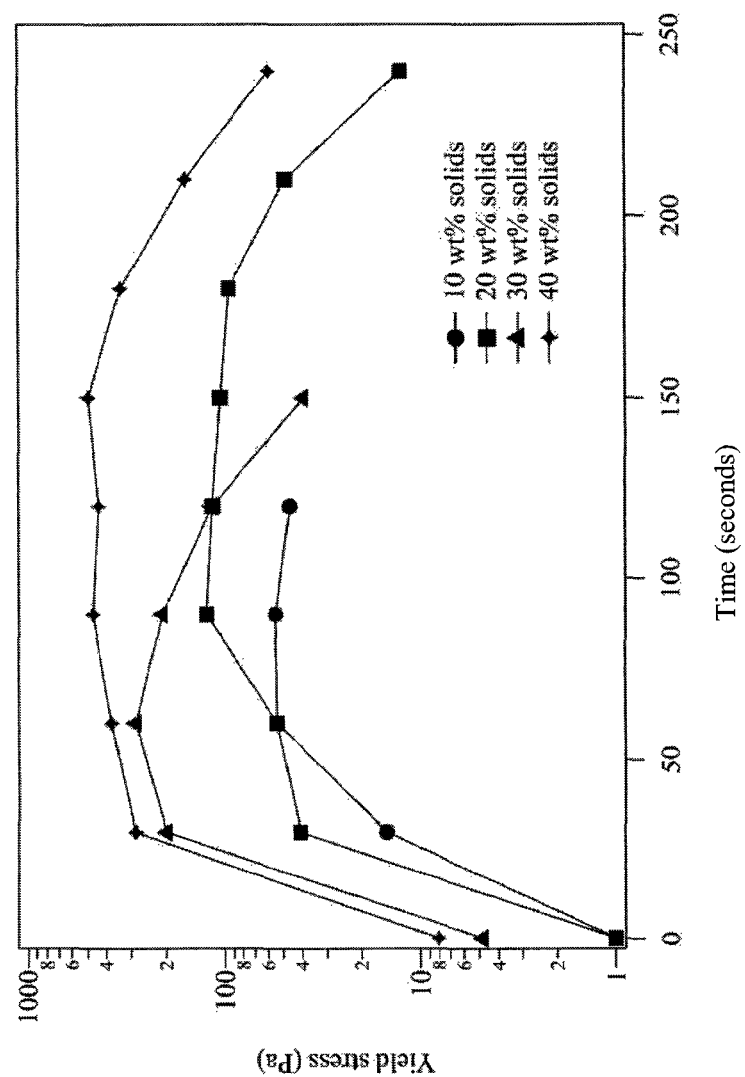
FIG. 30 is a graph of shear strength progression for optimally dosed MFT samples diluted to varying solids concentration.

Optimally dosed MFT with varying solids content were also investigated (FIG. 30). As the solids content decreases polymer dispersion becomes easier. The maximum yield strength of the material also decreases with increasing water content. A substantial amount of water is released at lower solids content (for example, 10 wt % settles to 20 wt % immediately—the water release at a lower solids content was much greater at 10 wt % solids (51% of the water in the original MFT) than at 40 wt % solids where 20% of the water in the original MFT was released); however the floc structure is weaker and more difficult to stack in a deposition slope without being washed off.

Figure 31:
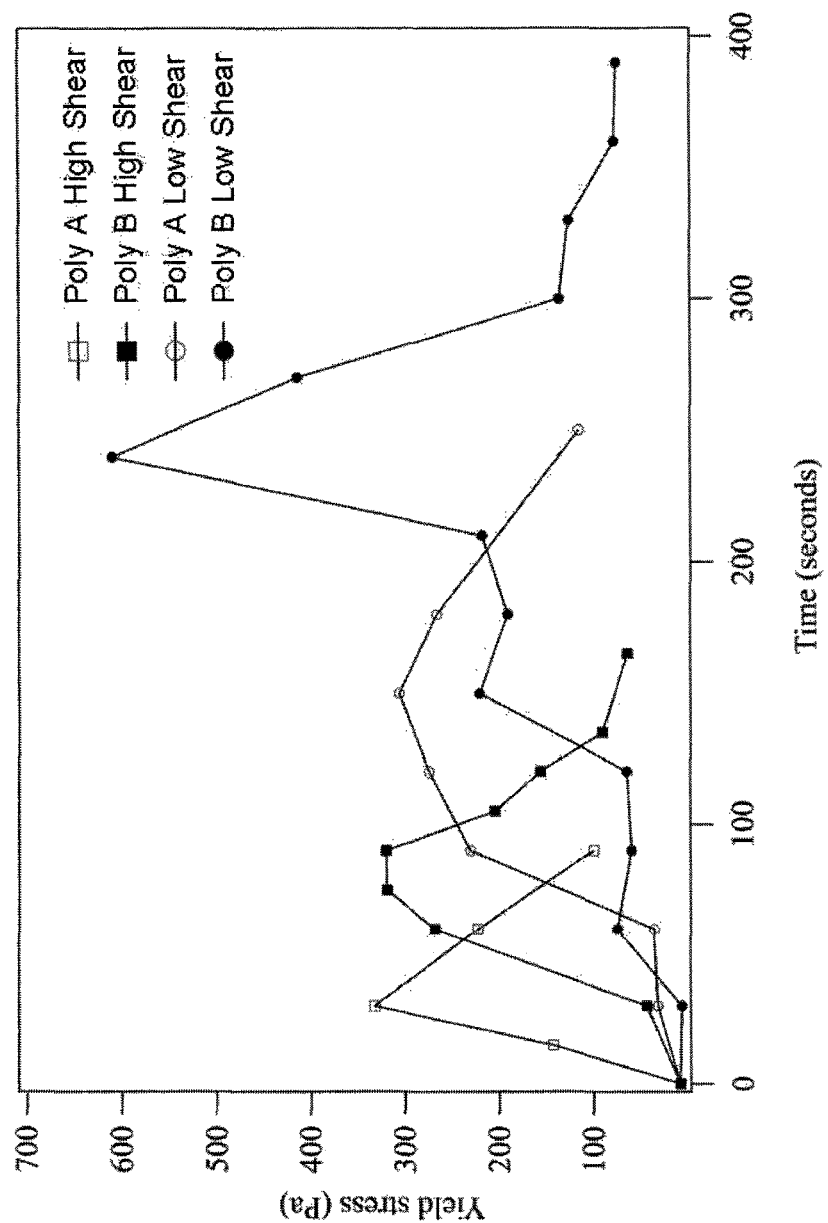
FIG. 31 is a graph of yield stress progression of MFT optimally dosed with a preferred polymer (Poly A) and a high molecular weight linear anionic polyacrylamide aPAM (Poly B).

Further laboratory testing has shown that the strength gain and dewatering effects are possible with many anionic polymers, and are not limited to the particular formulation used in the first successful tests. FIG. 31 compares a 40 wt % MFT optimally dosed with a preferred polymer A (high molecular weight branched polyacrylamide-sodium polyacrylate co-polymer with about 30% anionicity) and polymer B (high molecular weight linear anionic polyacrylamide (aPAM) typically used for flocculating oil sands tailings). The optimum dosages for both polymers, in terms of maximum water release, were the same (1000 g/tonne of solids) and were compared at two different shear rates. Polymer dispersion and shear stress response of the polymers differ significantly. Increasing the dispersion rate by increasing the mixer speed increases the yield stress instantaneously, but the traditional aPAM required additional mixing before the onset of flocculation. This decrease in the dispersion rate means that MFT treated with traditional polymer is more likely to stay in a gel state and not release as much water. The flocculation reagent used in the process is preferably highly shear-resistant especially during the second and third stages, and is also highly shear-responsive especially in the first stage of dispersing and mixing.

It is generally expected for a linear aPAM that a higher mixing energy rapidly builds up the yield stress but the floc breakdown also occurs at a faster rate. The lower viscosity of the preferred polymer A coupled with a high resistance to shear allow the flocculated MFT to be transported over long distances to deposition cells without significant floc breakdown. Nevertheless, polymers displaying responses such as aPAM's could be more appropriate in applications demanding very short pipe lengths to achieve the desired dewatering.

Various polymers that have been developed with high shear resistance may be used in the process to improve the dewatering. Preferably, such shear-resistant polymers would also be in the general class of branched high molecular weight 30% anionic polyacrylamide-polyacrylate co-polymer flocculants.

In order to optimise the behaviour of the flocculated material, it is preferable to limit the variance in the shear energy applied to the various flocs which are created during mixing. This is achieved with an in-line orifice injector system, which has been described hereinabove and with reference to various Figs. The concept here is to inject the polymer as a "mist" through the orifice instead of as a stream. However, it should be understood that the quill-shaped injector device may be modified by adapting the size of the perforations to approach a mist-like injection into the flow of MFT. When injected into a turbulent back-flow regime as shown in FIG. 6, the polymer is evenly distributed and flocculation is occurring throughout the pipeline cross section within 4 pipe diameters of the injection point. This rapid dispersion allows for precise control of the shear energies from the injection point to the point of deposition, and increases the percentage of the material that falls within the dewatering zone at a design point in the system. This fundamental behavioral understanding advances improved application of this technique, and allows results obtained from bench scale testing to be used in CFD modeling and scaled up to field operations.

Figure 32A:
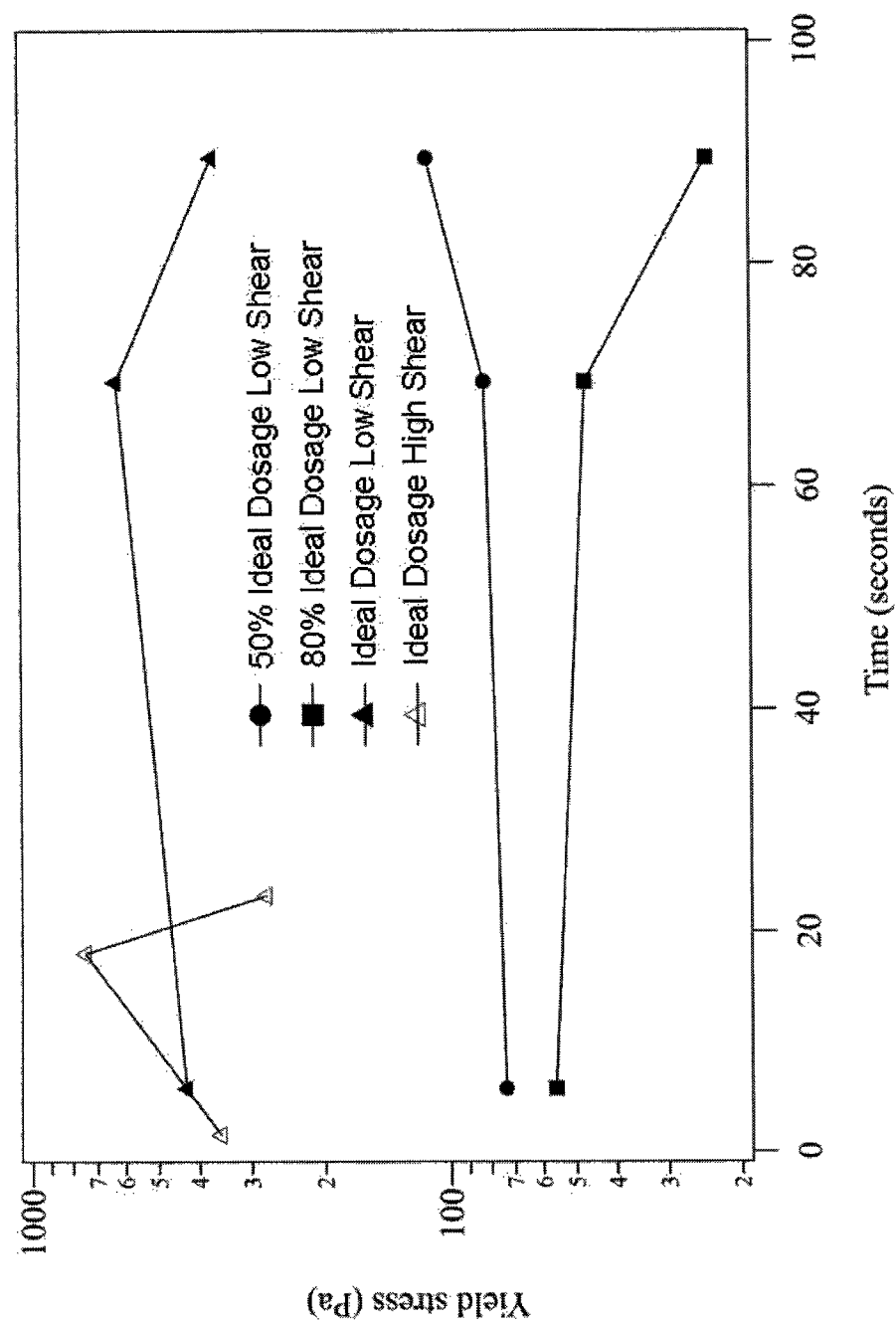
FIG. 32$a$ is a graph of shear progression curves of the pilot scale flocculated MFT (35 wt % solid).
Figure 32B:
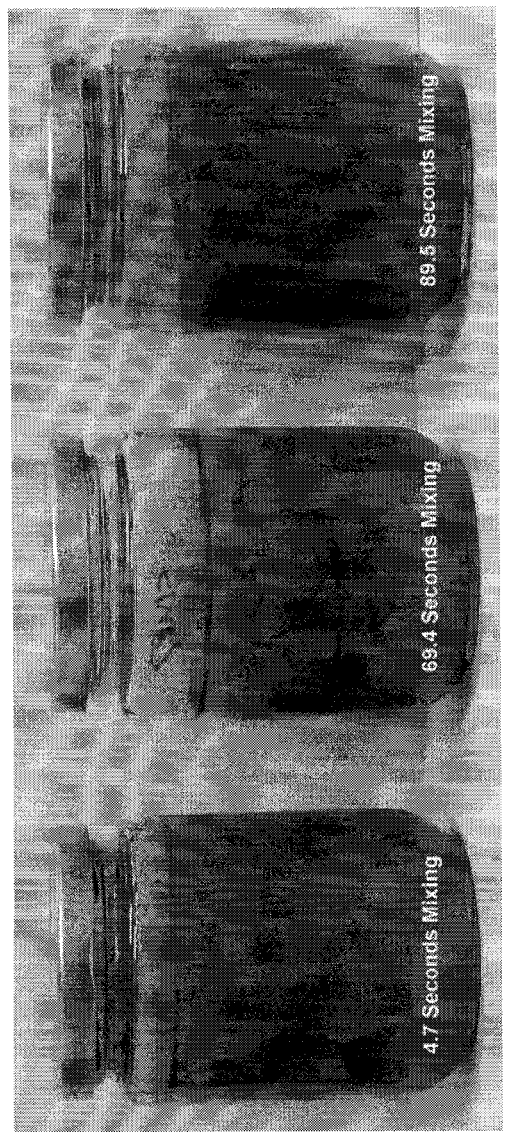

In a pilot test for the determination of mixing parameters, a 20-m long and 0.05-m diameter pipe loop fitted with the in-line orifice injector was used to investigate the shear response and dewatering behaviour of flocculated MFT. Sample ports are fitted to two locations along the length of the pipe. FIG. 32a shows that the yield strength progression in the pipe loop is similar to that observed in the laboratory jar mixer although the mixing energies are not directly comparable. MFT flow at 30 L/min corresponds to a mean velocity gradient of 22 $s^{-1}$ compared to 63 $s^{-1}$ in the bench scale test. Another test conducted at 100 L/min (176 $s^{-1}$) showed a more rapid floc buildup and breakdown similar to the 220 $s^{-1}$ test in the jar mixer. FIG. 32b shows flocculated MFT sampled at different locations during the test run for the optimally dosed MFT at 30 L/min (1000 g/tonne of solids in this case). Such data from the pilot and field tests may be used to inform and further develop mixing models for process design and monitoring of commercial scale MFT drying plants.

Regarding field observations, the rapid polymer dispersion by the orifice mixer caused the yield strength of flocculated material to increase very rapidly and resulted in the deposition of a two-phase fluid. Flocculated MFT and a separate water stream were observed at the discharge in one of the pilot tests.

Figure 33:
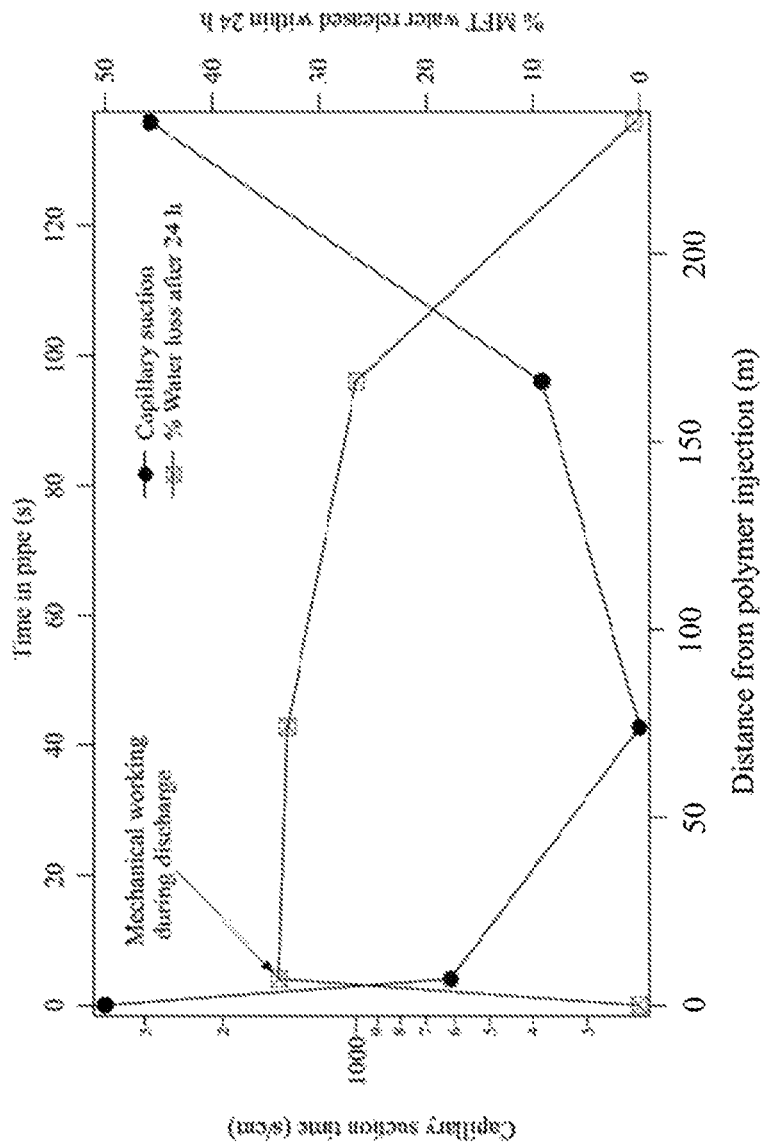
FIG. 33 is a graph of water release rate of flocculated MFT at various distances from the injection point.

A scaled up version of the orifice mixer was investigated in the field with optimally dosed 35-40 wt % MFT flowing at ~7500 L/min (32 $s^{-1}$) in 0.3 m pipe diameter, and deposited in cells at various distances from the injection point. FIG. 33 shows the extent of water release for each cell, both from actual sampling after 24 h and a capillary suction test conducted on the as-deposited flocculated MFT. The dewatering trend is analogous to the shear progression profile for the laboratory and pilot tests. Over 25% of the MFT water was released immediately after injection up to 175 m. Beyond this length, the water release rate decreased rapidly and the flocculated material properties resemble MFT.

Further dewatering occurs in the deposition slopes through drainage enhanced by the slope and by evaporation. The under-mixed material deposited at roughly 7 m from the discharge was further dewatered by mechanically working the material to reach the floc breakdown stage where more water is released from the flocculated material. Aggressive mechanical working however could break the deposit structure resulting in lower permeability and a restricted water release. Once the permeable structure is broken, dewatering is only by evaporation.

Figure 34:
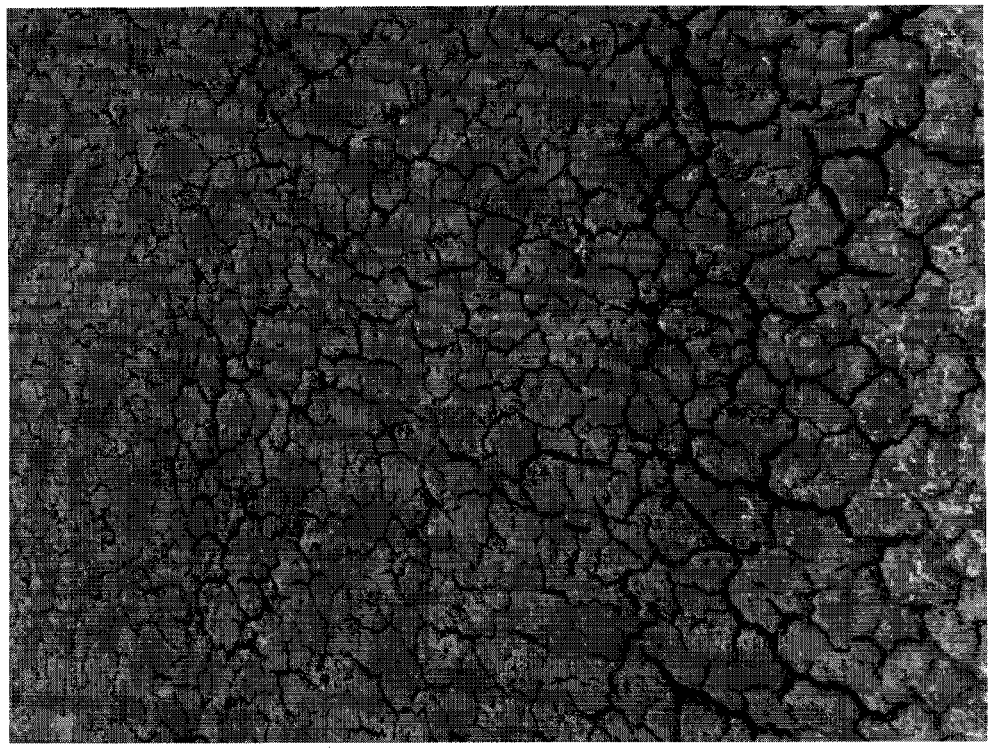
FIG. 34 is a photograph of crack formation in an optimally flocculated MFT after a few days.

Evaporation results in crack formation as shown in FIG. 34. Deepening cracks through dewatering allow for side drainage of release water into cracks and down the slope. Typical deposits up to 20 cm thick was found to dry beyond 80 wt % solids in 6-10 days after which a subsequent lift could be placed. Deep cracks as shown in FIG. 34 may also ameliorate the water drainage or release of a second flocculated MFT deposit laid on its surface by providing naturally occurring channels.

Example 9

Studies were conducted for automated polymer dosage control to compensate for variations in MFT feed properties in the dewatering process. Although the materials property limiting the polymer dosage of MFT is the clay mineral content in MFT, polymer has often been added on a solids or fines basis because of the difficulty in measuring the clay content in real time in a continuous process. The solids content (or slurry density) approximation is adequate when the polymer addition is optimized for a particular MFT stream with little variation in density or clay-to-water ratio (CWR). Variability in the feed properties, which often occurs when a dredge is used for MFT transfer, lead to an under- or over-dosed situation when polymer is added on a solids basis. Empirical correlations were developed between the yield stress and the CWR for MFT from three tailings ponds: Pond A, B and C. The MFT samples have varying bitumen contents, sand-to-fines, clay-to-fines and clay-to-water ratios. Coupled with the online density and volumetric flow measurements, a real-time clay-based polymer dosing strategy was developed. Unlike direct clay measurements, the yield stress of the MFT feed is amenable to rapid determination in a field environment either in a stand alone vane rheometer or in an online rheometer.

Four MFT samples were characterized to develop the relationship between yield stress and clay content. Three MFT samples were sourced from Pond A (with different slurry densities), Pond B and Pond C. Process effected water (PEW 2) was used as dilution water.

To facilitate the development of relationships between the yield stress and materials properties, detailed baseline characterization of the MFT samples was conducted. This includes solids content, Dean Stark extraction for bitumen, mineral and water determination, particle size distribution, methylene blue adsorption for clay activity (expressed as clay content) and process and pore water chemistry. Rheological tests were conducted in a Bohlin rheometer with the focus on yield stress measurement. Flow curves were generated in a controlled-stress mode permitting the application of Bingham plastic model for yield stress determination. A range of solids content was produced by dilution with PEW water or partial evaporation at a low temperature. Laboratory tests were on Pond A and C MFT. For actual field correlations, rheological measurements were conducted on another set of Pond A and B MFT samples. The polymer was a high molecular weight branched polyacrylamide-sodium polyacrylate co-polymer with about 30% anionicity.

The optimum polymer dosage required to flocculate and dewater three of the four characterized undiluted or dried MFT samples was determined using established procedures.

Regarding the relationship between shear yield stress and clay content, the below Tables show the baseline properties of the four MFT samples used in this study. The properties of interest, bitumen, minerals, fines, clay contents and water chemistry span the range typically observed for various MFT ponds. Pond A and STP have similar pore water chemistries and are similar to PEW 2 with very high Na/Ca equivalent ratios. Pond B pore water has similar total dissolved solids (ppm) as Ponds A and C but the chemistry is very different. Pond B has a significantly higher divalent ion concentrations (3-6 times less sodic than Ponds A and C). Both Ca and Mg are better coagulants than the monovalent ions and destabilize the clay suspension more effectively prior to flocculation. It is therefore conceivable that the mechanism of polymer interaction with Pond B MFT may have differences from Ponds A and C. The measurable Fe and the very low sulphate concentration in Pond B compared to Ponds A and C are due to presence of froth treatment tailings and the action of sulphate reducing bacteria feeding on a copius Fe source. Because of the different water chemistries, any correlation between the yield stress and the CWR may either include a correction factor for interaction forces between particles or, as done in this study, an empirical correlation for MFT with similar chemistries.

TABLE

Baseline characterization of MFT samples used for determining yield stress-clay content relationship.

| Sample ID | Dean Stark Avg. of duplicate analysis | | | % Solids (oven drying) | PSD (solid basis) | | Methylene Blue on MFT slurry Wt % clay | | |
|---|---|---|---|---|---|---|---|---|---|
| | Wt % Bitumen | Wt % Water | Wt % Mineral | Wt % Solid | Wt. % fines < 44 μm (sieve) | Wt % clay < 2 μm (sedigraph) | (activity)—solids basis | CWR | C(W + B)R |
| LAB 1 STUDIES | | | | | | | | | |
| Pond A Bulk as-received (Dredge 1 July 2009) | 4.5 | 57.5 | 37.9 | 42.0 | 74.0 | 46.8 | 55.8 | 0.37 | 0.34 |

TABLE-continued

Baseline characterization of MFT samples used for determining yield stress-clay content relationship.

| Sample ID | Dean Stark Avg. of duplicate analysis | | | % Solids (oven drying) | PSD (solid basis) | | Methylene Blue on MFT slurry | | |
|---|---|---|---|---|---|---|---|---|---|
| | Wt % Bitumen | Wt % Water | Wt % Mineral | Wt % Solid | Wt. % fines < 44 μm (sieve) | Wt % clay < 2 μm (sedigraph) | Wt % clay (activity)—solids basis | CWR | C(W + B)R |
| Pond A Low Density (Dredge 1 July 2009) | 2.1 | 66.8 | 30.4 | 32.6 | 89.3 | 50.3 | 78.9 | 0.36 | 0.35 |
| Pond A High Density (Dredge 1 July 2009) | 1.9 | 55.4 | 42.6 | 44.0 | 59.8 | 35.8 | 48.9 | 0.38 | 0.36 |
| Pond C | 0.6 | 76.4 | 22.0 | 22.3 | 98.8 | 65.5 | 99.6 | 0.29 | 0.29 |
| LAB 2 STUDIES | | | | | | | | | |
| Pond A (dredge 2 January 2010)—9.5" | 1.2 | 79.3 | 19.7 | 21.9 | 99.1 | N.M | 91.0 | 0.23 | 0.22 |
| Pond A (dredge 2 January 2010)—13.5" | 1.8 | 66.0 | 32.5 | 33.8 | 98.0 | N.M | 72.1 | 0.35 | 0.35 |
| Pond A (dredge 2 January 2010)—15.5" | 1.7 | 56.9 | 41.6 | 42.4 | 91.7 | N.M | 54.5 | 0.40 | 0.39 |
| Pond A (dredge 2 January 2010)—18" | 2.1 | 54.5 | 43.0 | 46.3 | 78.8 | N.M | 51.3 | 0.39 | 0.38 |
| Pond C (January 2010)—Average of 5 pails | 3.7 | 58.9 | 37.1 | N.M | 95.3 | N.M | 71.3 | 0.45 | 0.42 |

CWR—Clay-to-water ratio
C(W + B)—Clay-to water + bitumen ratio
N.M—Not measured.

TABLE

Chemistry of PEW 2 water used for dilution and MFT pore water

| Sample ID | Cation concentration (ppm) | | | | | Anion concentration (ppm) | | | | pH | IB | TDS | Σ(Na + K)/ (Ca + Mg) mole ratio |
|---|---|---|---|---|---|---|---|---|---|---|---|---|---|
| | Ca | K | Mg | Na | Fe | Cl | SO$_4$ | HCO$_3$ | CO$_3$ | | | | |
| Pond A Bulk as-received (Dredge 1 July 2009) | 9 | 21 | 4 | 707 | 0 | 323 | 179 | 1061 | 25 | 8.6 | 1.03 | 2329 | 80 |
| Pond A Low Density (Dredge 1 July 2009) | 7 | 18 | 2 | 672 | 0 | 321 | 150 | 1010 | 22 | 8.7 | 1.02 | 2202 | 115 |
| Pond A High Density (Dredge 1 July 2009) | 8 | 18 | 2 | 645 | 0 | 280 | 144 | 1011 | 22 | 8.6 | 1.03 | 2130 | 101 |
| Pond C | 9 | 19 | 4 | 813 | 0 | 536 | 241 | 940 | 15 | 8.5 | 1.02 | 2577 | 92 |
| Pond A (dredge 2 January 2010) | 8 | 13 | 5 | 668 | 0 | 438 | 219 | 976 | 0 | 7.9 | 0.92 | 2327 | 73 |
| Pond B (January 2010)—Average of 5 pails | 29 | 18 | 14 | 614 | 1 | 250 | 4 | 1434 | 0 | 8.2 | 0.97 | 2364 | 21 |
| PEW 2 | 10 | 12 | 5 | 617 | 0 | 409 | 194 | 651 | 9 | 8.4 | 1.06 | 1907 | 60 |

IB—ion balance;
TDS—Total dissolved solids

Figure 35:
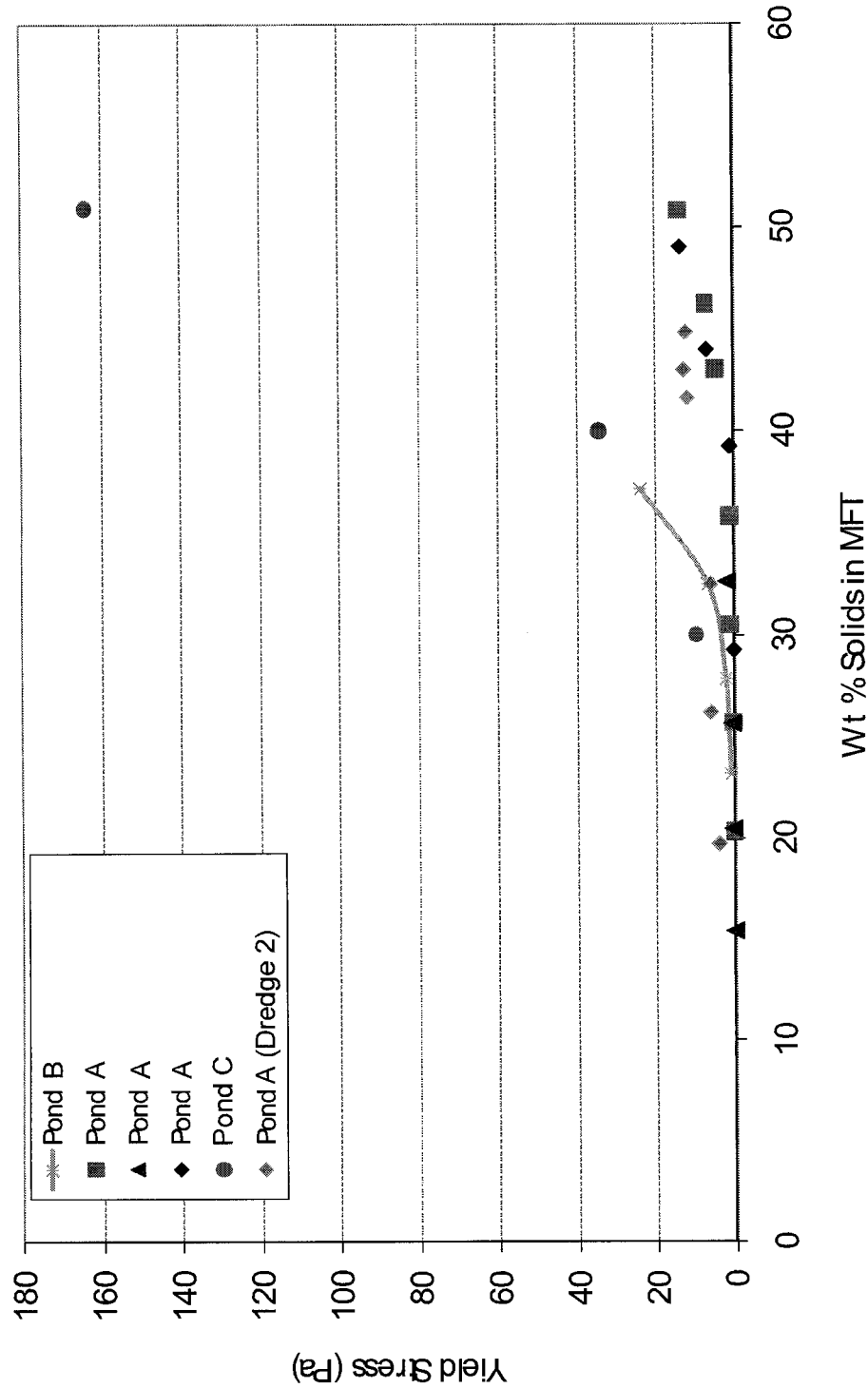
FIG. 35 is a graph of yield stress variation in MFT with variable sand-to-fines, clay-to-fines and clay-to-water ratios expressed as a function of the solids content. The Bingham yield stress measured with a Bohlin rheometer is reported for all the MFT samples except Pond B and Pond A (dredge 2) which are Brookfield's static yield stresses.
Figure 36:
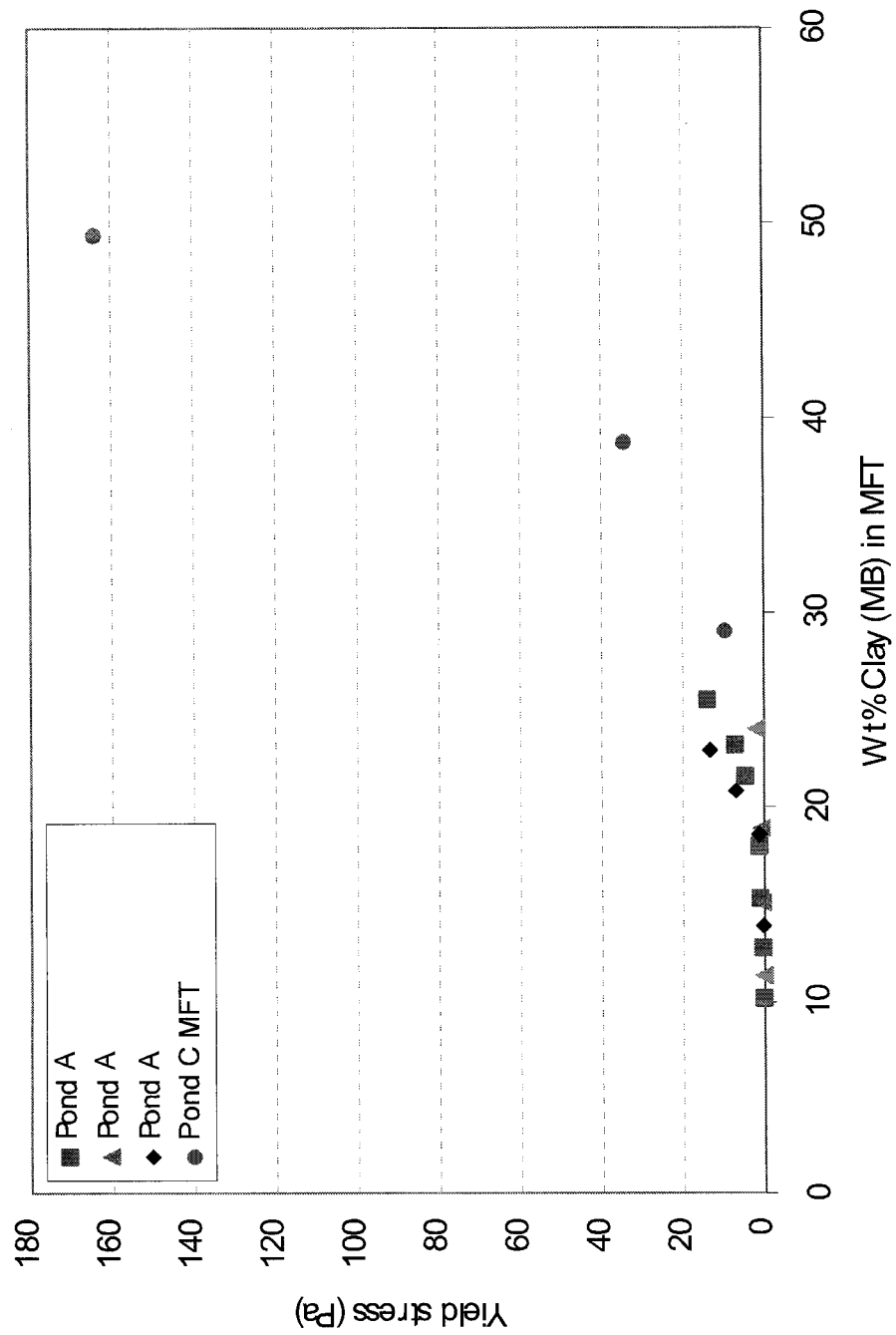
FIG. 36 is a graph of yield stress variation in MFT with variable sand-to-fines, clay-to-fines and clay-to-water ratios expressed as a function of the clay content in MFT.
Figure 37:
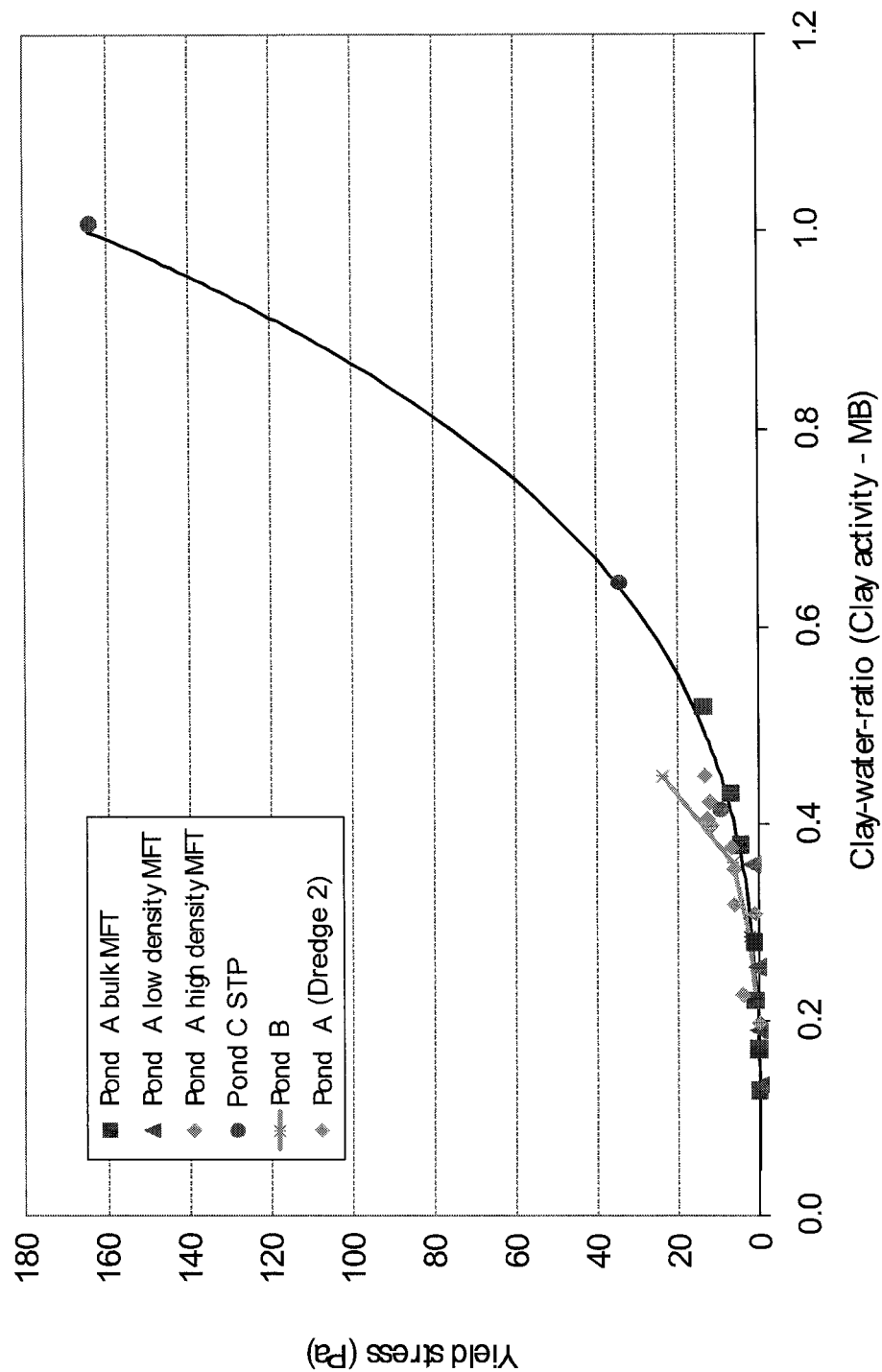
FIG. 37 is a graph of yield stress variation in MFT with variable sand-to-fines, clay-to-fines and clay-to-water ratios expressed as a function of the CWR. $R^2$ of the fitted curve to the Ponds A and C (Bingham yield stresses) is 0.96. The Bingham yield stress measured with a Bohlin rheometer is reported for all the MFT samples except Pond B and Pond A (dredge 2) which are Brookfield's static yield stresses.

FIG. 35 gives the relationship between yield stress and solids content for Ponds A and C MFT. The large variation observed especially between Pond C and the Pond A MFT samples reflects the clay activity variation in the MFT samples. Pond B MFT with a lower clay activity than Pond C follow a similar trend due to the higher divalent cations in Pond B. When the relationship is expressed as total clay content in MFT (derived from MB adsorption) rather than solids content, a better relationship is observed as shown in FIG. 36. However, given that flow behaviour is directly related to the amount and arrangement of active surfaces in the aqueous phase, a better correlation is between yield stress development and clay-to-water ratio shown in FIG. 37. Ponds A and C MFT now follow the same trend, but Pond B MFT does not. The empirical relationship between the CWR and the Ponds A and C MFT (Bingham yield measurements only) is expressed as a power function in Equation 1.

$$CWR(\pm 0.02) = 0.048 + 0.203 * \sigma^{0.303} \quad \text{Eq. 1}$$

σ is the shear yield stress in Pa.

Using an in-house Brookfield vane rheometer, the following empirical correlations are obtained for Pond A (dredge 2) and Pond B MFT.

$$CWR(Pond A) = 0.439 - 2.626 * \sigma^{-1.789} \quad \text{Eq. 2}$$

$$CWR(Pond B) = 0.970 - 0.734 * \sigma^{-0.114} \quad \text{Eq. 3}$$

The MFT samples did not develop significant yield stresses until the material reaches a CWR greater than 0.3.

Figure 38:
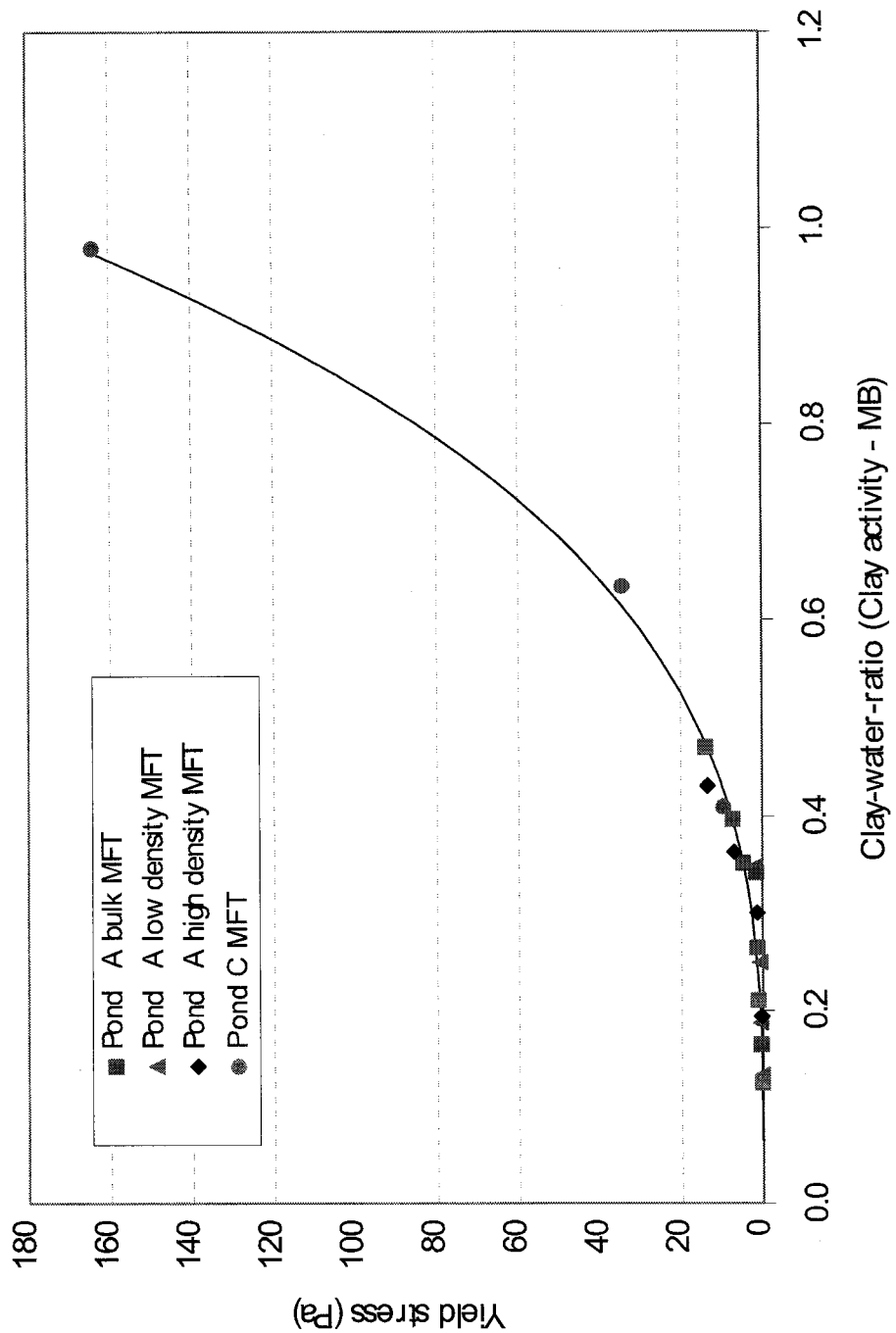
FIG. 38 is a graph of yield stress variation in MFT with variable sand-to-fines, clay-to-fines and clay-to-water ratios expressed as a function of the clay-to water+bitumen ratio. $R^2$ of the fitted curve is 0.96.

To determine the clay content from rheology measurements, the water content was required. In the field, this can be provided by a rapid moisture analyzer which counts the bitumen content as part of the solids. If a rapid moisture analyzer is not available the specific gravity (determined from a Marcy scale or nuclear density gauge) can be used. This entails developing a calibration between the clay-water+bitumen ratio and the yield stress (FIG. 38). The Marcy scale and nuclear density gauge measure the mineral content given that the specific gravity of bitumen is approximately 1. Empirical relationships between the clay to (water+bitumen) ratios are given below:

$$C(W+B)R(STP, Pond A) = 0.065 + 0.174 * \sigma^{0.324} \quad \text{Eq. 4}$$

The relationship in Equation 4 is for Ponds C and A measurements using the Bingham yield stress. Equations 5 and 6 are for static yield stresses measured with a Brookfield vane rheometer.

$$C(W+B)(Pond A) = 0.421 - 2.692 * \sigma^{-1.857} \quad \text{Eq. 5}$$

$$C(W+B)R(Pond B) = 0.855 - 0.645 * \sigma^{-0.124} \quad \text{Eq. 6}$$

Figure 39:
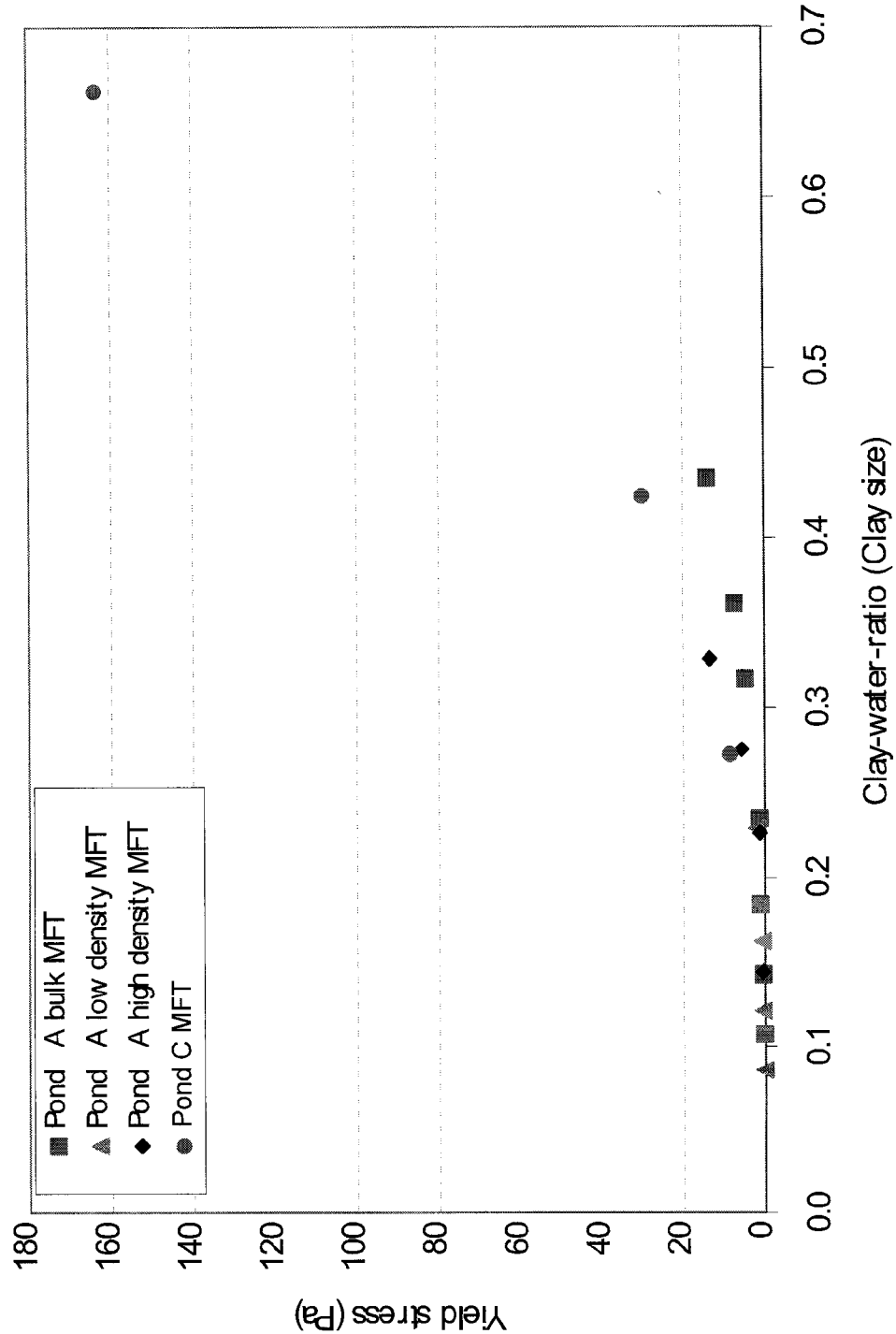
FIG. 39 is a graph of yield stress variation in MFT with variable sand-to-fines, clay-to-fines and clay-to-water ratios expressed as a function of the CWR (clay by size).
Figure 40:
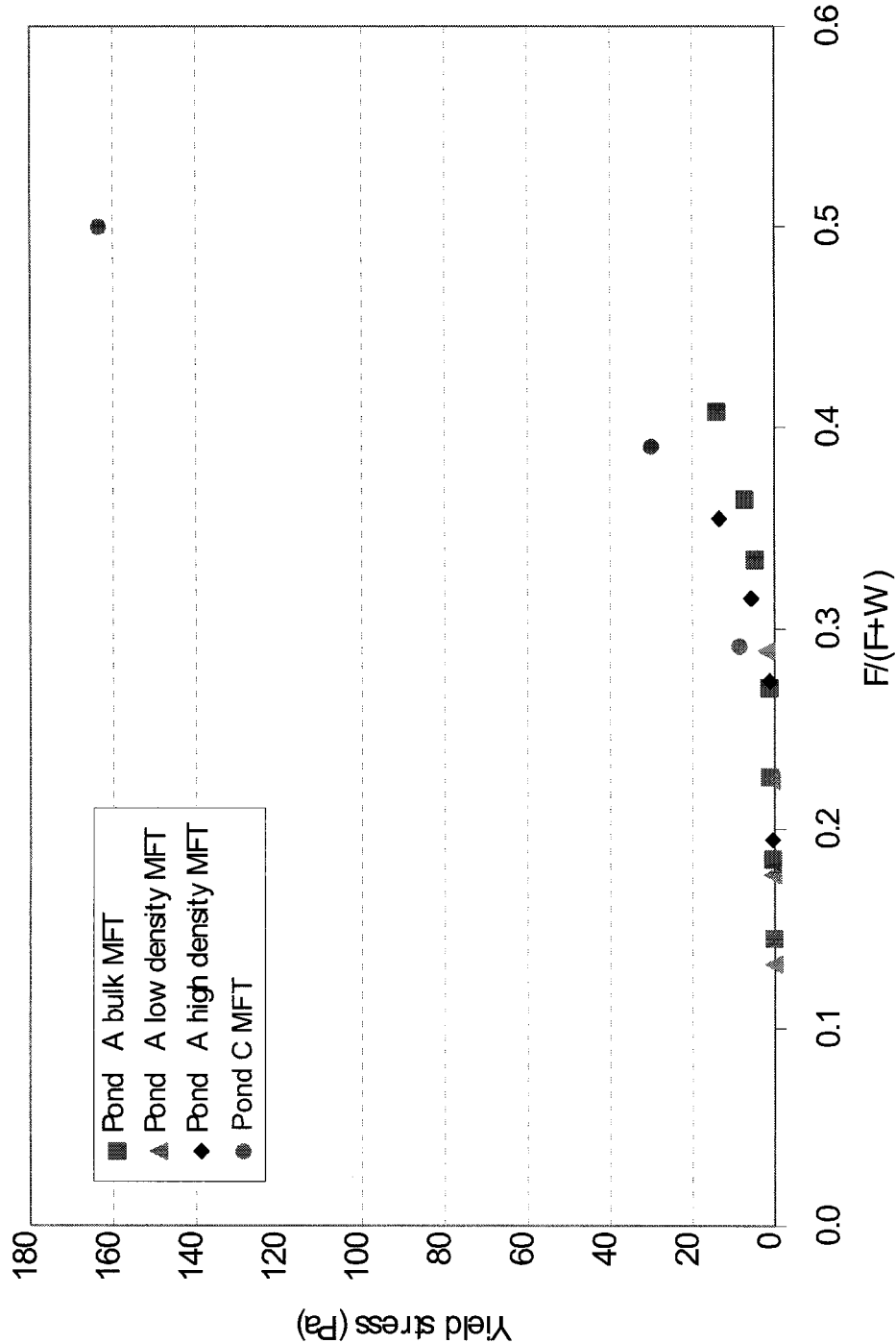
FIG. 40 is a graph of yield stress variation in MFT with variable sand-to-fines, clay-to-fines and clay-to-water ratios expressed as a function of the Fines content.

FIG. 39 and FIG. 40 describe the yield stress as a function of particles sizes (clay size and fines respectively). Both clay and fine sizes describe the flow behaviour better than solids content but they are approximations of the clay activity and not a true measure of the slurry rheology.

For use as a process control tool, the MFT static yield stress is measured and converted to CWR and C(W+B)R using Equations 1 to 6. If a moisture analyzer is available, the clay content in the MFT is simply:

$$\text{Wt \% clay in MFT} = CWR * \text{wt \% Moisture in MFT} \quad \text{Eq. 7}$$

If the specific gravity (SG) is available either from a Marcy scale or a nuclear density gauge, Equation 8 should be used.

$$\text{Wt \% clay in } MFT = 100 * C(W+B)R * \left[1 - \frac{2.62}{1.62} * \left(1 - \frac{1}{SG}\right)\right] \quad \text{Eq. 8}$$

Fines density may be approximately by about 2.62 g/cm3.

Figure 41:
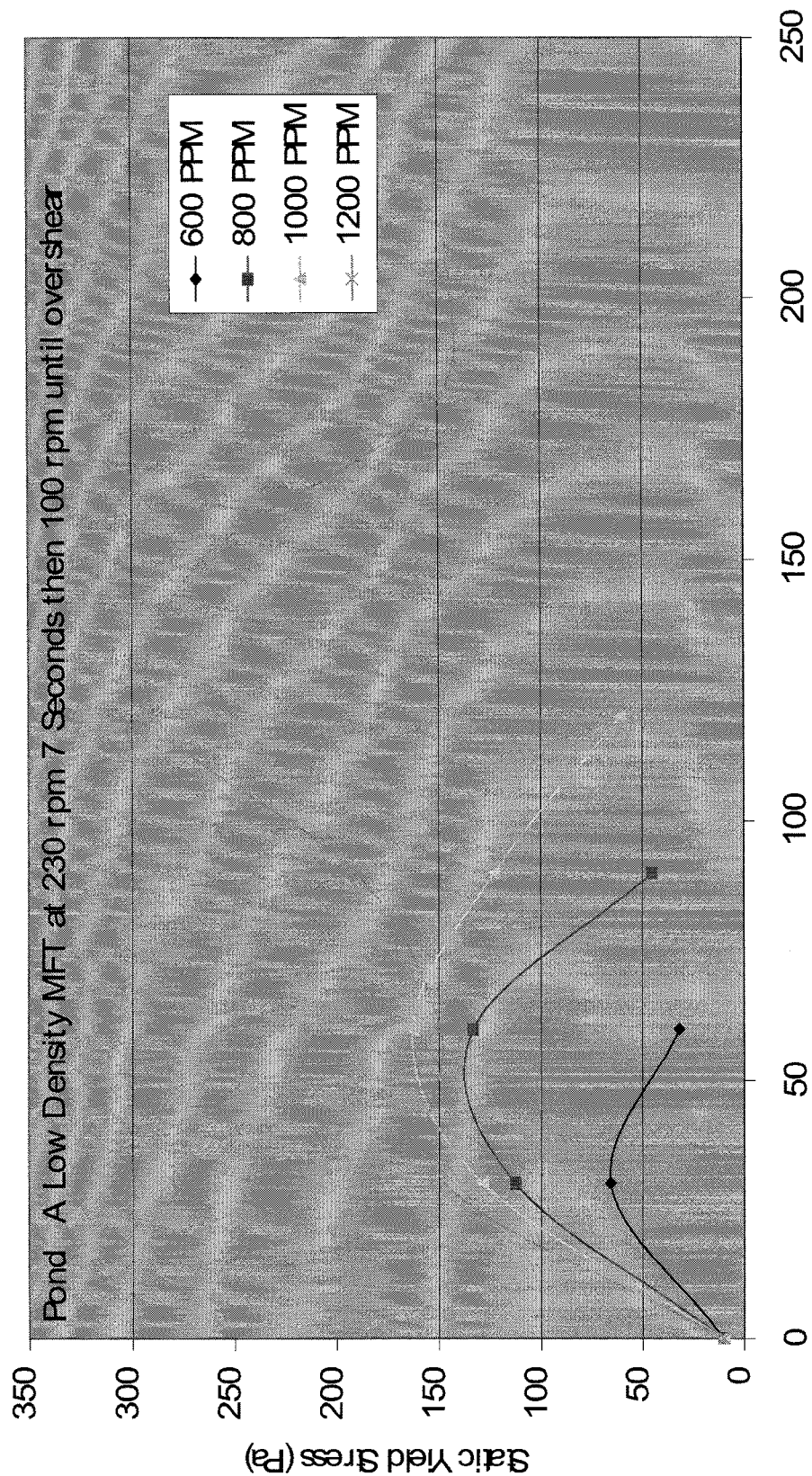
FIG. 41 is a graph of Pond A low density MFT response to shear at different polymer dosages. Optimum dosage is approximately 1200 g of polymer/tonne of solid.
Figure 42:
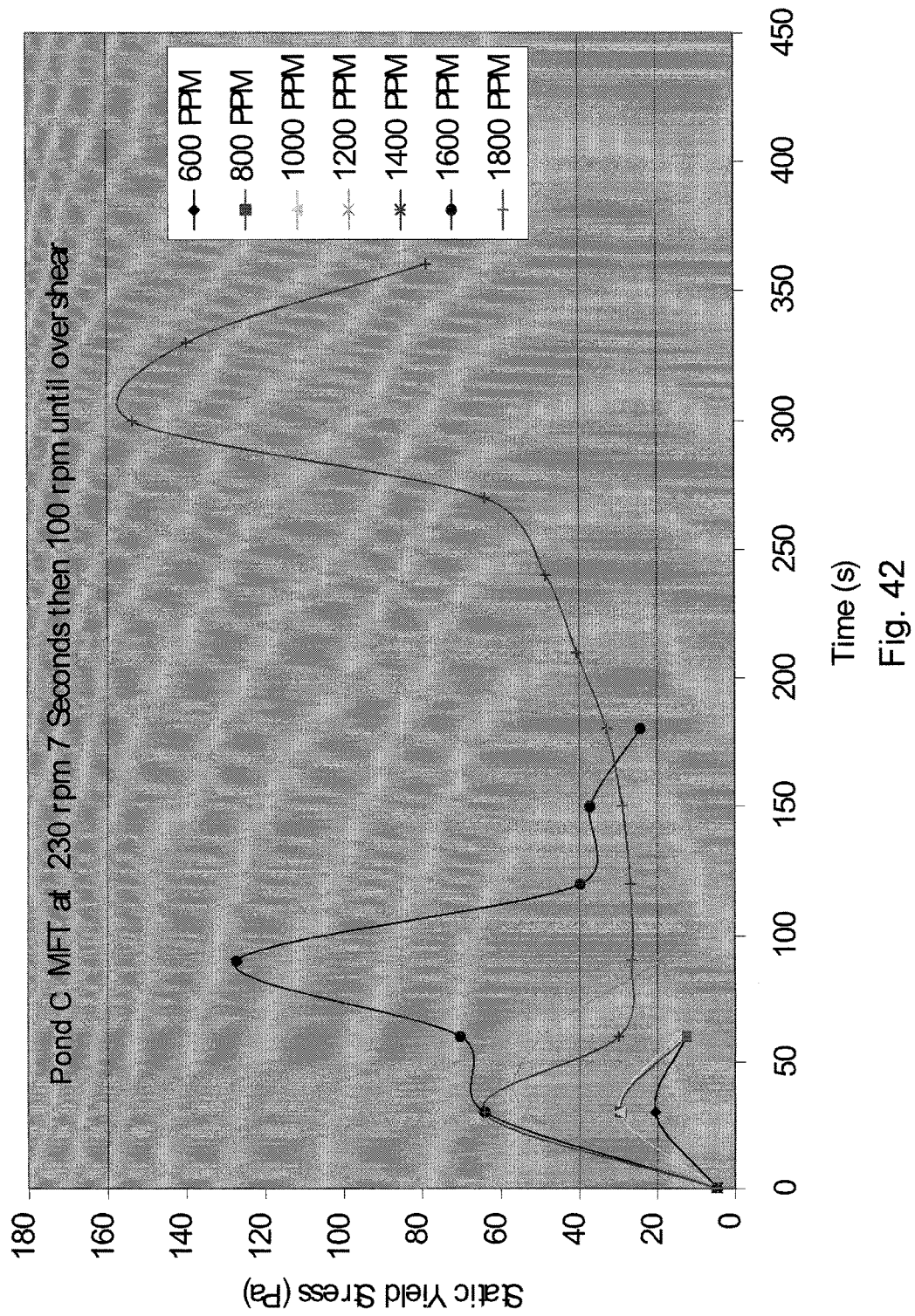
FIG. 42 is a graph of Pond C MFT response to shear at different polymer dosages. Optimum dosage is between 1600 and 1800 g of polymer/tonne of solid.
Figure 43:
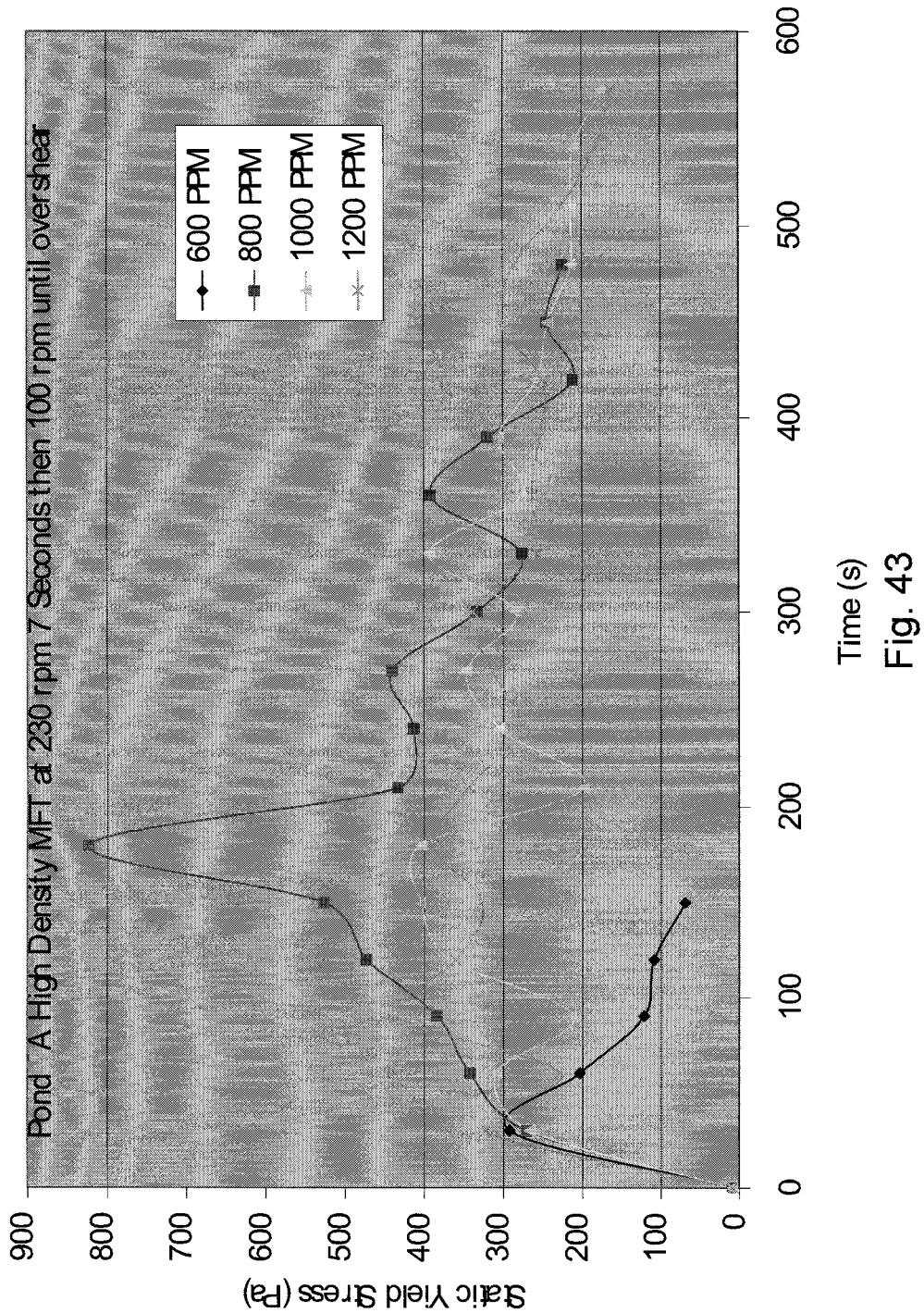
FIG. 43 is a graph of Pond A high density MFT response to shear at different polymer dosages. Optimum dosage is 800 g of polymer/tonne of solid.
Figure 44:
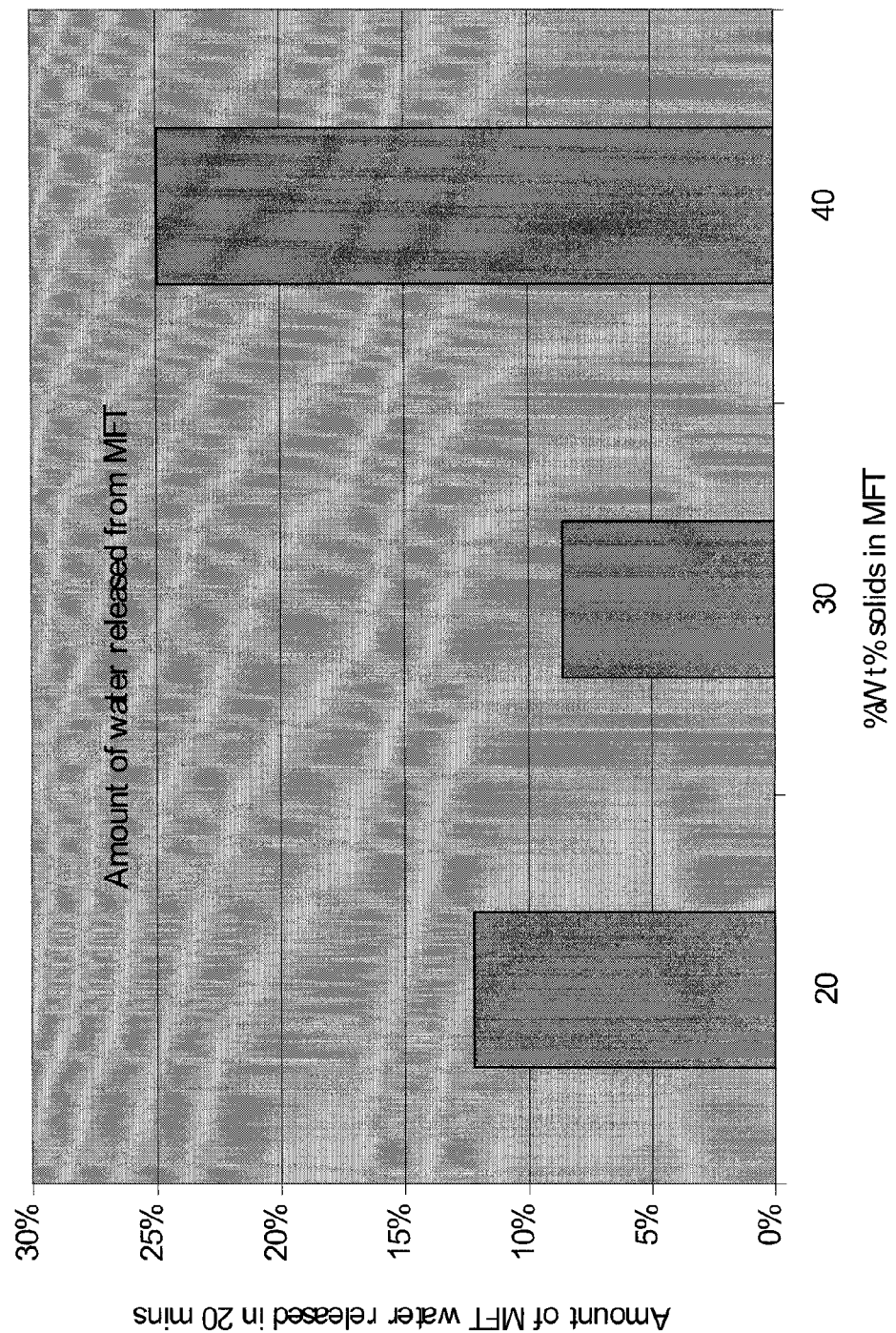
FIG. 44 is a bar graph of amounts of MFT water released at the optimum polymer concentration for Pond C (1600 g/tonne of solid), low density (1200 g/tonne of solid) and high density (800 g/tonne of solid) MFT respectively.

Regarding "optimum" polymer dosage, the response of Pond C and Pond A (dredge 1) MFT samples to polymer dosage is given by the strength curves in FIG. 41 to FIG. 43. The optimum polymer dosage frequently gives the optimum yield stress and highest water release rate. While the optimum was clearly established for the high density MFT at 800 g/tonne of solid (FIG. 43), the low density MFT has an optimum slightly higher than 1200 g/tonne of solid and Pond C MFT has an optimum between 1600 and 1800 g/tonne of solid. The amounts of water released are given in FIG. 44. The water release is highest for the high density MFT with a well defined optimum. The below table also gives the optimum polymer dosage of some of the MFT samples.

TABLE

Optimum polymer dosage at 220 s−1 initial mixing and 63 s−1 until complete floc breakdown.

| Sample ID | Wt % solids | Wt % clay (MB) | Optimum polymer dosage (g/tonne of solids) | Optimum polymer dosage (g/tonne of clay) |
|---|---|---|---|---|
| Pond A Bulk as-received (Dredge 1 July 2009) | 42.0 | 55.8 | Not determined | Not determined |
| Pond A Low Density (Dredge 1 July 2009) | 32.6 | 78.9 | 1275[1] | 1616 |
| Pond A High Density (Dredge 1 July 2009) | 44.0 | 48.9 | 851 | 1742 |
| Pond C | 22.3 | 99.6 | 1686[2] | 1693 |
| Pond A (dredge 2 January 2010)—9.5" | 21.9 | 91.0 | 1693 | 1861 |
| Pond A (dredge2 January 2010)—13.5" | 33.8 | 72.1 | 1278 | 1773 |
| Pond A (dredge 2 January 2010)—15.5" | 42.4 | 54.5 | 1002 | 1839 |
| Pond A (dredge 2 January 2010)—18" | 46.3 | 51.3 | 983 | 1914 |
| Pond B (January 2010)—Average of 5 pails | 40.8 (bit + min) | 71.3 | Pending | Pending |

[1]Slight underdose
[2]Approximate dose.

An equivalent dosage on a dry clay basis can be calculated as:

$$g \text{ polymer}/Te \text{ of clay} = g \text{ polymer}/Te \text{ of solid} * \frac{\text{wt \% solid in } MFT}{\text{wt \% clay in } MFT} \quad \text{Eq. 9}$$

"Te" means metric tonnes.

When expressed on a clay basis as in Equation 9, the polymer dosage is essentially equivalent at approximately 1850 g of polymer per tonne of dry clay (an average of the more accurately measured Pond A MFT samples from dredge 2), irrespective of the solids content or the types of minerals present in MFT. For this MFT type, if the dosage changes because of a more efficient polymer mixing, it will still be dependent on the available solids surface area, which is essentially the clay content which can be measured by methylene blue.

Embodiments of the present process can utilise flocculent dosing on a continuous and automated basis based on MFT solids with the solids (minerals) content determined using a nuclear density gauge and a volumetric flow meter. A simple relationship could be derived from Equations 1 to 8 to allow automatic polymer addition based on clay content while still using the solids (or minerals) content as input parameter.

$$g \text{ polymer}/Te \text{ of mineral} = 1850 * \frac{\text{wt \% clay in } MFT \text{ (Eq. 9)}}{\frac{2.62}{1.62}\left(1 - \frac{1}{SG}\right)} \quad \text{Eq. 10}$$

OR for Pond A and Pond C MFT using measuring the static yield stress and S.G, $$g \text{ polymer}/Te \text{ of mineral} = \qquad \text{Eq. 11}$$

$$1850 * \frac{0.421 - 2.692 * \sigma^{-1.857} * \left[1 - \frac{2.62}{1.62} * \left(1 - \frac{1}{SG}\right)\right]}{\frac{2.62}{1.62}\left(1 - \frac{1}{SG}\right)}$$

Equations 10 and 11 provide a useful guideline and relationship between the preferred polymer dosage and the measured clay content or shear yield stress of MFT. It permits a much closer control of dosage and dewatering characteristics of an MFT feed during operation. This relationship has been found to be particularly suitable to MFTs having lower divalent to monovalent cation ratios. It should also be noted that while this relationship has been pursued in detail with respect to specific Pond MFTs and process water, similar work may be done using MFTs and process waters with differing chemistries in order to derive a corresponding detailed relationship. It should also be noted that modifications to the type of flocculent used in the process may require modifications to this detailed relationship. The rationale behind using the yield stress as a measure of clay activity stems form the ease and speed of measuring rheological properties in a field operation environment. It has been found that the process setup can deliver the preferred dosage within 30 minutes of start up, from sampling to analysis and reporting, if appropriate field test facilities are provided onsite. In addition, given a fairly constant MFT density and flow rate, this setup can be successfully used as a process control tool. Alternatively, online rheometers may be incorporated into the setup to measure the rheology in real time and could be coupled to the polymer flocculent solution plant.

Example 10

In studying the rheology of a preferred polymer flocculent (a high molecular weight branched polyacrylamide-sodium polyacrylate co-polymer with about 30% anionicity), viscosity measurements for different concentrations of the branched polymer at several temperatures and shear rates were conducted using a Brookfield Dy-III viscometer in order to develop a general rheological model for the polymer solutions used to flocculate MFT.

Six solutions were prepared to investigate a wide range of polymer concentrations and also to determine the effect of the water type used to prepare the mixtures. Five of the solutions were prepared with process water while one solution was prepared with distilled water, as shown in the below Table.

TABLE

Polymer Solutions.

| Solution Concentration | Water Type | Water pH |
|---|---|---|
| 0.1% | Process | 8.22 |
| 0.2% | Process | 8.22 |
| 0.3% | Process | 8.22 |
| 0.45% | Process | 8.22 |
| 0.6% | Process | 8.22 |
| 0.3% | Distilled | 7.86 |

Figure 45:
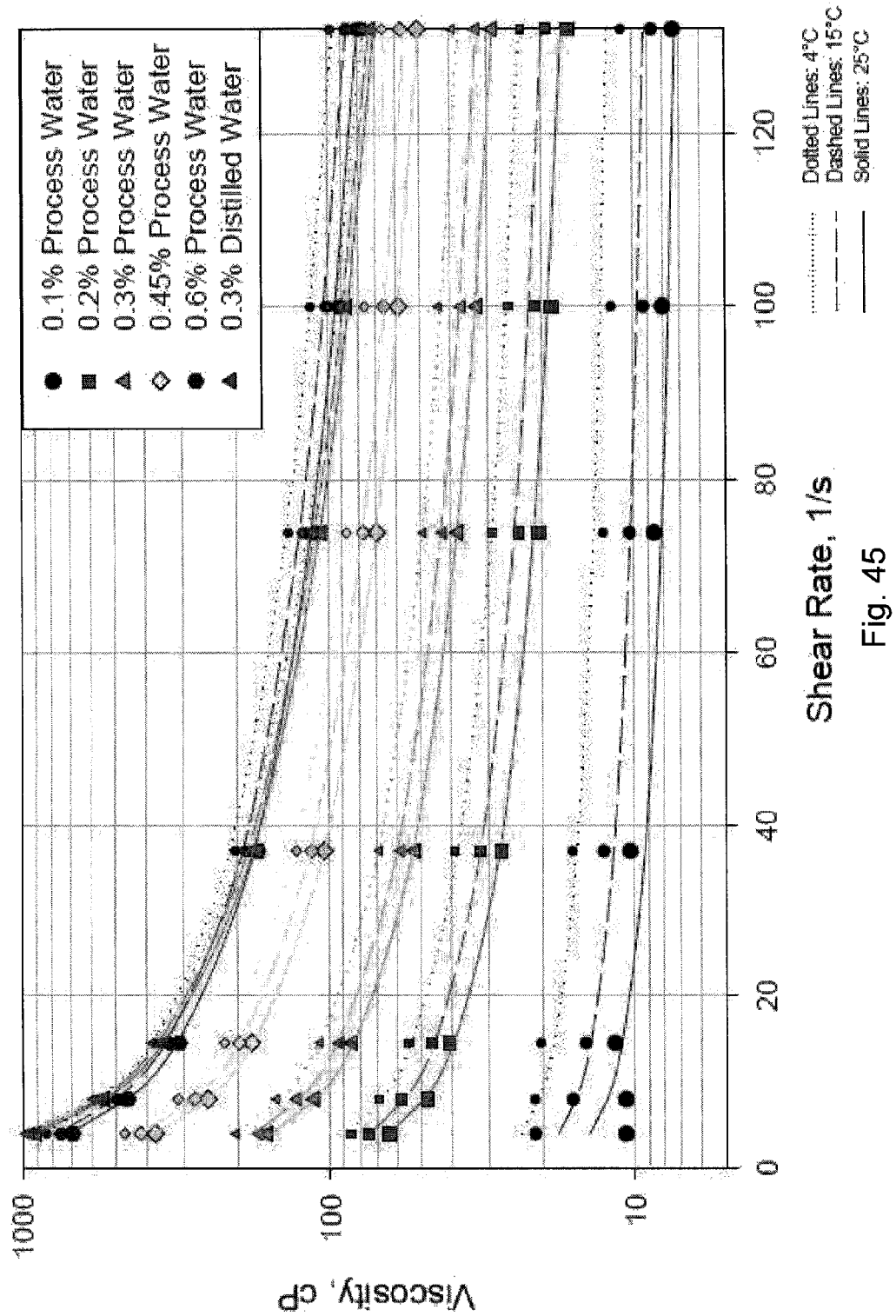
FIG. 45 is a graph of viscosity measured a few hours after solution preparation at various shear rates and temperatures for six polymer mixtures.

The viscosity was measured over a wide range of shear rates and at three temperatures using the SSA (Small Sample Adapter) Spindle 18. The first set of measurements were made a few hours after mixing up the solutions (first Table below) and the measurements were repeated 24 hours later (second Table below): there was almost no difference in the measured viscosity for the two data sets. The data in the first Table is plotted in FIG. 45, from which it is evident that the polymer is a shear-thinning power-law fluid for which the viscosity increases with concentration and decreases with temperature. Comparing the two curves for a solution concentration of 0.3%, it is clear from FIG. 45 that a mixture with distilled water has significantly higher viscosity.

TABLE

Viscosity measured a few hours after solution preparation at various shear rates and temperatures for six polymer mixtures.

| Temperature (°C.) | Concentration (%) | Viscosity (cP) at defined Shear Rate | | | | | | |
|---|---|---|---|---|---|---|---|---|
| | | 3.96 s$^{-1}$ | 7.92 s$^{-1}$ | 14.5 s$^{-1}$ | 37.0 s$^{-1}$ | 73.9 s$^{-1}$ | 100 s$^{-1}$ | 132 s$^{-1}$ |
| 25 | 0.1 | 10.7 | 10.7 | 11.6 | 10.3 | 8.57 | 8 | 7.36 |
| 25 | 0.2 | 64 | 48 | 40.7 | 27.4 | 20.6 | 18.5 | 16.3 |
| 25 | 0.3 | 160 | 112 | 84.4 | 52.6 | 37.7 | 32.4 | 28.8 |
| 25 | 0.45 | 373.3 | 250.7 | 180.4 | 104 | 69.7 | 58.9 | 50.9 |
| 25 | 0.6 | 693.3 | 458.7 | 311.3 | 171.4 | 110.3 | 91.8 | 78.4 |
| 25 | 0.3* | 906.7 | 544 | 346.2 | 171.4 | 105.1 | 86.3 | 71.7 |
| 15 | 0.1 | 21.3 | 16 | 14.5 | 12.6 | 10.3 | 9.26 | 8.64 |
| 15 | 0.2 | 74.7 | 58.7 | 46.5 | 32 | 24 | 21.1 | 19.2 |
| 15 | 0.3 | 170.7 | 128 | 93.1 | 58.3 | 42.3 | 36.6 | 32.6 |
| 15 | 0.45 | 416 | 277.3 | 197.8 | 114.3 | 77.1 | 65.7 | 57.6 |
| 15 | 0.6 | 757.3 | 496 | 337.5 | 185.1 | 120 | 101.1 | 86.7 |
| 15 | 0.3* | 949.3 | 570.7 | 360.7 | 180.6 | 112.6 | 90.9 | 76.5 |
| 4 | 0.1 | 21.3 | 21.3 | 20.4 | 16 | 12.6 | 11.8 | 10.9 |
| 4 | 0.2 | 85.3 | 69.3 | 55.3 | 38.9 | 29.1 | 25.7 | 23.4 |
| 4 | 0.3 | 202.7 | 149.3 | 107.6 | 68.6 | 49.1 | 43.4 | 39 |
| 4 | 0.45 | 469.3 | 314.7 | 221.1 | 128 | 87.4 | 75.8 | 66.2 |
| 4 | 0.6 | 842.7 | 544 | 369.5 | 203.4 | 135.4 | 114.1 | 97.9 |
| 4 | 0.3* | 981.3 | 597.3 | 381.1 | 194.3 | 122.3 | 99.8 | 84.2 |

*Solution prepared with distilled water instead of process water

TABLE

Viscosity measured 24 hours after solution preparation at various shear rates and temperatures for six polymer mixtures.

| Temperature (° C.) | Concentration (%) | Viscosity (cP) at defined Shear Rate | | | | | | |
|---|---|---|---|---|---|---|---|---|
| | | 3.96 s$^{-1}$ | 7.92 s$^{-1}$ | 14.5 s$^{-1}$ | 37.0 s$^{-1}$ | 73.9 s$^{-1}$ | 100 s$^{-1}$ | 132 s$^{-1}$ |
| 25 | 0.1 | 10.7 | 10.7 | 11.6 | 10.3 | 8.57 | 8 | 7.36 |
| 25 | 0.2 | 64 | 48 | 40.7 | 28.6 | 21.1 | 18.5 | 16.6 |
| 25 | 0.3 | 149.3 | 112 | 81.5 | 52.6 | 37.7 | 32.4 | 28.5 |
| 25 | 0.45 | 362.7 | 250.7 | 177.5 | 102.9 | 69.1 | 58.5 | 50.6 |
| 25 | 0.6 | 682.7 | 453.3 | 308.4 | 169.1 | 109.1 | 90.9 | 77.8 |
| 25 | 0.3* | 906.7 | 544 | 346.2 | 171.4 | 105.7 | 86.3 | 72 |
| 15 | 0.1 | 21.3 | 16 | 14.5 | 12.6 | 10.3 | 9.26 | 8.64 |
| 15 | 0.2 | 74.7 | 58.7 | 46.5 | 32 | 24 | 21.1 | 18.9 |
| 15 | 0.3 | 170.7 | 128 | 93.1 | 59.4 | 42.3 | 36.6 | 32.3 |
| 15 | 0.45 | 405.3 | 277.3 | 197.8 | 113.1 | 76 | 64.8 | 57 |
| 15 | 0.6 | 757.3 | 496 | 337.5 | 184 | 119.4 | 100.2 | 86.1 |
| 15 | 0.3* | 949.3 | 570.7 | 360.7 | 180.6 | 112.6 | 91.8 | 76.5 |
| 4 | 0.1 | 21.3 | 21.3 | 20.4 | 16 | 12.6 | 11.8 | 10.9 |
| 4 | 0.2 | 85.3 | 74.7 | 55.3 | 37.7 | 28.6 | 25.3 | 23 |
| 4 | 0.3 | 202.7 | 149.3 | 110.5 | 68.6 | 49.1 | 43.4 | 39.4 |
| 4 | 0.45 | 458.7 | 314.7 | 221.1 | 128 | 87.4 | 75.4 | 65.9 |
| 4 | 0.6 | 842.7 | 544 | 369.5 | 203.4 | 133.7 | 113.3 | 97.9 |
| 4 | 0.3* | 1003 | 602.7 | 381.1 | 195.4 | 122.9 | 100.2 | 83.2 |

*Solution prepared with distilled water instead of process water

It should be noted that the data points at the lowest concentration and the lowest shear rate have a certain degree of uncertainty due to the very low torque value at those conditions. The viscosity measurements at the lowest polymer concentration could be repeated using the lower torque Brookfield DV-III Ultra-LV viscometer to improve the accuracy of the results.

Regarding curve fits, a standard expression for non-Newtonian power law fluid viscosity is given by:

$$\mu = k\dot{\gamma}^{n-1} e^{T_0/T}$$

where k is the consistency index, n is the power-law index and $T_0$ is the reference temperature. The data points in the first Table were fit to this form of curve and are plotted as lines in FIG. 45. It is obvious from FIG. 45 that a very good fit of the data can be obtained using the expression in the above Equation, with the exception of the 0.1% solution data at low shear.

Figure 46:
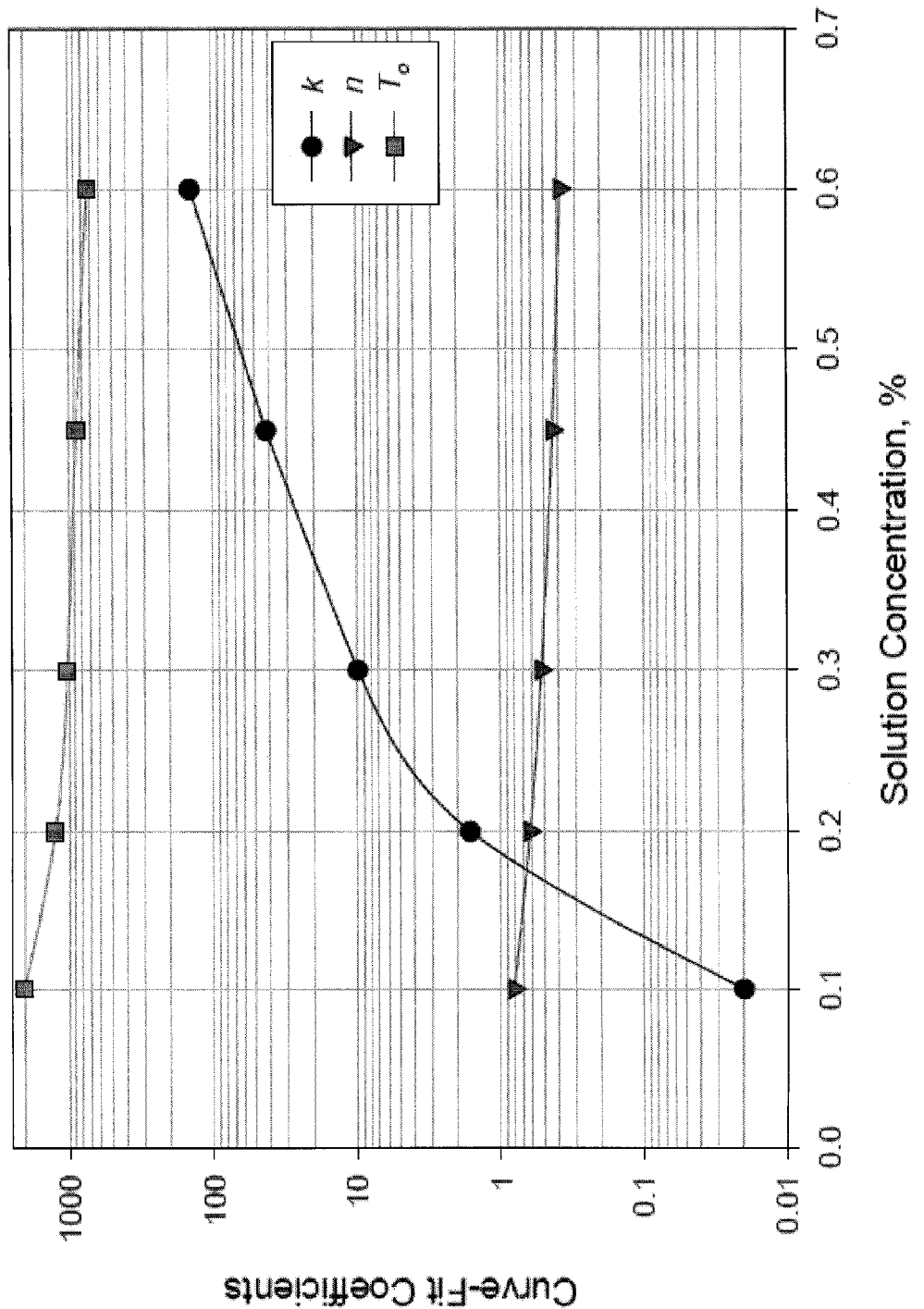
FIG. 46 is a graph of viscosity coefficients plotted versus concentration.

The coefficients for each of the six solutions are given in the below Table. In FIG. 46, the coefficients are plotted versus concentration.

TABLE

Curve-fit coefficients for six polymer mixtures.

| Coefficient | Concentration (%) | | | | | |
|---|---|---|---|---|---|---|
| | 0.1 | 0.2 | 0.3 | 0.45 | 0.6 | 0.3* |
| k [cP s$^{n-1}$] | 0.0199 | 1.634 | 9.7939 | 42.250 | 141.01 | 798.14 |
| n | 0.8102 | 0.6242 | 0.5176 | 0.4278 | 0.3749 | 0.2701 |
| $T_0$ [K] | 2034.6 | 1248.2 | 1024.1 | 1024.1 | 733.1 | 337.3 |

*Solution prepared with distilled water instead of process water

Viscosity measurements for different concentrations of a preferred branched anionic polymer at several temperatures and shear rates resulted in the following indications:

The polymer mixtures were shear-thinning power-law fluids for which the viscosity increases with concentration and decreases with temperature.

The viscosity is highly dependant on the type of water used to prepare the polymer solution: use of distilled water results in much higher viscosity than process water.

Viscosity of all samples remained essentially unchanged when measured a few hours after the solution was prepared and again 24 hours later.

Curve-fits of the viscosity data were obtained using a power-law expression with a temperature correction term and could be correlated with polymer concentration to provide a complete model of the polymer viscosity, for that water and polymer.

The polymer flocculent solution may be prepared depending on the given polymer and water chemistry to obtain the desired viscosity and reactivity.

Example 11

Trials on MFT from Pond A were conducted to assess various aspects of the dewatering process. An important understanding gained from this experimental program was that while polymer treatment was necessary to initiate flocculation of fine clays and dewatering of MFT, in some instance it was preferable to remove the release water from the deposit to permit further drying. Hence, details such as cell slope, length and drainage paths are considerations in the design of drying cells to achieve improved drying time.

The main findings from these tests are discussed in this example section. The MFT dewatering process can be said to consist of two operations, the polymer treatment and water removal in drying cells; using both is preferred for the drying of treated MFT solids. Note that the configuration of Pond A deposition cells is shown in FIG. 22.

Regarding polymer treatment performance, successful treatment of Pond A MFT with a high molecular weight branched polyacrylamide-sodium polyacrylate co-polymer with about 30% anionicity, was demonstrated with the use of two types of polymer injectors over different mixing lengths. The purpose of this treatment was to quickly disperse the polymer into the MFT stream using quill-type and co-annular mixers to flocculate clays particles. The flocculated aggregate of water, clays and polymer up to this point gained enough shear strength to stack up, but if deposited too soon was still a network and would not release free water. Further pipeline transport provided more shearing of the material; when the right amount of structural breakdown of flocs had been applied, free water was then released while flocculated material consolidated which may have been from their own weight. The amount of structural breakdown was controlled by varying pipeline transport distance between the injector and the deposition cell (also referred to herein as a "drying cell"). The significance of attaining the right breakdown has at least two important aspects: 1) the initial water release was significant as about 30% of original MFT water was shed within the 1st day, and 2) the deposit also had the lowest water retention, which improved water drainage from the deposit during the subsequent drying.

When too long a pipe length was used, flocs became "oversheared" (too much breakdown occurred): the flocculated material turned back to a continuous network and no water was released. Drying in such case was accomplished mainly by evaporation, a slower process than drainage.

It was possible to determine the degree of flocculation (under/overshear condition) and the dewatering zone of treated MFT by measuring its yield stress and CST. To maintain optimal treatment, both parameters would preferably be monitored frequently throughout the MFT dewatering operation. CST is an apt indication of the deposit's readiness in releasing water initially (e.g. as surface run-off) as well as the ease with which water migrates through the deposit toward the toe of cells. It is reasoned that the first property has a significant dependence on self-weight consolidation of clay flocs (a function of the flocs' hydrodynamic characteristic and type of polymer) and the second property is related to the connectivity and size of network of pores within the deposit.

Figure 47:
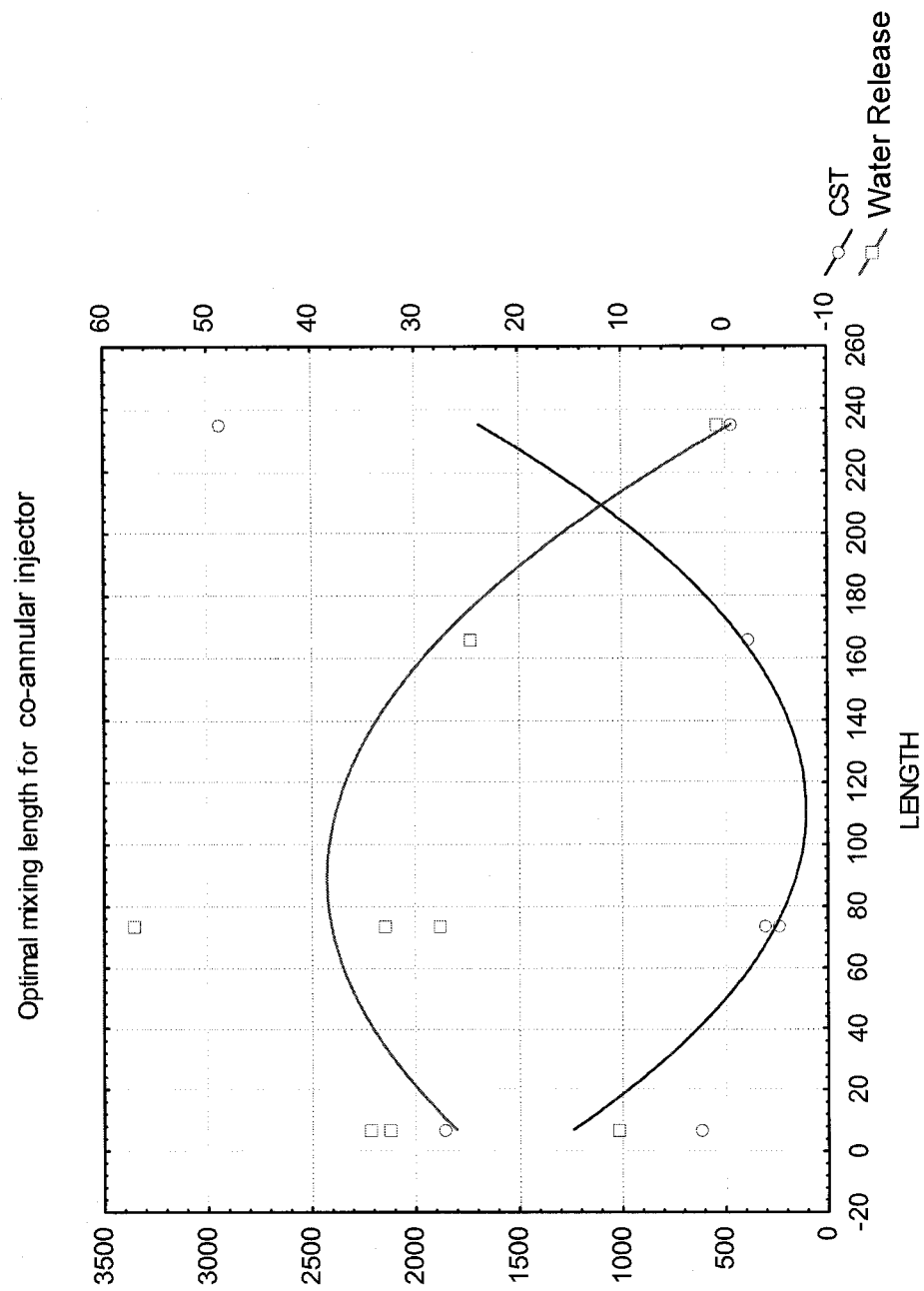
FIG. 47 is a graph of CST and water release versus conditioning pipe length using a co-annular injector.
Figure 48:
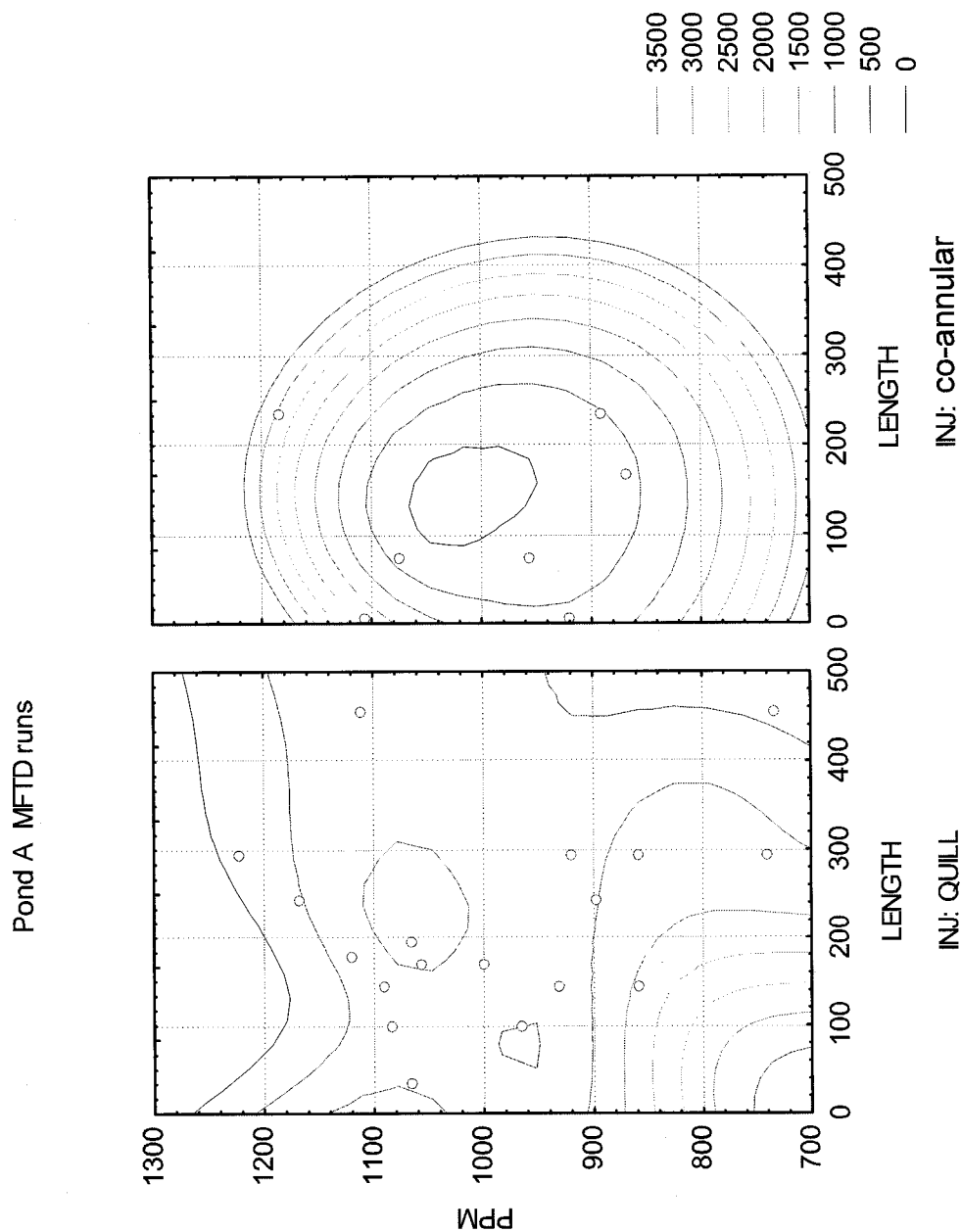
FIG. 48 is a two part distance-weighted-least-square graph of polymer flocculent dosage versus conditioning pipe length comparing the quill-type and co-annular-type injectors.

It was found that the co-annular injector was superior to the quill-type injector notably because of the former's rapid dispersion of polymer solution into the MFT stream, hence generating flocs that consolidate more readily. This injector yielded better dewatering rate, higher solid content after 1st day and greater % solids increase rate (also referred to herein as "rate of rise"). On a practical field trial level, the co-annular injector-mixer has a preferred range of 50 m-150 m of mixing length for the pipeline reactor prior to deposition. This range corresponds to the low CST interval, i.e. the lowest CST values, and hence yields greater initial dewatering: both result in shorter drying time (FIG. 47). When the analysis was extended to include polymer dosage, it appeared there was an optimal region of polymer dosage and shear level to yield the lowest CST. A contour plot of CST versus polymer dosage and mixing length for the co-annular injector suggested the best operating range to be about 950 to about 1050 ppm for polymer dosage and about 90 m to about 200 m for pipeline conditioning length (FIG. 48). It is nonetheless suggested to use a conservative limit of 150 m and to perform post-deposition shearing techniques on the deposit if necessary. For the quill injector, tested for deposition cells 1-6, 11-13, the CST contour plot suggested these cells were slightly underdosed. Optimum dosage seemed to increase with mixing length, conceivably to offset the extra polymers consumed in re-flocculating the broken flocs. The quill injector also appeared to require higher polymer rate than the co-annular injector.

Certain difficulties were encountered in treating low density MFT (e.g. below 28% mineral) as there was a higher tendency to overshear the material. To mitigate or avoid this occurrence, one may preferably avoid low density MFT if possible or, when treating low density MFT, use short mixing lengths or change injection location to minimize the pipeline length.

Regarding drying performance, dewatering and drying took place in drying cells where water was released from solids flocs until the deposit reaches 75% solids content. Two mechanisms were noted. First, as solids flocs started to stack on the surface of drying cells there was an initial release of water whereby free water was seen running off the surface of the deposit toward the toe of cells. Solids content reached around 45% after the first day. Water continued to release but most of the migration through the deposit occurred below surface. Water migration was a far more effective means in removing water than evaporation (two to three times better). Evaporation was a secondary and slower drying mechanism. It becomes apparent that the ability to drain water away from the deposit is preferred to the performance of drying cells. As was seen with some cells, insufficient slope and inadequate drainage or runoff facility can hinder drying beyond 60% solids content.

Figure 49A:
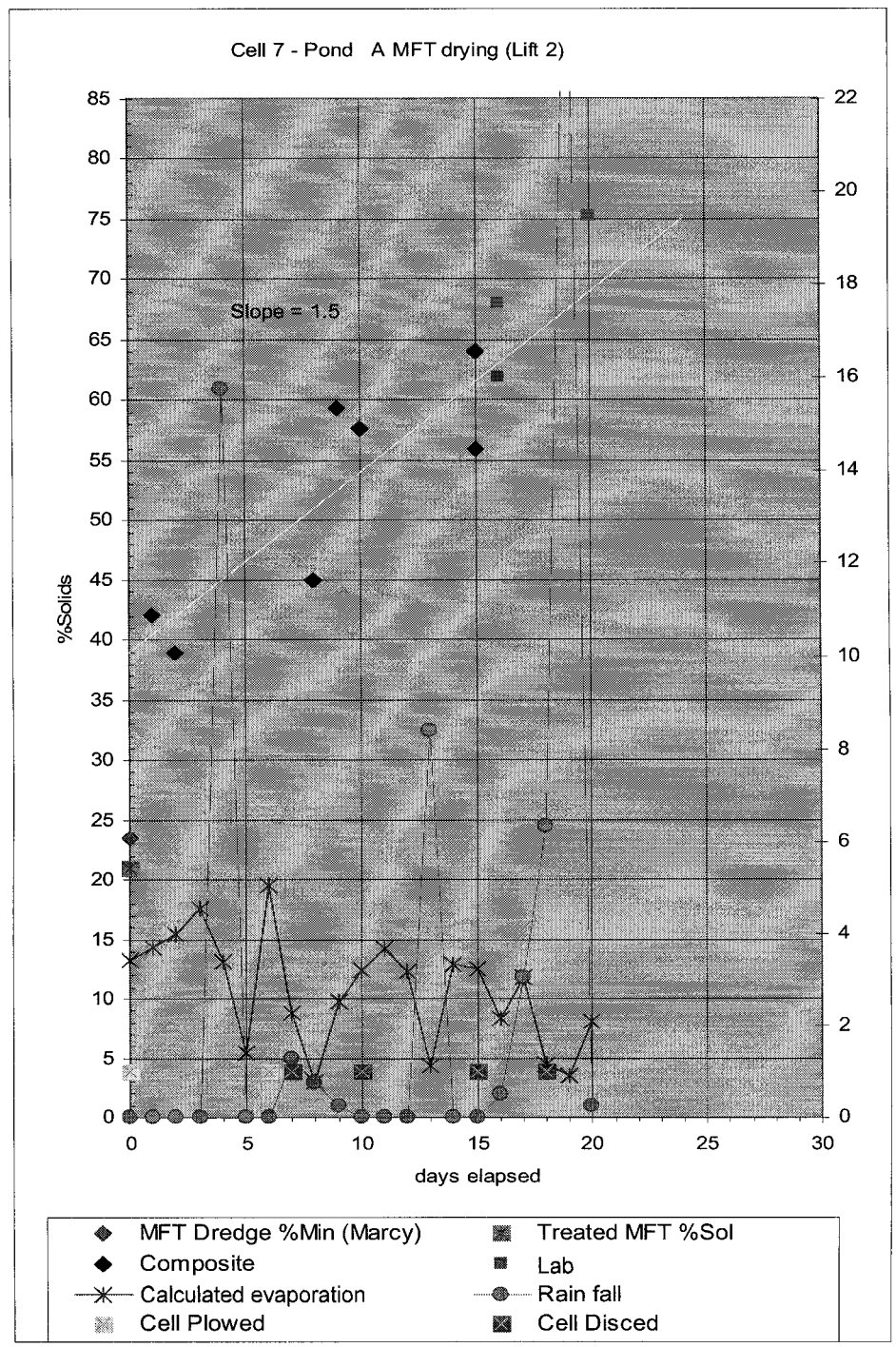
FIGS. 49$a$, 49$b$, and 49$c$ are graphs of various deposition data over time for three cells into which flocculated MFT was deposited, showing dewatering and drying of the deposit.
Figure 49B:
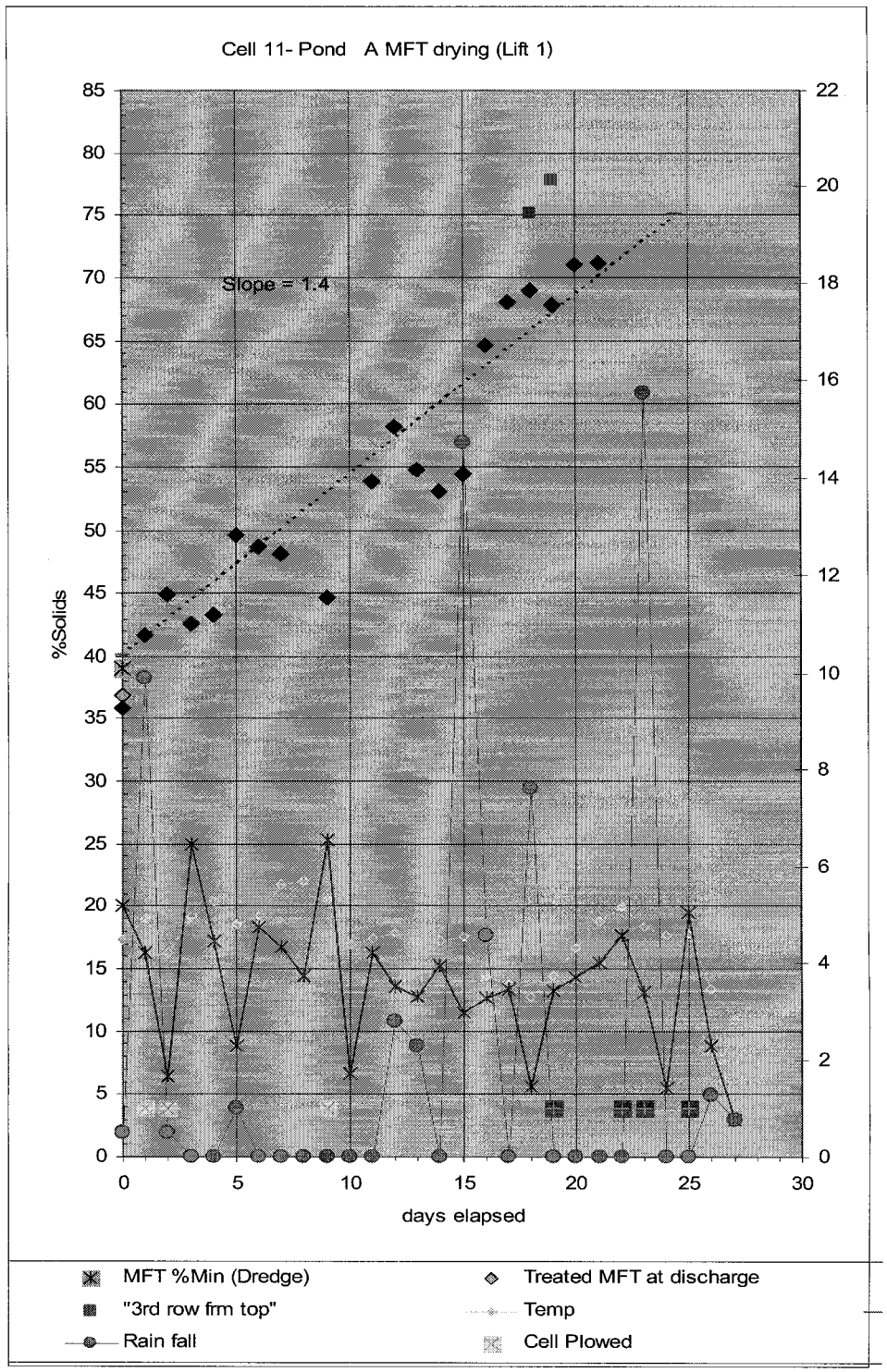
Figure 49C:
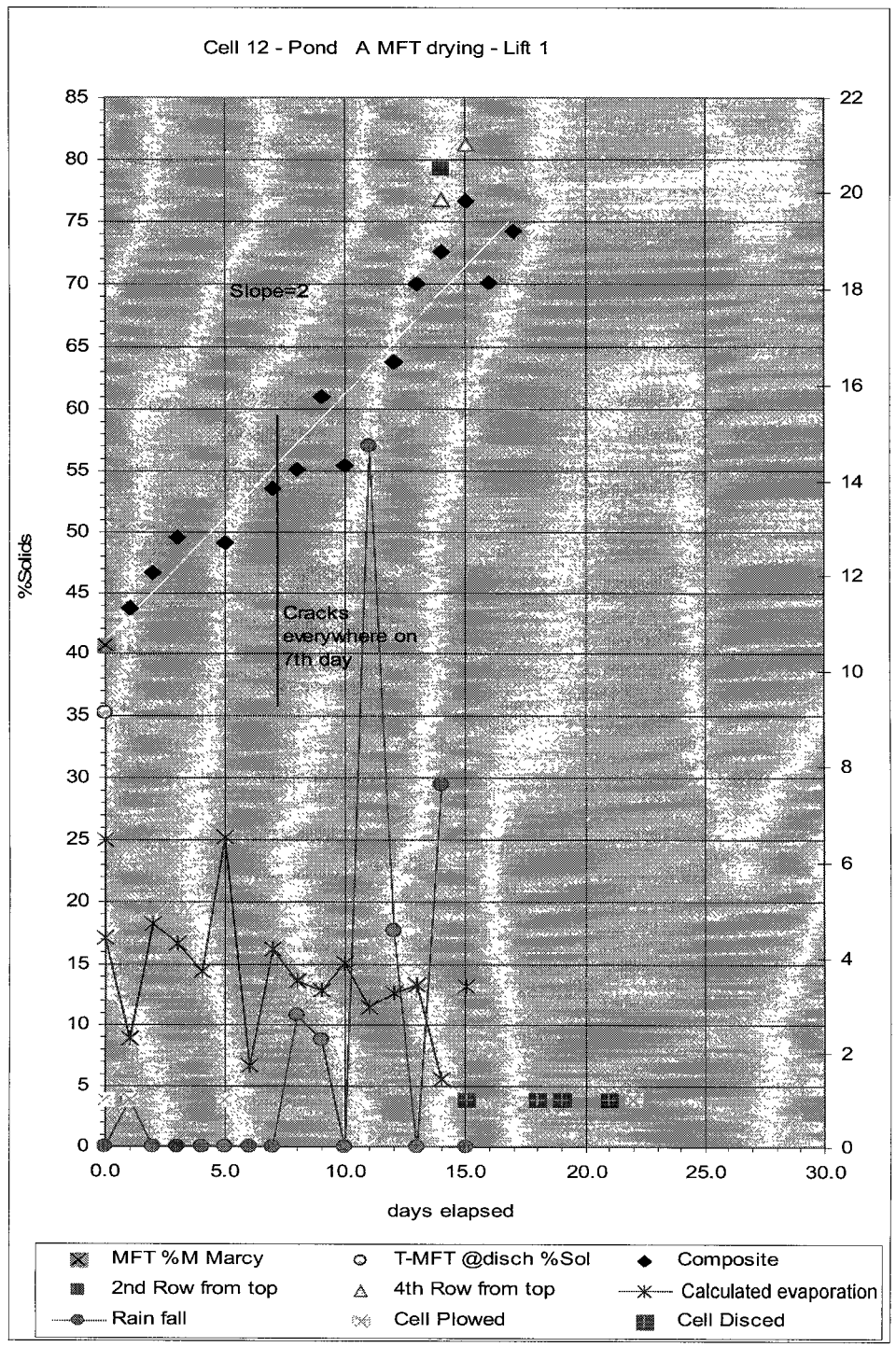

Pond A drying cells displayed two types of drying trends. In the first category, solids content in the deposit rose steadily at a "rate of rise" of 1.5%-2% per day. Drying was completed in 15 to 20 days. This mode of drying is similar to the drying of a previously tested pond treated MFT. FIGS. 49a, 49b and 49c illustrate these trends. The operating conditions of these cells are tabled below.

| Cell No | MFT % Min | % Solids after 1st day | Drying time | Mineral loading (t/m2) | Drying factor (t/ha/mo) | "Rate of Rise"—% per day |
| --- | --- | --- | --- | --- | --- | --- |
| 7 | 23.5 (Marcy) | 42 | 20 | 0.06 (thin lift) | 900 | 1.9% |
| 11 | 33.8 | 41.2 | 18 | 0.17 | 2833 | 1.4% |
| 12 | 40.6 (Marcy) | 41.7 | 15 | 0.38 | 5700 | 2% |

Given a typical rate of rise from to evaporation at 0.5% per day (25 cm lift), the rate of rise due to water release and migration was 0.9%-1.5%/day, 64% to 75% of the total. At a rate of rise of 1.4%-2% per day, cell will dry to 75% in 16-23 days, assuming a solid content of 42.5% after the first day.

In the second type of drying trend, drying started well with an adequate rate of rise around 2% per day until solids content approached 55%-60%. From then on, the rate of rise slowed down to about 0.5% as if driven by evaporation. In some cases with rain falls, the rate of rise remained flat for several days, or even negative (i.e. accumulating precipitation water). In other cases, the rate of rise eventually picked up again after that. Drying was slower than with the first type and cells were able to reach 75% solids content only with plowing and disc harrowing techniques. Post-deposition working and farming techniques were thus able to treat such deposits to reach dewatering and drying targets.

Though a precise cause of degradation was not pinpointed, in the cases above, the slow-down in drying rate appeared to follow a period of rains. This suggests an issue with surface drainage which prevented water from running off at the surface of the deposit. Field observation confirmed that trapped water was found in part of one of the cells. Surface drainage may be hindered by insufficient slope or by surface irregularities such as depressions caused by process variability (on spec/off spec quality) as well as circular ridges from plowing in circular patterns.

Figure 50A:
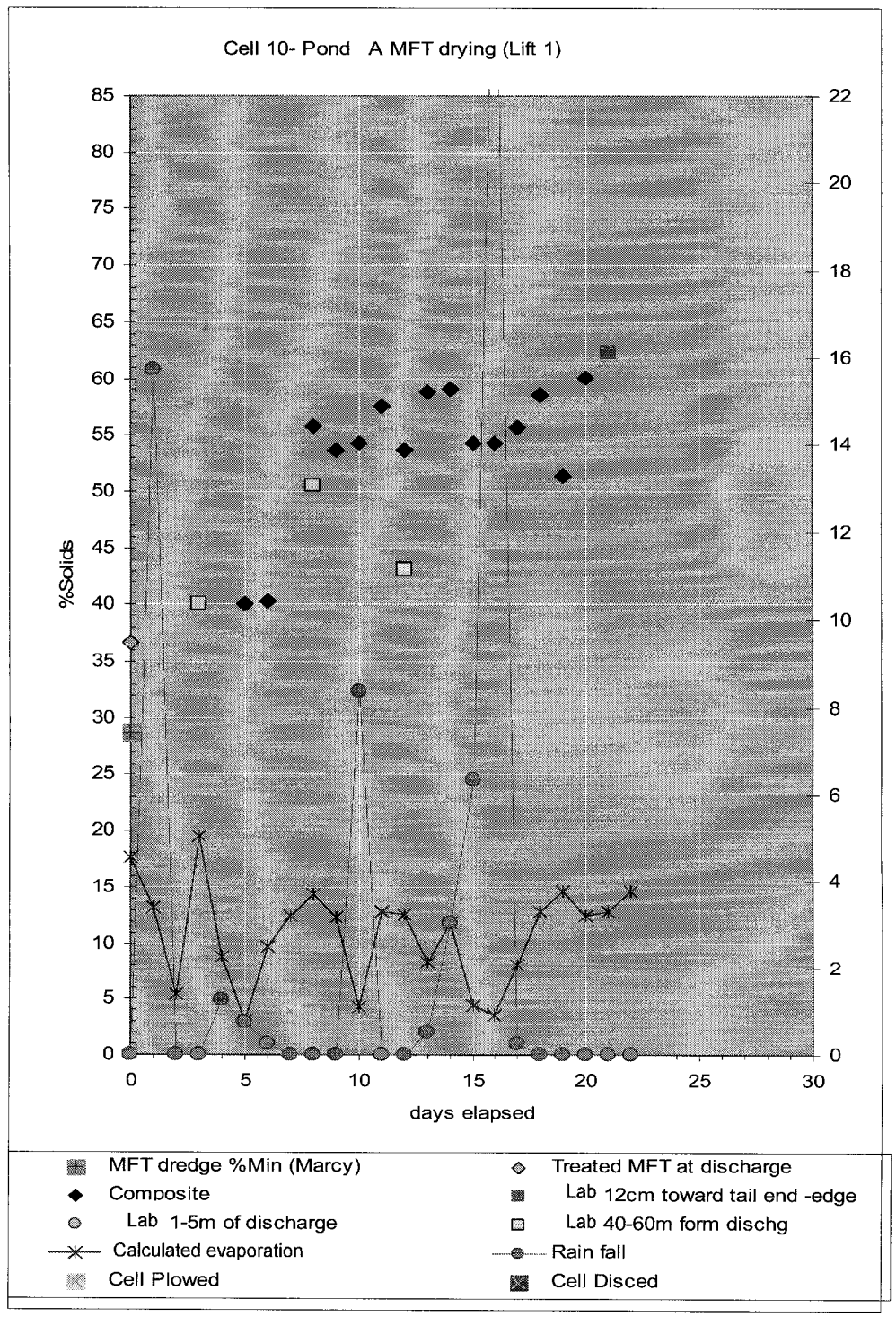
FIGS. 50$a$ and 50$b$ are graphs of various deposition data over time for two cells into which flocculated MFT was deposited, showing effect of overshearing the flocculated MFT.
Figure 50B:
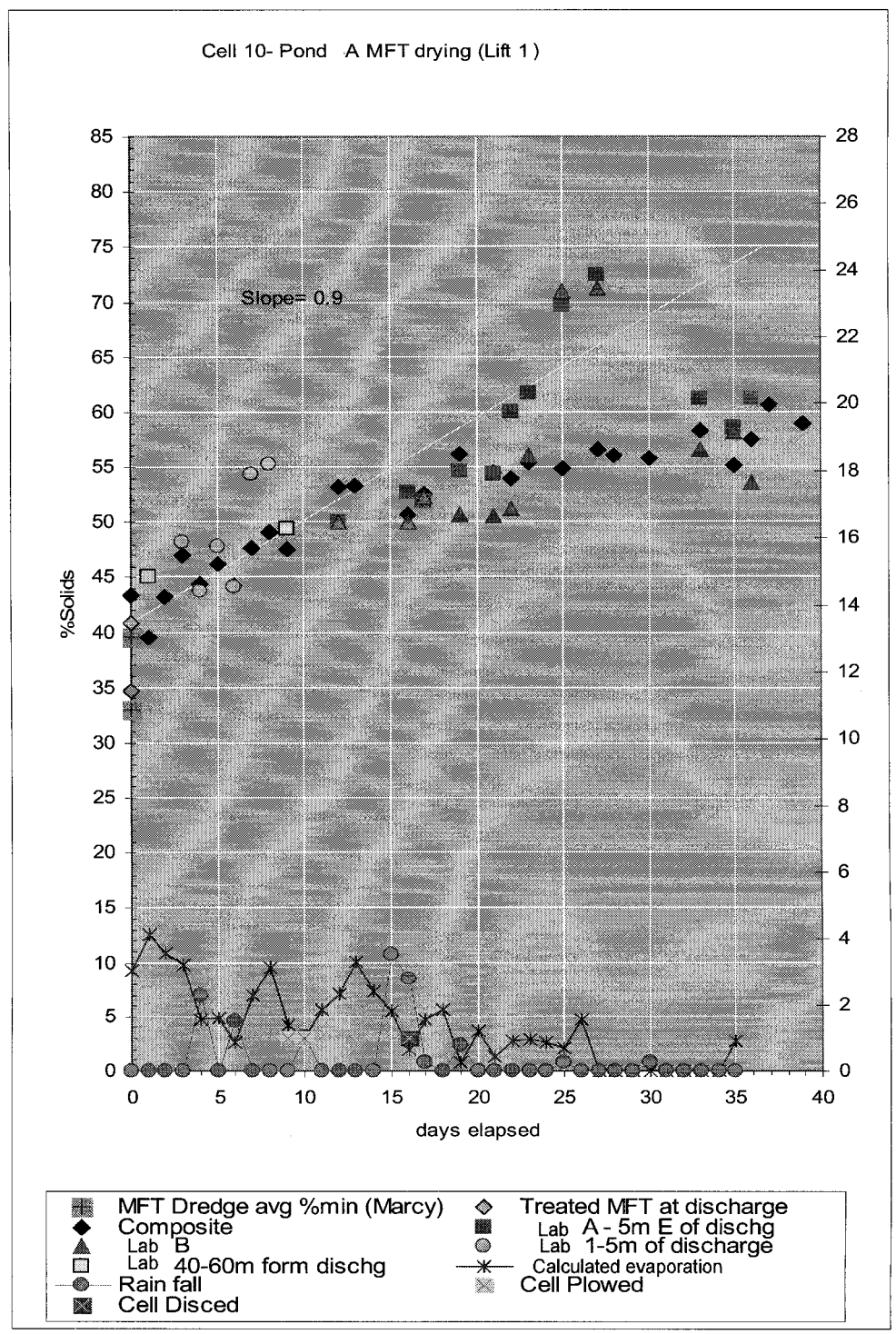

FIGS. 50a and 50b show a case of a cell that did not dry effectively because the significant amounts of the material were oversheared due to an overly long pipeline conditioning length. As water release was halted in oversheared condition, the deposit essentially dried by evaporation.

Drying performance was also impeded in some cases when release water from adjacent cells was allowed to travel over a cell. The situation was exacerbated when processing low density MFT. Deposition cells should be designed and deposition should be managed in order to avoid release water spill over.

For multiple layers of deposited flocculated MFT, it may be desired to obtain undamaged deep cracks in the deposit, e.g. as shown in FIG. 34, to facilitate water release to flow away from the second layer deposit. Accordingly, in an optional aspect of the process, the deposit is left so that it remains substantially untouched by post-deposition handling or mechanical working, to retain the deep crack channel structure before a second lift is made.

It should also be noted that solids content samples taken from drying cells can vary. It is normal to expect the top of cell to dry faster than the toe area. Difference in dryness can also be found in other areas of the cell. Uneven drying increases drying time and could be caused by one of the following reasons: variability in the polymer treatment process, producing off-spec products and by consequence uneven lift thickness, sampling protocols, or material movement from plow/harrow activity.

Regarding the effect of plow/disc harrow activity, the plow/disc harrow released trapped water and accelerated drying in cells 1 and 3, which had little slope, and helped drying in cells 7 and 8. Multiple plows in both cells did not seem to bother its performance. It was noted that producing circular ridges can trap release and rain water and with multiple plows were probably not be necessary: potential harm may exceed benefit. The preferred strategy is to let drying cells take their own course for the first few days while drying performance is being monitored and intervene if desired to adjust drying performance. It is also preferred to avoid circular plow or disc patterns: fish bone patterns are a good alternative as they shorten water migration pathway and may improve dewatering.

Regarding drying capability, it was attempted to obtain and derive the following general drying factors compiled from in-situ cells which had reached 75% solids content or higher. The drying factor was based on total mineral in MFT and provide a general indication.

| Cell No. | Tonnes of minerals | Drying days | Mineral loading (t/m2) | Drying factor (t/ha/month) |
|---|---|---|---|---|
| 1 | 231 | 13 | 0.03 | 702 |
| 2 | 1636 | 21 | 0.22 | 3102 |

-continued

| Cell No. | Tonnes of minerals | Drying days | Mineral loading (t/m2) | Drying factor (t/ha/month) |
|---|---|---|---|---|
| 3 | 1759 | 18 | 0.20 | 3379 |
| 7 | 1919 | 20 | 0.19 | 2817 |
| 8 | 1731 | 17 | 0.17 | 2943 |
| 9 | 1558 | 22 | 0.25 | 3477 |
| 11 | 1489 | 18 | 0.17 | 2886 |
| 12 | 2890 | 15 | 0.38 | 7510 |
| 13 | 5597 | 18 | 0.11 | 1910 |

Example 12

Trials were conducted and protocols developed for the identification of MFT dewatering process flocculation reagents.

The protocol developed has the following exemplary steps, though variations of the protocol may be used depending on the nature, class and number of flocculation reagents to be testes and the MFT being used:

Identification of chemical activity: 10% Solids MFT is mixed with the flocculation reagent polymer and beaker settling test followed by a drainage test is performed to determine activity. The Target is 20% SBW precipitate after 20 minutes of drainage or a net water release of >50%, and <1% solids in supernatant.

24 hour water release performance using fast-slow methodology: Sieve test on 40% SBW standard low calcium MFT to determine dose range. Target range is 10% net water release from MFT and less than 1% solids in supernatant.

Yield Stress and CST data using fast slow methodology: Once water release potential has been confirmed yield stress and CST data are run.

Slope drying test. 2 L of material are dried in a sloped lab cell: Target lift height 8-10 cm. Target drying time less than 10 Days.

Figure 51:
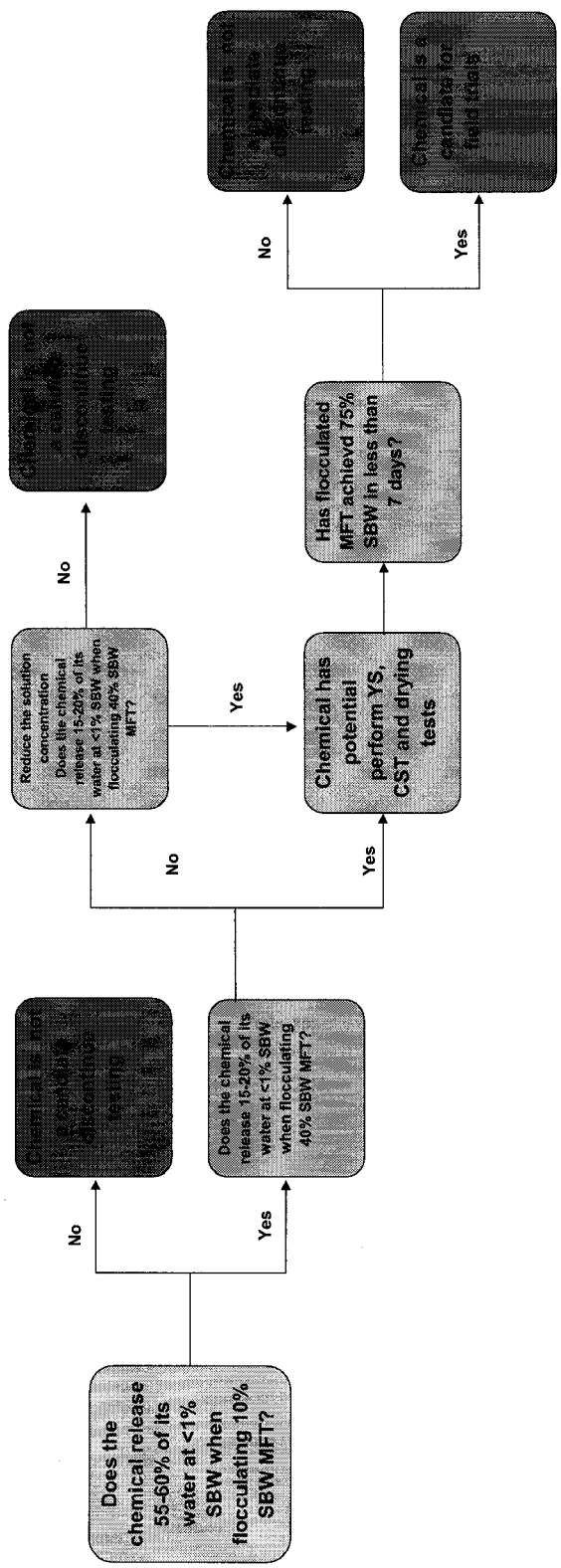
FIG. 51 is a diagram of an exemplary decision tree for flocculation reagent indication, screening and identification.

FIG. 51 is an exemplary decision tree for the above protocol screening and identification technique. It should be understood that the thresholds pertaining to water release quantities, MFT and release water solids content, dewatering and drying rates, etc., are meant as exemplary guidelines and different thresholds may be used depending on the given MFT to be treated and the set of polymers to be tested, as the case may be.

The following is a more detailed example of the flocculation reagent identification protocol, where a 0.45% solution of the chemical is made up by dissolving 2.25 g of chemical in 500 mL of process water.

Identification of chemical activity: 320 mL of 10% Solids MFT was measured out into a 500 mL beaker. The optimal dose of chemical must now be determined. Starting at a 300 PPM dose polymer and increasing in increments of 100 PPM polymer is added to the 500 mL beaker that is stirred at 320 rpm using the laboratory mixer until settling is observed. Once settling has been observed the reaction is stopped and the precipitate and supernatant is then placed upon a 500 mL kitchen sieve over a 1 L beaker. The supernatant is collected over 20 minutes, the volume is then recorded using a measuring cylinder. A moisture analysis is then performed on ~10 g of the supernatant using a halogen lamp oven.

24 hour water release test using fast slow methodology: For a 24 hour water release test a water release curve must be generated for 40% SBW around the optimal dose identified in the chemical activity test. 320 mL of 40% SBW MFT was measured out into a 400 mL metal container. The amount of polymer for the optimal dose and 100 PPM and 100 PPM higher than the optimal dose is calculated. The laboratory mixer is increased to 320 rpm until the polymer was completely dispersed in 10-20 s stop-go steps. The mixer speed is then reduced to 100 rpm after dispersion is completed. The mixer is stopped just after the point of maximum strength which is visually identified. The flocculated matrix is then placed upon a 500 mL kitchen sieve over a 1 L beaker. The supernatant is collected over 24 hours, the volume is then recorded using a measuring cylinder.

Yield stress and CST using fast-slow methodology: 320 mL of 40% SBW MFT was measured out into a 400 mL metal container. The amount of polymer for the optimal dose is calculated. The laboratory mixer is increased to 320 rpm until the polymer was completely dispersed in 15 s stop-go steps. The mixer speed is then reduced to 100 rpm after dispersion is completed and 30 s stop-go steps are performed until the MFT yield stress has reached a plateau. At each stop step the CST and yield stress data is taken.

Slope drying test: 320 mL of 40% SBW is measured out into a 400 mL metal container.

The optimal dose is calculated. The fast slow methodology and time for minimum CST identified in 3.3 is then used to condition the flocculated MFT. This is repeated 7 times to generate 2 L of conditioned MFT. This is placed on a 45 cm×30 cm tray containing a sand base. The lift height in cm is then measured. After 24 hours a sample is taken and the moisture content is monitored using a halogen lamp oven. This is repeated every 24 hours until the material has reached 75% SBW.

The following is an exemplary run for two candidates, one of which is a step 2 failure chemical.

Figure 52:
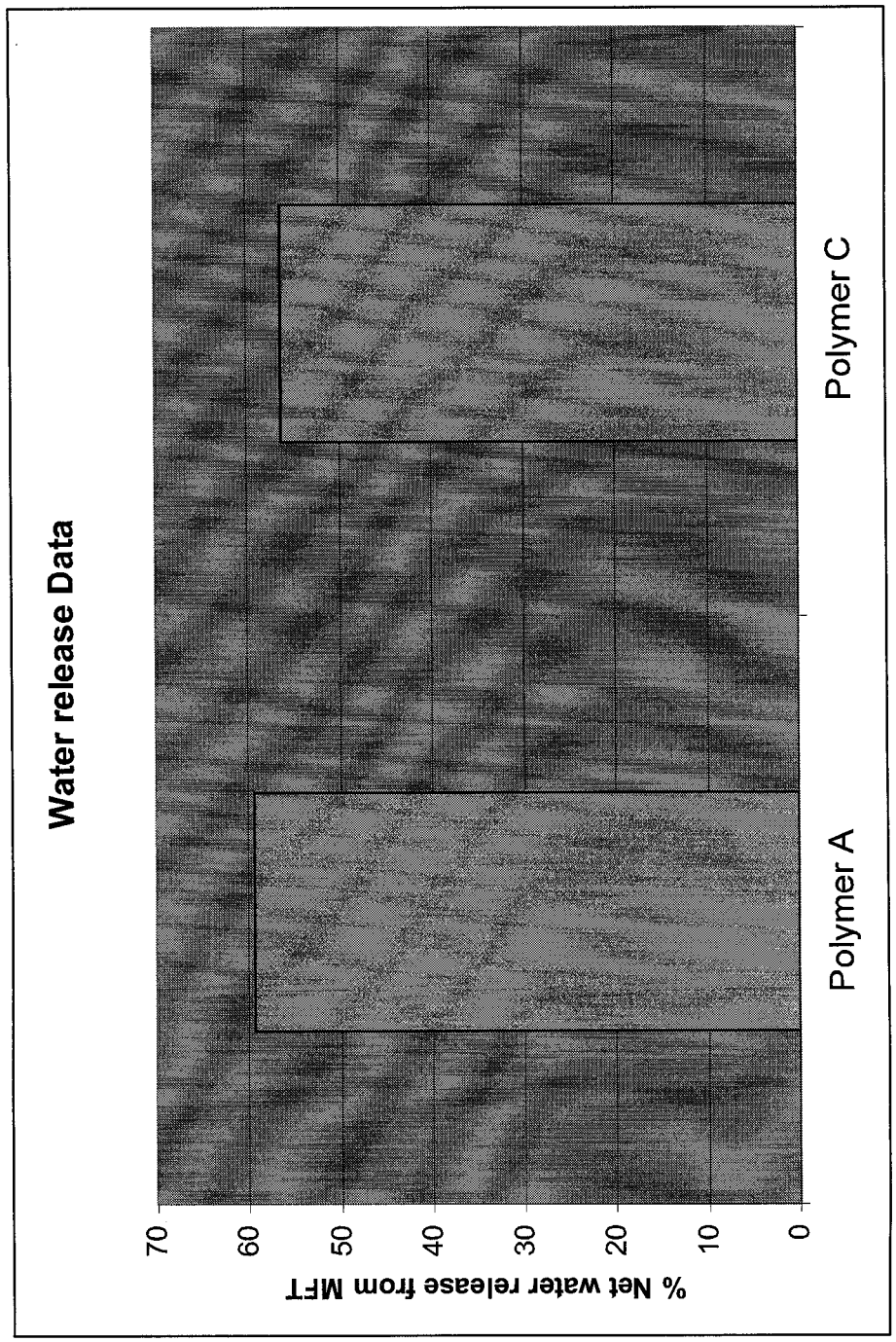
FIG. 52 is a bar graph comparing the net water release of two polymer flocculents in the first step of the screening technique.

Identification of chemical activity: Two 30% charge anionic polyacryamides, Polymer A (mentioned above) and Polymer C rheology modifier, underwent the chemical activity test on 10% solids by weight MFT. The precipitate reached >20% SBW (releasing >50% of the water present in the original MFT) in both cases. The supernatant was also below 1% solids, 0.54% for Polymer A and 0.74% for Polymer C. FIG. 52 shows the net water release data for optimal dose Polymer A (1000 PPM) and Polymer C (800 PPM).

Figure 53:
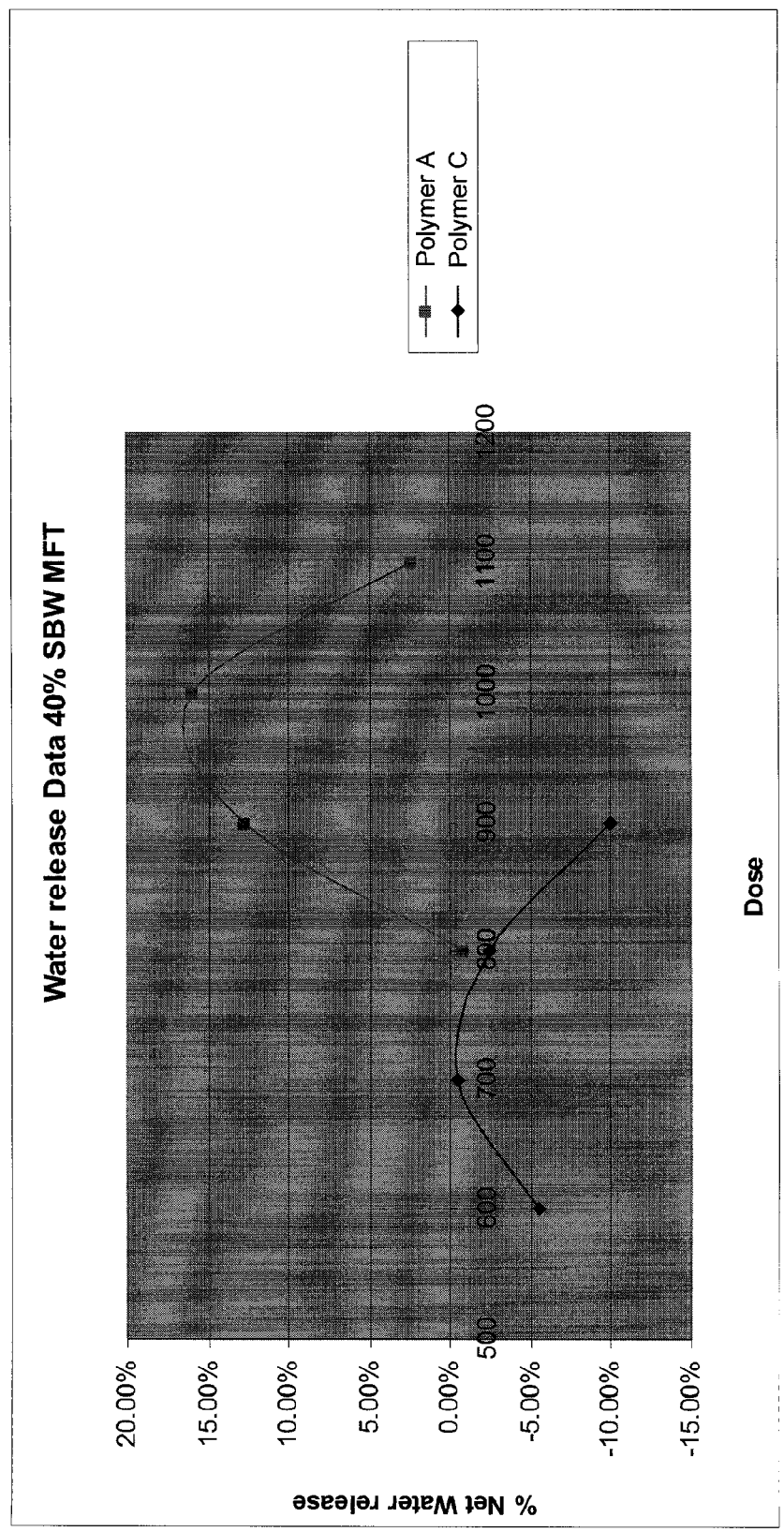
FIG. 53 is a graph of net water release versus dosage for the two polymer flocculents.

24 hour water release test using fast slow methodology: The floc structure generated by Polymer C seemed similar to Polymer A, however there was no observable water release. The 24 hour water release numbers indicate that the floc matrix generated by Polymer C has gelled up retaining some of the polymer water (FIG. 53, showing net water release curves data for Polymer A and Polymer C). This data shows that Polymer C is not an appropriate chemical for field trials.

Figure 54:
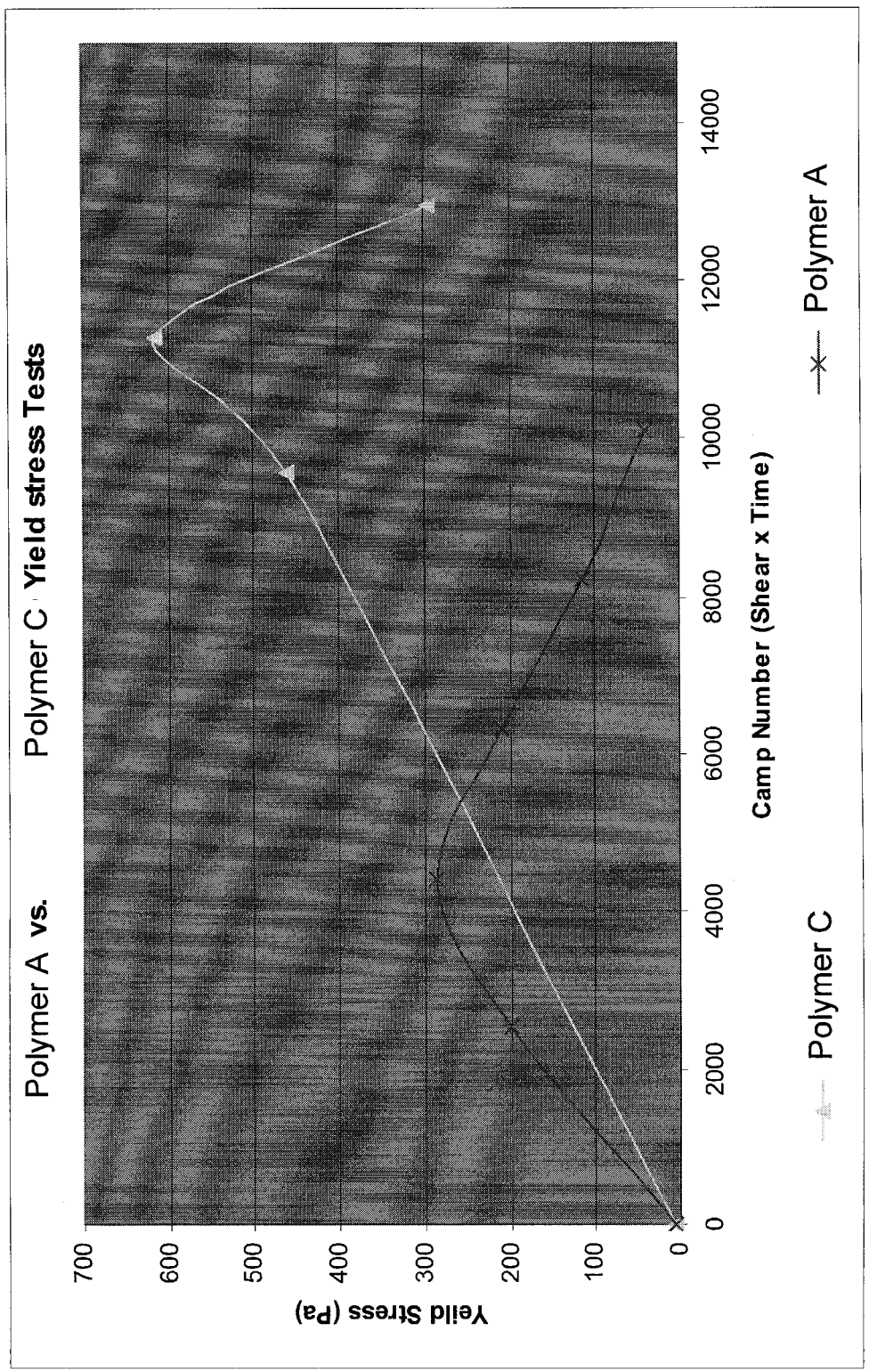
FIG. 54 is a graph of yield stress versus camp number for the two polymer flocculents.

Yield stress and CST using fast slow methodology and slope drying test: Although Polymer C does not release any water after 24 hours the yield stress data was performed during the water release test (FIG. 54, showing yield stress data Polymer C (800 PPM) vs. Polymer A (1000 PPM)). There are two very interesting pieces of information that indicate why the Polymer C did not become an appropriate chemical. First of all, although the dose of polymer and hence the physical amount of polymer added to the MFT was much lower than Polymer A, the amount of energy required to mix the polymer into the MFT was much greater. Once mixed in, a very strong gelled matrix was formed with a very high yield stress. This started to breakdown and over-shear at a very fast rate. When compared to Polymer A, which not only mixed in very quickly but also breaks down at a slow rate, it becomes very easy to identify a preferred chemical from a chemical that will gel the MFT. Generally, preferred flocculation reagents have a wide dewatering stage in between the gel matrix stage and the over-shearing zone.

Figure 55:
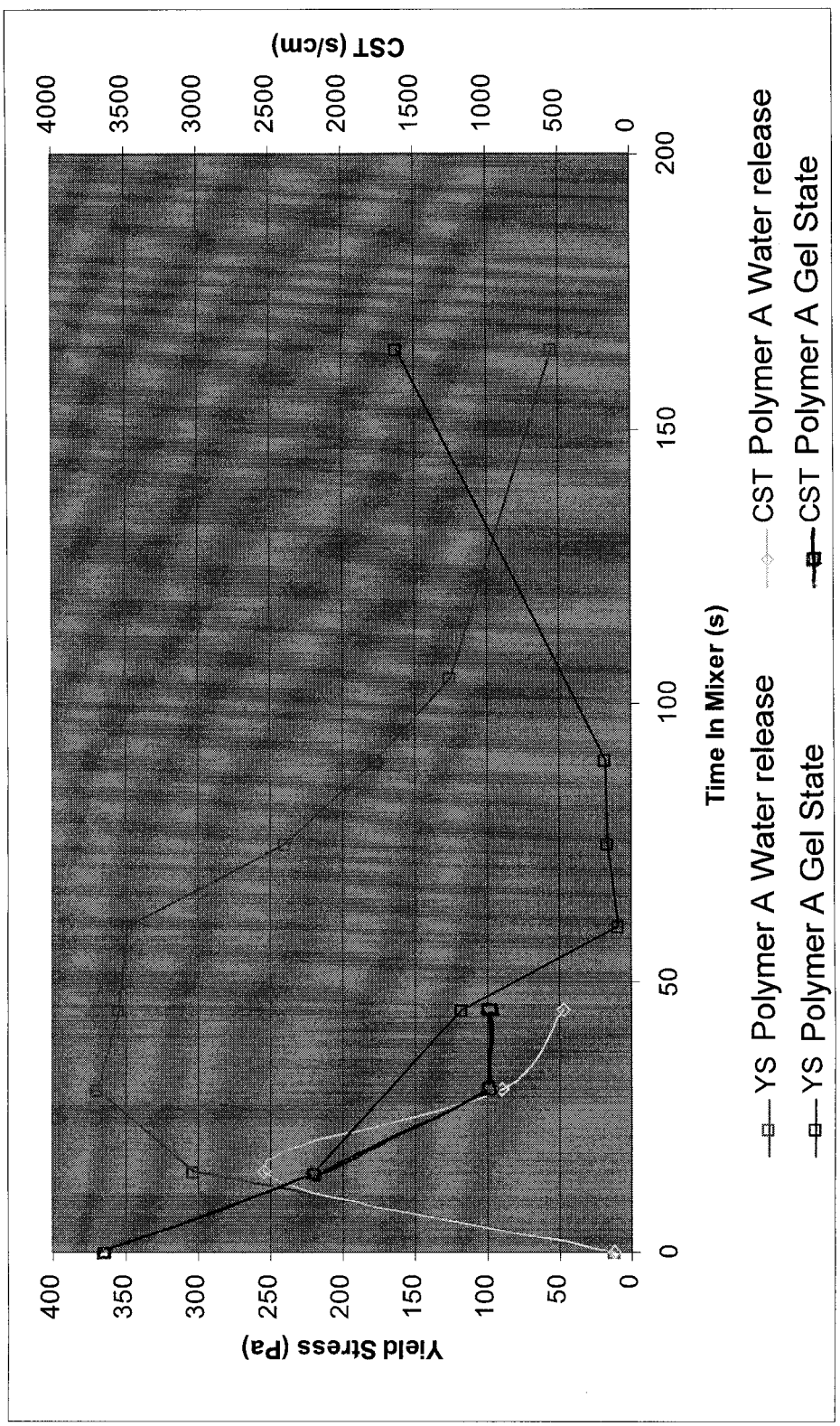
FIG. 55 is a graph of yield stress and CST versus time in mixer for gel state and water release treated MFTs with a polymer flocculent.

Although testing for Polymer C was halted at this point, data from Polymer A in a gel state (under-dose) can be used as a reference point for the effect of a gel state MFT (FIG. 55 showing CST data for an optimal dose water release (800 PPM) and an under-dose that generated a gel state with no initial water release (500 PPM)). In a gel state the CST data generally improves from raw MFT but does not undergo a sudden dip upon water release which lasts until the flocculated material has been over-sheared.

Figure 56:
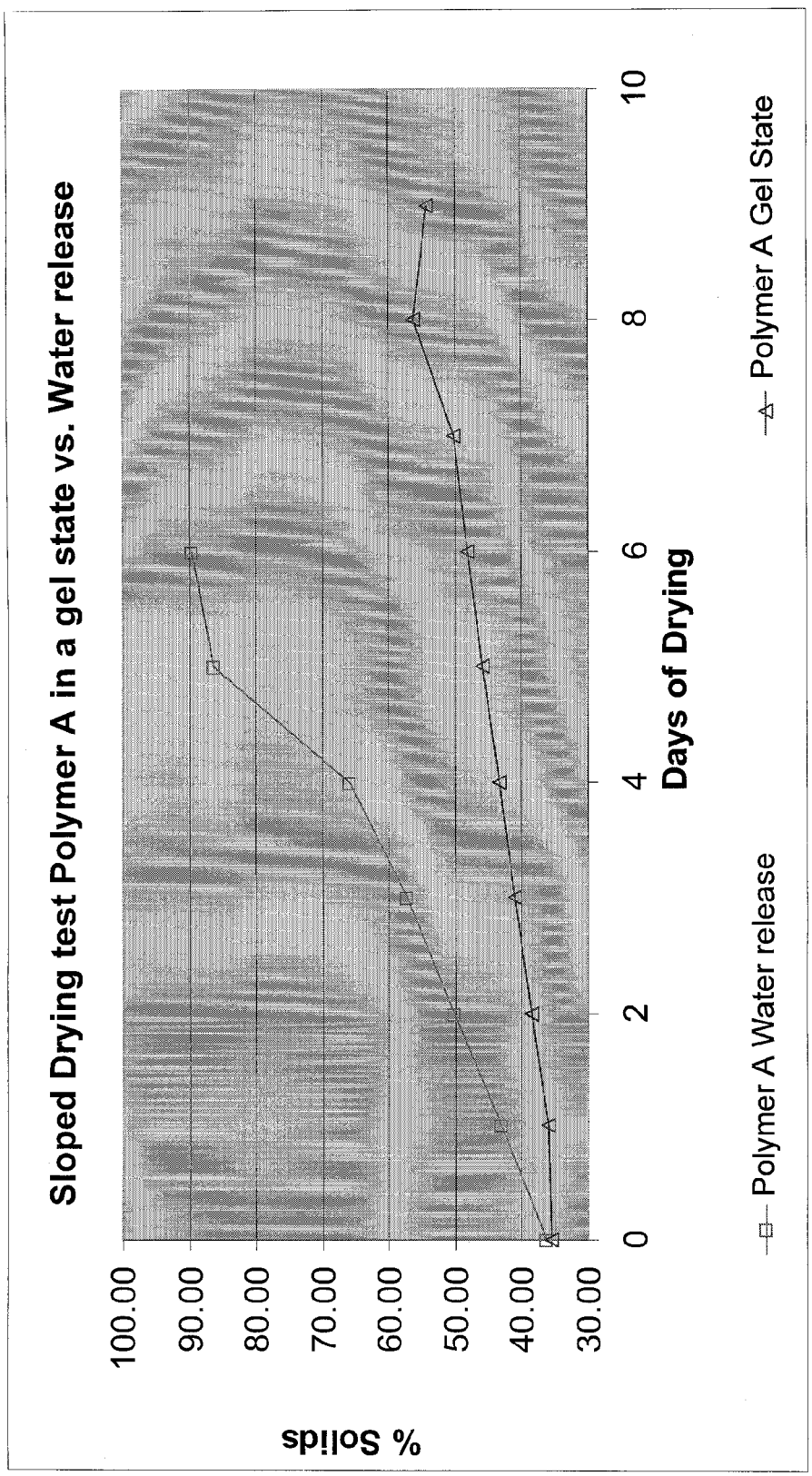
FIG. 56 is a graph of sloped drying test showing the % solids evolution over time for gel state and water release treated MFTs with a polymer flocculent.

The effect observed visually and by the CST relates directly to the effect on drying (FIG. 56, showing drying data for an optimal dose that releases water (1000 PPM) vs. an under-dose (600 PPM) that enters a gel state with no initial water release, both sets of data being 8 cm lifts 1 L of material on a sand base with starting solids of 40% SBW). The gel state material dries at a slightly quicker rate than evaporation whereas the water-releasing material has reached 75% SBW in less than 5 days.

The process of the present invention, which is a significant advance in the art of MFT management and reclamation, has been described with regard to preferred embodiments and aspects and examples. The description and the drawings are intended to help the understanding of the invention rather than to limit its scope. It will be apparent to one skilled in the art that various modifications may be made to the invention without departing from what has actually been invented.

The invention claimed is:

1. A process for dewatering oil sand fine tailings, comprising:
   (i) adding a flocculant solution comprising an effective amount of flocculation reagent in-line into a flow of the oil sand fine tailings to cause dispersion of the flocculation reagent and build-up of flocs to form a flocculated oil sand fine tailings;
   (ii) transporting the flocculated oil sand fine tailings in-line and subjecting the flocculated oil sand fine tailings to shear conditioning to transform the flocculated oil sand fine tailings into a gel stage flocculated oil sand fine tailings;
   (iii) subjecting the gel stage flocculated oil sand fine tailings to shear conditioning to form an ungelled flocculated oil sand fine tailings material within a floc breakdown and water release stage while avoiding overshearing the ungelled flocculated oil sand fine tailings material, the ungelled flocculated oil sand fine tailings material having a decreased yield shear stress;
   (iv) subjecting the ungelled flocculated oil sand fine tailings material to dewatering;
   wherein the oil sand fine tailings comprise solids in a concentration of between about 15 wt % and about 45 wt %, the solids having a clay content of at least about 45%.

2. The process of claim 1, wherein stages (i), (ii) and (iii) are performed in a pipeline reactor.

3. The process of claim 2, wherein the pipeline reactor comprises a co-annular injection device for in-line injection of the flocculant solution within the oil sand fine tailings.

4. The process of claim 3, wherein the flocculant solution is in the form of an aqueous solution in which the flocculation reagent is substantially dissolved.

5. The process of claim 4, wherein the flocculation reagent comprises a polymer flocculant that is shear-responsive in stage (i) thereby dispersing throughout the oil sand fine tailings, and enables shear-resilience during stages (ii) and (iii).

6. The process of claim 5, wherein the polymer flocculant that is selected according to a screening method comprising:
preparing a sample flocculation matrix comprising a sample of the oil sand fine tailings and a sample polymer flocculant;
imparting a first shear conditioning to the sample flocculation matrix for rapidly mixing the polymer flocculant with the sample of the oil sand fine tailings, followed by imparting a second shear conditioning to the sample flocculation matrix that is substantially lower than the first shear conditioning;
determining a water release response after both the first and second shear conditionings have been imparted;
wherein when the water release response is increased compared to a single water release response obtained when either one of the first or second shear conditioning is imparted as a single shear conditioning step, the polymer flocculant is selected for the process.

7. The process of claim 6, wherein the water release response is determined by measuring capillary suction time (CST) of the sample flocculation matrix.

8. The process of claim 7, further comprising:
measuring the capillary suction time (CST) of the flocculated oil sand fine tailings during stages (ii) and (iii) to obtain a minimum CST interval on a curve of CST versus time; and
adjusting the shear conditioning imparted to the flocculated oil sand fine tailings so as to ensure dewatering of the ungelled flocculated oil sand fine tailings material within the minimum CST interval.

9. The process of claim 2, further comprising:
measuring the yield shear stress of the flocculated oil sand fine tailings during stages (ii) and (iii);
identifying a decrease zone following a plateau zone; and
adjusting the shear conditioning in stages (ii) and (iii) to ensure dewatering of the ungelled flocculated oil sand fine tailings material within the decrease zone.

10. The process of claim 9, wherein the shear conditioning is managed by adjusting the length of pipeline through which the flocculated oil sand fine tailings travels prior to dewatering.

11. The process of claim 9, wherein stage (iv) of subjecting the ungelled flocculated oil sand fine tailings material to dewatering is performed within the decrease zone of the yield shear stress and within a minimum capillary suction time (CST) interval, the minimum CST interval being obtained on a curve of CST versus time.

12. The process of claim 1, wherein subjecting the ungelled flocculated oil sand fine tailings material to dewatering comprises expelling the ungelled flocculated oil sand fine tailings material from a conditioning pipeline.

13. The process of claim 1, wherein subjecting the ungelled flocculated oil sand fine tailings material to dewatering comprises supplying the ungelled flocculated oil sand fine tailings material to a dewatering device.

14. The process of claim 13, wherein the dewatering device comprises a filter, a thickener, a centrifuge, or a cyclone.

15. The process of claim 12, wherein expelling the ungelled flocculated oil sand fine tailings material from the conditioning pipeline comprises depositing the ungelled flocculated oil sand fine tailings material onto a solid land surface to form a deposit and to allow the released water to flow away from the deposit.

16. The process of claim 15, wherein the ungelled flocculated oil sand fine tailings material is deposited into a deposition cell having a sloped bottom surface that is sloped between about 1% and about 7%.

17. The process of claim 16, further comprising mechanically working the deposit to spread the deposit over the deposition cell and impart additional shear thereto while avoiding overshearing the ungelled flocculated oil sand fine tailings material.

18. The process of claim 17, further comprising providing furrows in the deposit, the furrows providing water flow paths.

19. The process of claim 18, wherein substantially all of the furrows extend lengthwise in the same general direction as the sloped bottom surface.

20. The process of claim 15, wherein the solid land surface comprises a multi-cell configuration of deposition cells.

21. The process of claim 20, wherein the deposition cells of the multi-cell configuration are provided at different distances from the in-line addition of the flocculant solution to allow varying the shear conditioning imparted to the flocculated oil sand fine tailings by varying the pipeline length to a corresponding deposition cell.

22. The process of claim 20, wherein at least some of the deposition cells are arranged in toe-to-toe relationship to share a common water drainage ditch.

23. The process of claim 15, wherein the deposit dewaters due to drainage of release water and evaporative drying, the drainage accounting for at least about 60 wt % of water loss, and drainage occurring at a rate of at least about 1.4 wt % solids increase per day until the deposit reaches about 55 wt % to 60 wt % solids.

24. The process of claim 1, further comprising imparting sufficient hydraulic pressure to the oil sand fine tailings upstream of stage (i) such that downstream pumping is not required.

25. The process of claim 1, wherein the stage (i) dispersion is further characterized in that second moment M is between about 1.0 and about 2.0 at a downstream location about 5 pipe diameters from adding the flocculant solution.

26. A process for dewatering tailings, comprising:
(i) adding a flocculant solution comprising an effective amount of flocculation reagent into a flow of the tailings to cause dispersion of the flocculation reagent and build-up of flocs to form a flocculated tailings;
(ii) transporting the flocculated tailings in-line and subjecting the flocculated tailings to shear conditioning to transform the flocculated tailings into a gel stage flocculated tailings;
(iii) subjecting the gel stage flocculated tailings to shear conditioning to form an ungelled flocculated tailings material within a floc breakdown and water release while avoiding overshearing the ungelled flocculated tailings material, the ungelled flocculated tailings having a decreased yield shear stress;
(iv) subjecting the ungelled flocculated tailings material to dewatering;

wherein the tailings comprise solids in a concentration of between about 15 wt % and about 45 wt %, the solids having a clay content of at least about 45%.

27. The process of claim 26, wherein stages (i), (ii) and (iii) are performed in a pipeline reactor.

28. The process of claim 27, wherein the pipeline reactor comprises a co-annular injection device for in-line injection of the flocculant solution within the tailings.

29. The process of claim 26, wherein the flocculant solution is in the form of an aqueous solution in which the flocculation reagent is substantially dissolved.

30. The process of claim 29, wherein the flocculation reagent comprises a polymer flocculant that is shear-responsive in stage (i) thereby dispersing throughout the tailings, and enables shear-resilience during stages (ii) and (iii).

31. The process of claim 30, wherein the flocculation reagent comprises a polymer flocculant that is selected according to a screening method comprising:
preparing a sample flocculation matrix comprising a sample of the tailings and a sample polymer flocculant;
imparting a first shear conditioning to the sample flocculation matrix for rapidly mixing the polymer flocculant with the sample of the tailings, followed by imparting a second shear conditioning to the sample flocculation matrix that is substantially lower than the first shear conditioning;
determining a water release response after both the first and second shear conditionings have been imparted;
wherein when the water release response is increased compared to a single water release response obtained when either one of the first or second shear conditioning is imparted as a single shear conditioning step, the polymer flocculant is selected for the process.

32. The process of claim 31, wherein the water release response is determined by measuring capillary suction time (CST) of the sample flocculation matrix.

33. The process of claim 32, further comprising:
measuring the capillary suction time (CST) of the flocculated tailings during stages (ii) and (iii) to obtain a minimum CST interval on a curve of CST versus time; and
adjusting the shear conditioning imparted to the flocculated tailings so as to ensure dewatering of the flocculated tailings material within the minimum CST interval.

34. The process of claim 26, further comprising:
measuring the yield shear stress of the flocculated tailings during stages (ii) and (iii);
identifying a decrease zone following a plateau zone; and
adjusting the shear conditioning in stages (ii) and (iii) to ensure dewatering of the ungelled flocculated tailings material within the decrease zone.

35. The process of claim 34, wherein the shear conditioning is managed by adjusting the length of pipeline through which the flocculated tailings travels prior to dewatering.

36. The process of claim 34, wherein stage (iv) of subjecting the ungelled flocculated tailings material to dewatering is performed within the decrease zone of the yield shear stress and within a minimum capillary suction time (CST) interval, the minimum CST interval being obtained on a curve of CST versus time.

37. The process of claim 26, wherein subjecting the ungelled flocculated tailings material to dewatering comprises expelling the ungelled flocculated tailings material from a conditioning pipeline.

38. The process of claim 26, wherein subjecting the ungelled flocculated tailings material to dewatering comprises supplying the ungelled flocculated tailings material to a dewatering device.

39. The process of claim 38, wherein the dewatering device comprises a filter, a thickener, a centrifuge, or a cyclone.

40. The process of claim 37, wherein expelling the ungelled flocculated tailings material from the conditioning pipeline comprises depositing the ungelled flocculated tailings material onto a solid land surface to form a deposit and to allow the released water to flow away from the deposit.

41. The process of claim 40, wherein the ungelled flocculated tailings material is deposited into a deposition cell having a sloped bottom surface that is sloped between about 1% and about 7%.

42. The process of claim 41, further comprising mechanically working the deposit to spread the deposit over the deposition cell and impart additional shear thereto while avoiding overshearing the ungelled flocculated tailings material.

43. The process of claim 42, further comprising providing furrows in the deposit, the furrows providing water flow paths.

44. The process of claim 43, wherein substantially all of the furrows extend lengthwise in the same general direction as the sloped bottom surface.

45. The process of claim 40, wherein the solid land surface comprises a multi-cell configuration of deposition cells.

46. The process of claim 45, wherein the deposition cells of the multi-cell configuration are provided at different distances from the in-line addition of the flocculant solution to allow varying the shear conditioning imparted to the flocculated tailings by varying the pipeline length to a corresponding deposition cell.

47. The process of claim 45, wherein at least some of the deposition cells are arranged in toe-to-toe relationship to share a common water drainage ditch.

48. The process of claim 26, further comprising imparting sufficient hydraulic pressure to the tailings upstream of stage (i) such that downstream pumping is not required.

49. The process of claim 26, wherein the stage (i) dispersion is further characterized in that second moment M is between about 1.0 and about 2.0 at a downstream location about 5 pipe diameters from adding the flocculant solution.

50. The process of claim 40, wherein the deposit dewaters due to drainage of release water and evaporative drying, the drainage accounting for at least about 60 wt % of water loss, and drainage occurring at a rate of at least about 1.4 wt % solids increase per day until the deposit reaches about 55 wt % to 60 wt % solids.

51. The process of claim 26, wherein the tailings comprise fine tailings.

52. The process of claim 26, wherein the tailings comprise oil sands fine tailings.

53. The process of claim 52, wherein the oil sands fine tailings are oil sands mature fine tailings.

54. The process of claim 26, wherein the tailings comprise colloidal fluids having non-Newtonian fluid behavior.

55. A process for dewatering a colloidal fluid having non-Newtonian fluid behavior, comprising:
(i) adding a flocculant solution comprising an effective amount of flocculation reagent into a flow of the colloidal fluid to cause dispersion of the flocculation reagent and build-up of flocs to form a flocculated colloidal fluid;

(ii) transporting the flocculated colloidal fluid in-line and subjecting the flocculated colloidal fluid to shear conditioning to transform the flocculated colloidal fluid into a gel stage flocculated colloidal fluid;
(iii) subjecting the gel stage flocculated colloidal fluid to shear conditioning to form an ungelled flocculated colloidal fluid material within a floc breakdown and water release stage while avoiding overshearing the ungelled flocculated colloidal fluid material, the ungelled flocculated colloidal fluid material having a decreased yield shear stress;
(iv) subjecting the ungelled flocculated colloidal fluid material to dewatering;
wherein the colloidal fluid comprise solids in a concentration of between about 15 wt % and about 45 wt %, the solids having a clay content of at least about 45%.

* * * * *